US008281357B2

(12) United States Patent
Chiba et al.

(10) Patent No.: US 8,281,357 B2
(45) Date of Patent: Oct. 2, 2012

(54) NETWORK SYSTEM, MESSAGE PROCESSING METHOD, SERVICE SERVER, DIRECT ACCESS MANAGEMENT SERVER, NETWORK HOME APPLIANCE, AND COMPUTER PROGRAM

(75) Inventors: Hiroyuki Chiba, Kanagawa (JP);
Akihiko Kinoshita, Tokyo (JP); Takashi Kanao, Tokyo (JP)

(73) Assignee: Sony Corporation, Tokyo (JP)

(*) Notice: Subject to any disclaimer, the term of this patent is extended or adjusted under 35 U.S.C. 154(b) by 548 days.

(21) Appl. No.: 12/126,428

(22) Filed: May 23, 2008

(65) Prior Publication Data
US 2008/0307480 A1    Dec. 11, 2008

(30) Foreign Application Priority Data

Jun. 7, 2007  (JP) ................................. 2007-151632

(51) Int. Cl.
*H04N 7/173*       (2011.01)
(52) U.S. Cl. ......................... 725/118; 725/116; 709/219
(58) Field of Classification Search .......... 725/106–120, 725/133, 141, 153; 709/217–232
See application file for complete search history.

(56) References Cited

U.S. PATENT DOCUMENTS

| | | | | |
|---|---|---|---|---|
| 5,945,988 A * | 8/1999 | Williams et al. | ............... | 715/747 |
| 6,925,567 B1 * | 8/2005 | Hirata | ............... | 713/189 |
| 7,064,675 B2 * | 6/2006 | Zigmond et al. | ............ | 340/12.53 |
| 2002/0046407 A1 * | 4/2002 | Franco | ........................... | 725/110 |
| 2002/0069265 A1 * | 6/2002 | Bountour et al. | ............. | 709/219 |
| 2002/0095679 A1 * | 7/2002 | Bonini | ............................. | 725/74 |
| 2005/0028208 A1 * | 2/2005 | Ellis et al. | ....................... | 725/58 |
| 2005/0251827 A1 * | 11/2005 | Ellis et al. | ........................ | 725/47 |
| 2008/0178212 A1 | 7/2008 | Kinoshita et al. | | |
| 2008/0201754 A1 * | 8/2008 | Arling et al. | ................... | 725/114 |

FOREIGN PATENT DOCUMENTS

| | | |
|---|---|---|
| JP | 2002-171380 | 6/2002 |
| JP | 2003-319121 | 11/2003 |
| WO | WO 2006/121133 A1 | 11/2006 |
| WO | WO 2007/004755 A1 | 1/2007 |

OTHER PUBLICATIONS

Japanese Office Action issued Jan. 17, 2012, in Patent Application No. 2007-151632 (with English-language translation).

A. Niemi , "Session Initiation Protocol (SIP) Event Notification Throttle Mechanism draft-niemi-sipping-event-throttle-02", Network Working Group, Nokia Research Center, Feb. 21, 2005, pp. 1-15 http://tools.ietf.org/id/draft-niemi-sipping-event-throttle-02.txt.

* cited by examiner

*Primary Examiner* — Annan Shang
(74) *Attorney, Agent, or Firm* — Oblon, Spivak, McClelland, Maier & Neustadt, L.L.P.

(57) ABSTRACT

A network system includes a terminal apparatus, a network home appliance, a service server that provides the terminal apparatus with a service for controlling the network home appliance through a network, and a direct access management server that performs exchange of information necessary for directly accessing the network home appliance through the network. The network home appliance includes a first storing unit that stores setting information for setting necessity of message transmission concerning an event that occurs in the network home appliance and a message transmitting unit that judges necessity of transmission of a message concerning the event and transmits the message. The direct access management server includes a first message-transmission processing unit that specifies the service server and transmits the message to the service server. The service server includes a second message-transmission processing unit that specifies a destination of the terminal apparatus and transmits the message to the destination.

25 Claims, 36 Drawing Sheets

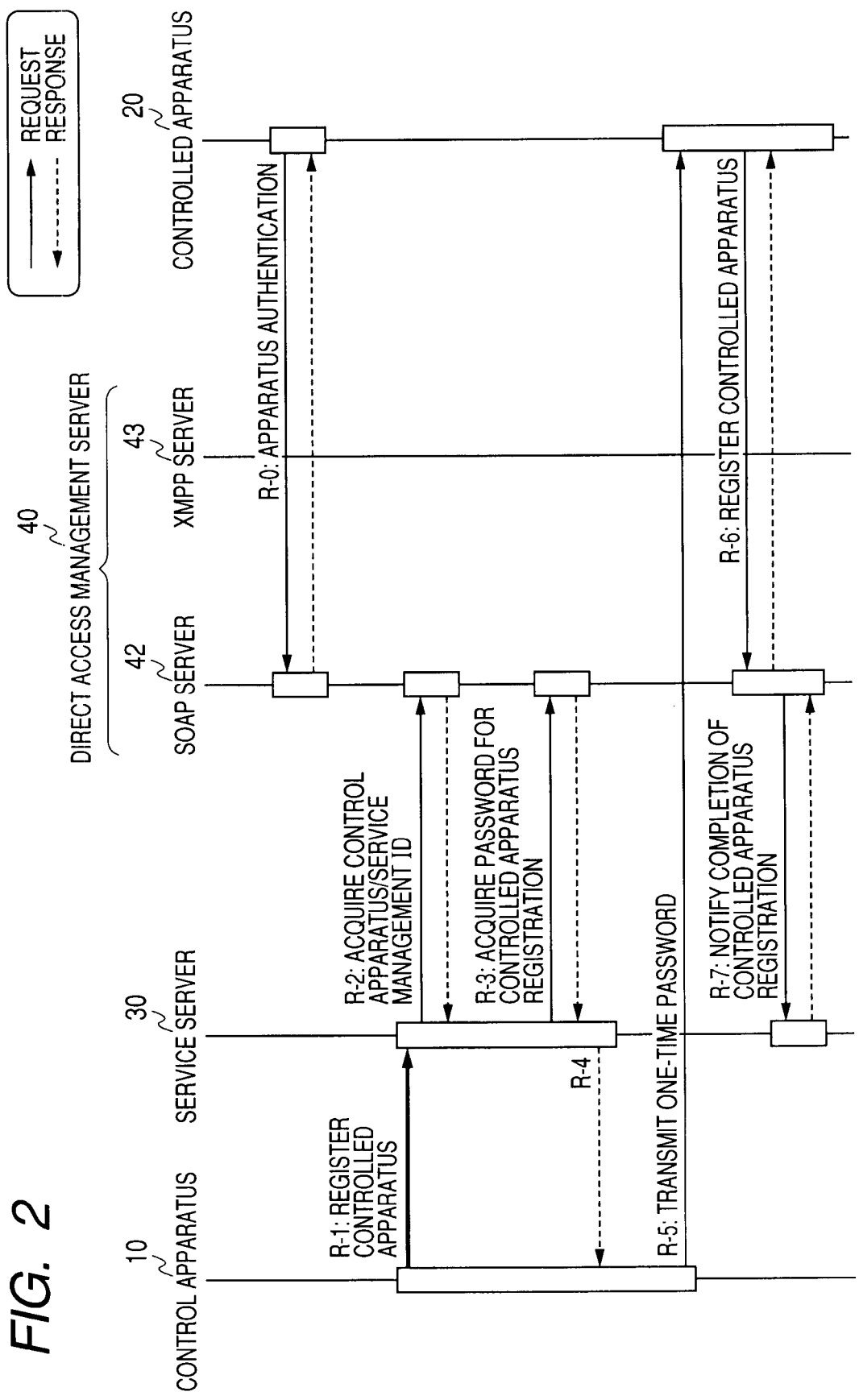

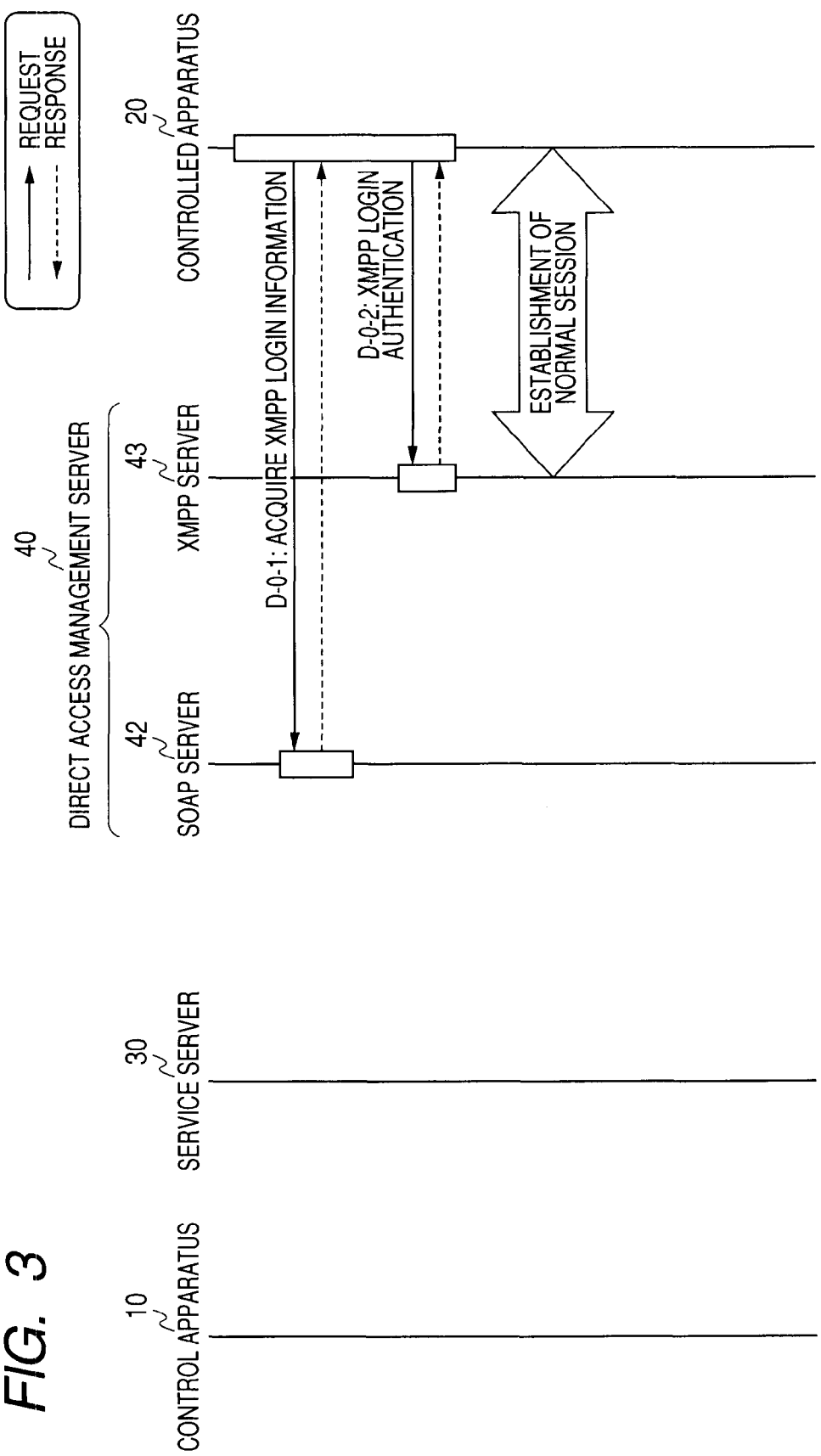

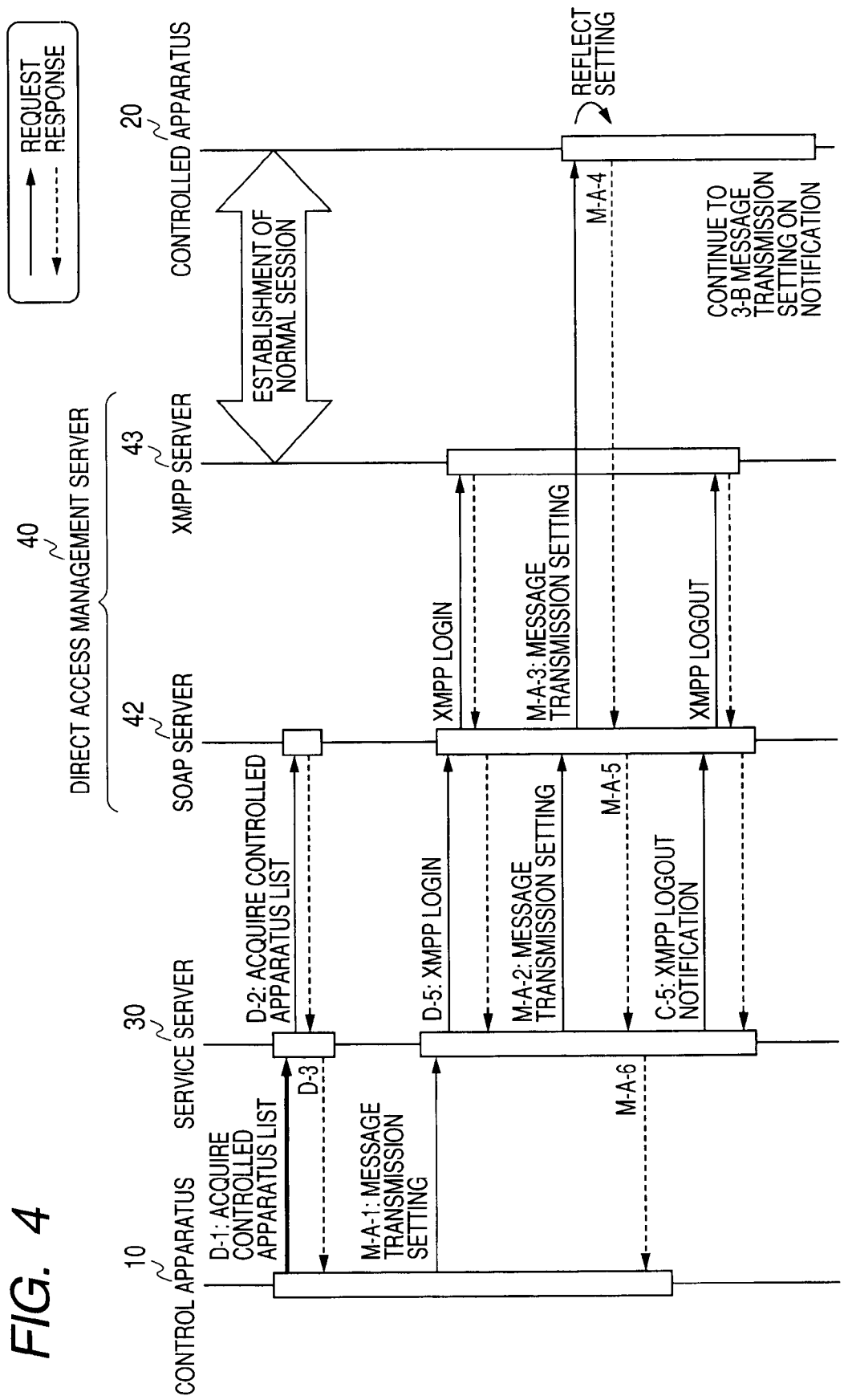

FIG. 5

| No. | INTERFACE FUNCTION OUTLINE (MAIN PARAMETERS) | PROTOCOL IN USE | ACCESS I/F |
|---|---|---|---|
| D-1: REQUEST<br>D-3: RESPONSE | ACQUIRE CONTROLLED APPARATUS LIST<br>(REQUEST: USER IDENTIFICATION INFORMATION<br>RESPONSE: CONTROLLED APPARATUS LIST) | HTTP(S) | [IF-01] |
| D-2:<br>REQUEST & RESPONSE | ACQUIRE CONTROLLED APPARATUS LIST<br>(REQUEST: SERVICE ID, DAP-ID,<br>RESPONSE: CONTROLLED APPARATUS LIST) | SOAP/HTTP(S) | [IF-02] |
| M-A-1: REQUEST<br>M-A-6: RESPONSE | MESSAGE TRANSMISSION SETTING<br>(REQUEST: USER IDENTIFICATION INFORMATION, NUMBER OF<br>CONTROLLED APPARATUS, MESSAGE TYPE,<br>MESSAGE TRANSMISSION SETTING, ADDITIONAL INFORMATION,<br>RESPONSE: CONTROLLED APPARATUS SIDE RESULT CODE) | HTTP(S) | [IF-01] |
| D-5:<br>REQUEST & RESPONSE | XMPP LOGIN<br>(REQUEST: SERVICE ID, DAP-ID, NUMBER OF CONTROLLED APPARATUS,<br>RESPONSE: XMPP SESSION ID) | SOAP/HTTP(S) | [IF-02] |
| M-A-2: REQUEST<br>M-A-5: RESPONSE | MESSAGE TRANSMISSION SETTING<br>(REQUEST: SERVICE ID, DAP-ID, XMPP SESSION ID, MESSAGE TYPE,<br>MESSAGE TRANSMISSION SETTING, ADDITIONAL INFORMATION,<br>RESPONSE: CONTROLLED APPARATUS SIDE RESULT CODE) | SOAP/HTTP(S) | [IF-02] |
| M-A-3: REQUEST<br>M-A-4: RESPONSE | MESSAGE TRANSMISSION SETTING<br>(REQUEST: MESSAGE TYPE, MESSAGE TRANSMISSION SETTING,<br>ADDITIONAL INFORMATION,<br>RESPONSE: CONTROLLED APPARATUS SIDE RESULT CODE) | XMPP EXPANSION | [IF-07] |
| C-5:<br>REQUEST & RESPONSE | XMPP LOGOUT NOTIFICATION<br>(REQUEST: SERVICE ID, DAP-ID, XMPP SESSION ID, RESPONSE: NONE) | SOAP/HTTP(S) | [IF-02] |

※ DAP-ID = CONTROL APPARATUS/SERVICE MANAGEMENT ID

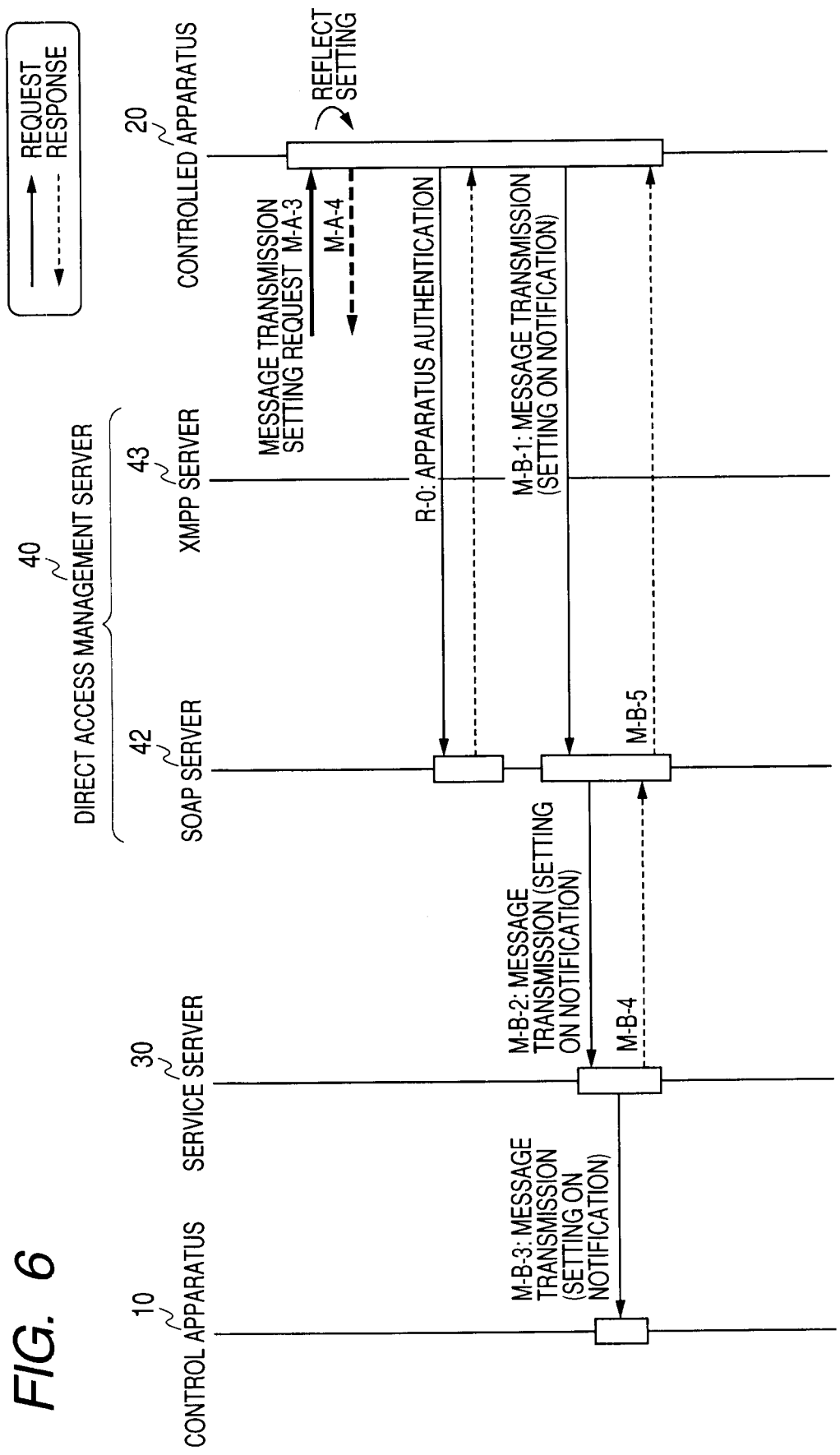

FIG. 7

| No. | INTERFACE FUNCTION OUTLINE (MAIN PARAMETERS) | PROTOCOL IN USE | ACCESS I/F |
|---|---|---|---|
| R-0: REQUEST & RESPONSE | APPARATUS AUTHENTICATION (REQUEST: APPARATUS SPECIFYING ID, RESPONSE: APPARATUS AUTHENTICATION CONTINUATION ID, APPARATUS AUTHENTICATION CONTINUATION ID TERM OF VALIDITY) | SOAP/HTTP(S) | [IF-00] |
| M-B-1: REQUEST M-B-5: RESPONSE | MESSAGE TRANSMISSION (SETTING ON NOTIFICATION) (REQUEST: APPARATUS AUTHENTICATION CONTINUATION ID, DESTINATION = {ARRAY OF DAP-IDS}, MESSAGE TYPE, MESSAGE = {NULL}, MESSAGE MODE = {ON NOTIFICATION}, MESSAGE ID RESPONSE: ARRAY OF RESPONSE CODES, ARRAY OF RESPONSE MESSAGES, ARRAY OF MESSAGE TRANSMISSION SETTINGS = {NOT DESIGNATED}, ARRAY OF ADDITIONAL INFORMATION = {NOT DESIGNATED}) | SOAP/HTTP(S) | [IF-00] |
| M-B-2: REQUEST M-B-4: RESPONSE | MESSAGE TRANSMISSION (SETTING ON NOTIFICATION) (REQUEST: TRANSMISSION SOURCE = {ARRAY OF NUMBERS OF CONTROLLED APPARATUSES, ARRAY OF CONTROLLED APPARATUS PRODUCT NAMES}, DESTINATION = {ARRAY OF DAP-IDS}, MESSAGE TYPE, MESSAGE = {NULL}, MESSAGE MODE = {ON NOTIFICATION}, MESSAGE ID RESPONSE: ARRAY OF RESPONSE CODES, ARRAY OF RESPONSE MESSAGES, ARRAY OF MESSAGE TRANSMISSION SETTINGS = {NOT DESIGNATED}, ARRAY OF ADDITIONAL INFORMATION = {NOT DESIGNATED}) | SOAP/HTTP(S) | [IF-05] |
| M-B-3 | MESSAGE TRANSMISSION (SETTING ON NOTIFICATION) (TRANSMISSION SOURCE = {CONTROLLED APPARATUS PRODUCT NAME}, DESTINATION = {EMAIL ADDRESS, ETC.}, MESSAGE = {MESSAGE TYPE AND CONTENTS INDICATING ON NOTIFICATION}) | ARBITRARY: EMAIL, RSS DELIVERY, ETC. | [IF-21] |

※ ERROR CODES ARE INCLUDED IN RESPECTIVE RESPONSES
※ DAP-ID = CONTROL APPARATUS/SERVICE MANAGEMENT ID

FIG. 9

| No. | INTERFACE FUNCTION OUTLINE (MAIN PARAMETERS) | PROTOCOL IN USE | ACCESS I/F |
|---|---|---|---|
| R-0: REQUEST & RESPONSE | APPARATUS AUTHENTICATION<br>(REQUEST: APPARATUS SPECIFYING ID,<br>RESPONSE: APPARATUS AUTHENTICATION CONTINUATION ID,<br>APPARATUS AUTHENTICATION CONTINUATION ID TERM OF VALIDITY) | SOAP/HTTP(S) | [IF-00] |
| M-C-1: REQUEST<br>M-D-5: RESPONSE | MESSAGE TRANSMISSION<br>(REQUEST: APPARATUS AUTHENTICATION CONTINUATION ID,<br>DESTINATION = {ARRAY OF DAP-IDS}, MESSAGE TYPE, MESSAGE,<br>MESSAGE MODE = {NORMAL}, MESSAGE ID<br>RESPONSE: ARRAY OF RESPONSE CODES, ARRAY OF RESPONSE<br>MESSAGES, ARRAY OF MESSAGE TRANSMISSION SETTINGS,<br>ARRAY OF ADDITIONAL INFORMATION) | SOAP/HTTP(S) | [IF-00] |
| M-C-2: REQUEST<br>M-D-4: RESPONSE | MESSAGE TRANSMISSION<br>(REQUEST: TRANSMISSION SOURCE = {ARRAY OF NUMBERS OF<br>CONTROLLED APPARATUSES, ARRAY OF CONTROLLED APPARATUS<br>PRODUCT NAMES}, DESTINATION = {ARRAY OF DAP-IDS}, MESSAGE TYPE,<br>MESSAGE, MESSAGE MODE = {NORMAL}, MESSAGE ID<br>RESPONSE: ARRAY OF RESPONSE CODES, ARRAY OF RESPONSE<br>MESSAGES, ARRAY OF MESSAGE TRANSMISSION SETTINGS,<br>ARRAY OF ADDITIONAL INFORMATION) | SOAP/HTTP(S) | [IF-05] |
| M-C-3 | MESSAGE TRANSMISSION<br>(TRANSMISSION SOURCE = {CONTROLLED APPARATUS PRODUCT NAME},<br>DESTINATION = {EMAIL ADDRESS, ETC.}, MESSAGE = {CONTENTS<br>INDICATING MESSAGE TYPE, CONTENTS OF MESSAGE}) | ARBITRARY:<br>EMAIL,<br>RSS DELIVERY,<br>ETC. | [IF-21] |

※ ERROR CODES ARE INCLUDED IN RESPECTIVE RESPONSES
※ DAP-ID = CONTROL APPARATUS/SERVICE MANAGEMENT ID

FIG. 11

| No. | INTERFACE FUNCTION OUTLINE (MAIN PARAMETERS) | PROTOCOL IN USE | ACCESS I/F |
|---|---|---|---|
| R-0: REQUEST & RESPONSE | APPARATUS AUTHENTICATION (REQUEST: APPARATUS SPECIFYING ID, RESPONSE: APPARATUS AUTHENTICATION CONTINUATION ID, APPARATUS AUTHENTICATION CONTINUATION ID TERM OF VALIDITY) | SOAP/HTTP(S) | [IF-00] |
| M-E-1: REQUEST M-E-4: RESPONSE | MESSAGE TRANSMISSION (REQUEST: APPARATUS AUTHENTICATION CONTINUATION ID, DESTINATION = {ARRAY OF DAP-IDS}, MESSAGE TYPE, MESSAGE = {NULL}, MESSAGE MODE = {URI AND OTP ACQUISITION}, MESSAGE ID RESPONSE: ARRAY OF RESPONSE CODES, ARRAY OF RESPONSE MESSAGES = {ARRAY OF SERVICE SERVER URIS (FOR CONTROLLED APPARATUS) AND OTP}, ARRAY OF MESSAGE TRANSMISSION SETTINGS = {NOT DESIGNATED}, ARRAY OF ADDITIONAL INFORMATION = {NOT DESIGNATED}) | SOAP/HTTP(S) | [IF-00] |
| M-E-2: REQUEST M-E-3: RESPONSE | MESSAGE TRANSMISSION (REQUEST: TRANSMISSION SOURCE = {ARRAY OF NUMBERS OF CONTROLLED APPARATUSES, ARRAY OF CONTROLLED APPARATUS PRODUCT NAMES}, DESTINATION = {ARRAY OF DAP-IDS}, MESSAGE TYPE, MESSAGE, MESSAGE MODE = {URI AND OTP ACQUISITION}, MESSAGE ID RESPONSE: ARRAY OF RESPONSE CODES, ARRAY OF RESPONSE MESSAGES = {ARRAY OF SERVICE SERVER URIS (FOR CONTROLLED APPARATUS) AND OTP}, ARRAY OF MESSAGE TRANSMISSION SETTINGS = {NOT DESIGNATED}, ARRAY OF ADDITIONAL INFORMATION = {NOT DESIGNATED}) | SOAP/HTTP(S) | [IF-05] |
| M-E-5: REQUEST M-E-7: RESPONSE | MESSAGE TRANSMISSION: (REQUEST: OTP, DESTINATION = {ARRAY OF DAP-IDS}, MESSAGE TYPE, MESSAGE, MESSAGE ID RESPONSE: ARRAY OF RESPONSE CODES, ARRAY OF RESPONSE MESSAGES, ARRAY OF MESSAGE TRANSMISSION SETTINGS, ARRAY OF ADDITIONAL INFORMATION) | SOAP/HTTP(S) | [IF-31] URI ACQUIRED IN M-E-4 |
| M-E-6 | MESSAGE TRANSMISSION (TRANSMISSION SOURCE = {CONTROLLED APPARATUS PRODUCT NAME}, DESTINATION = {EMAIL ADDRESS, ETC.}, MESSAGE = {CONTENTS INDICATING MESSAGE TYPE, CONTENTS OF MESSAGE}) | ARBITRARY: EMAIL, RSS DELIVERY, ETC. | [IF-21] |

※ ERROR CODES ARE INCLUDED IN RESPECTIVE RESPONSES ※ DAP-ID = CONTROL APPARATUS/SERVICE MANAGEMENT ID

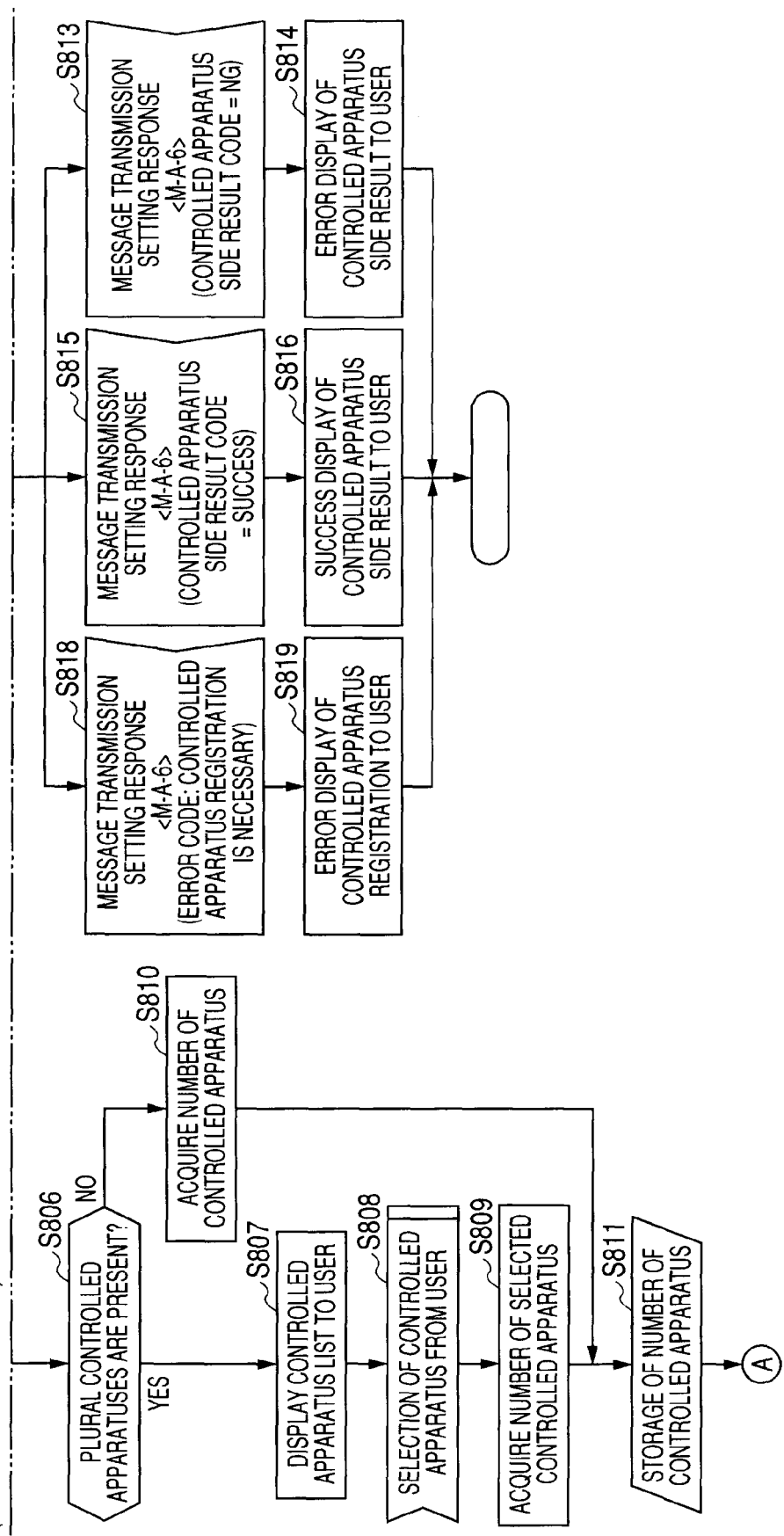

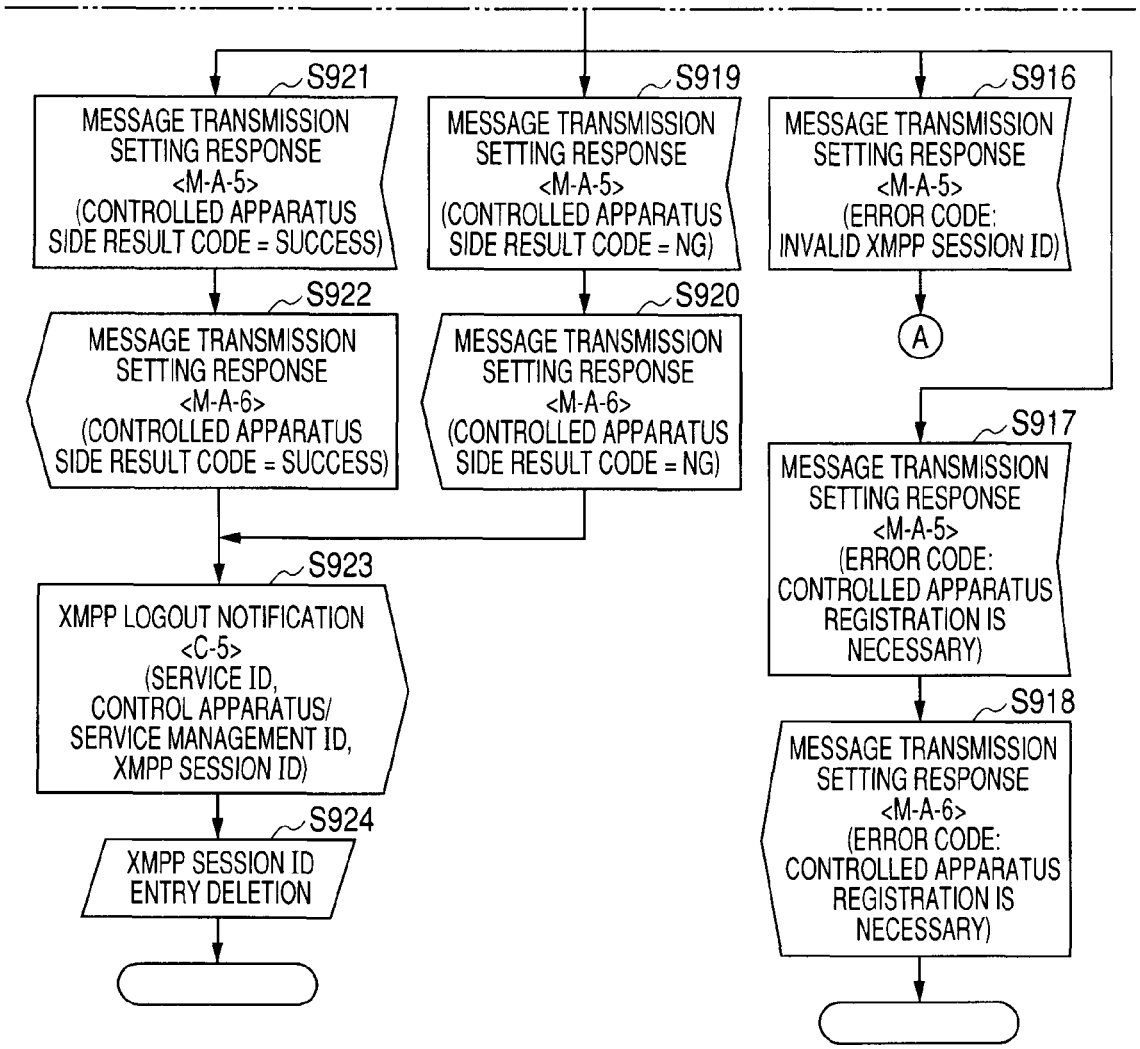

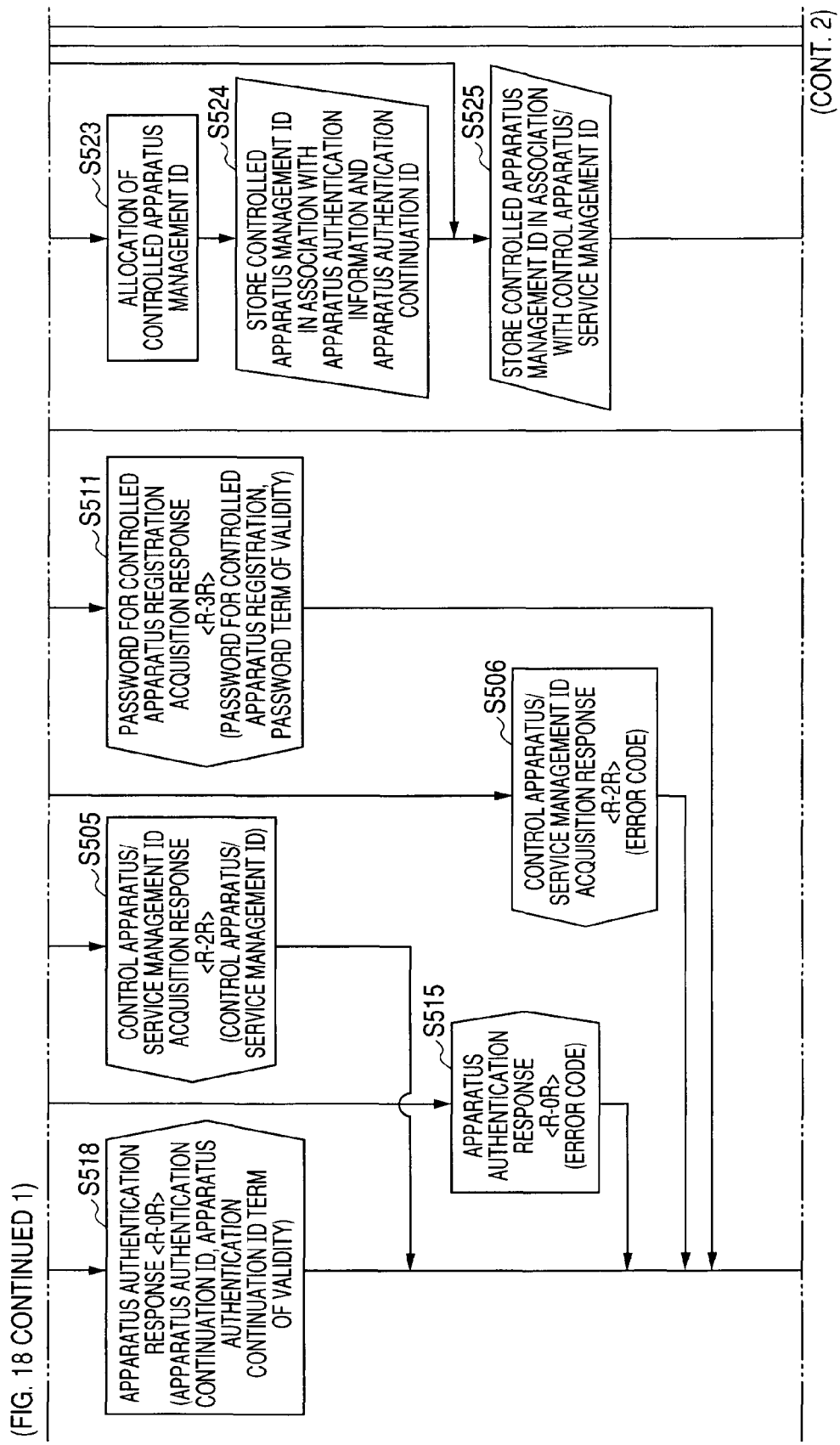

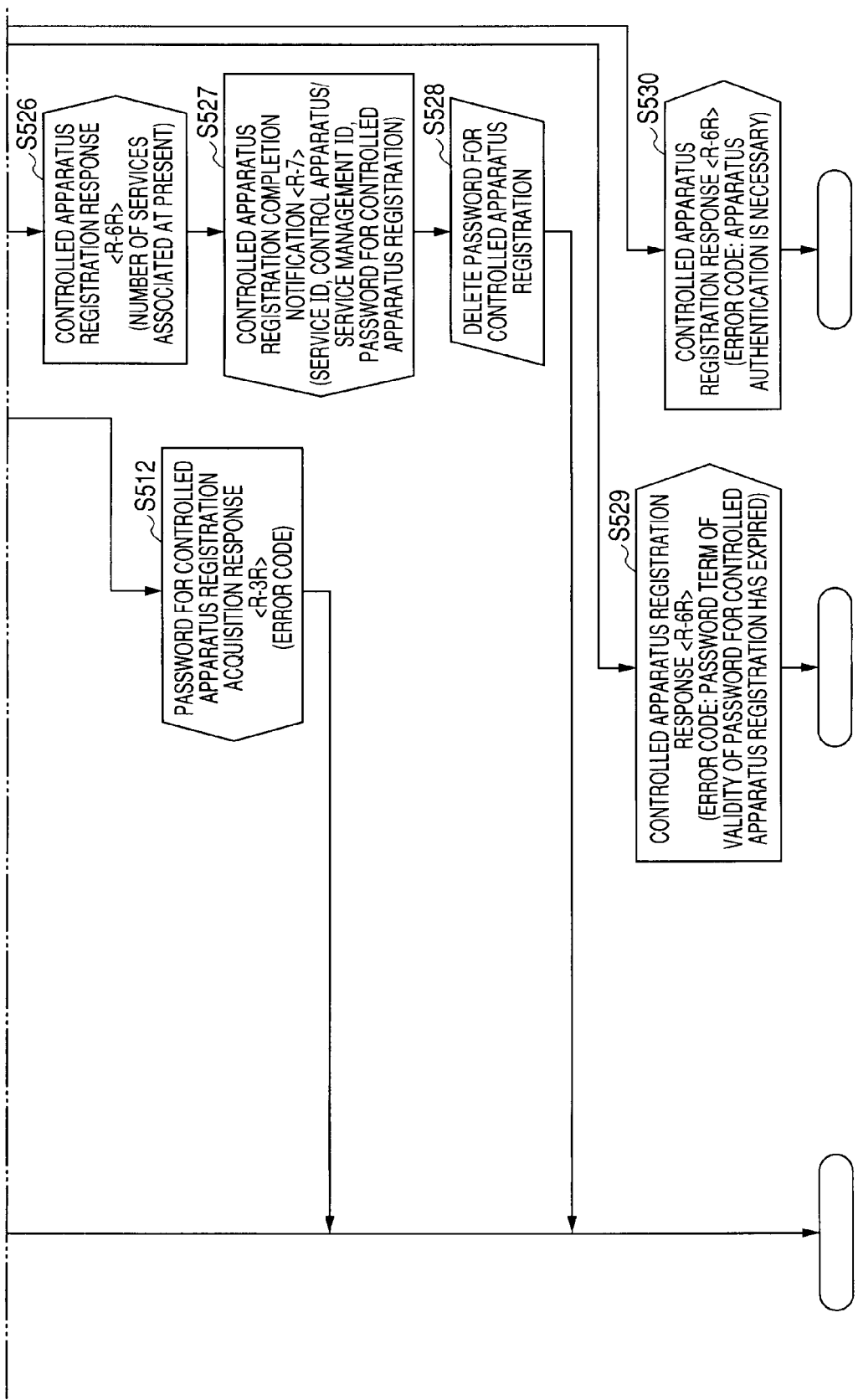

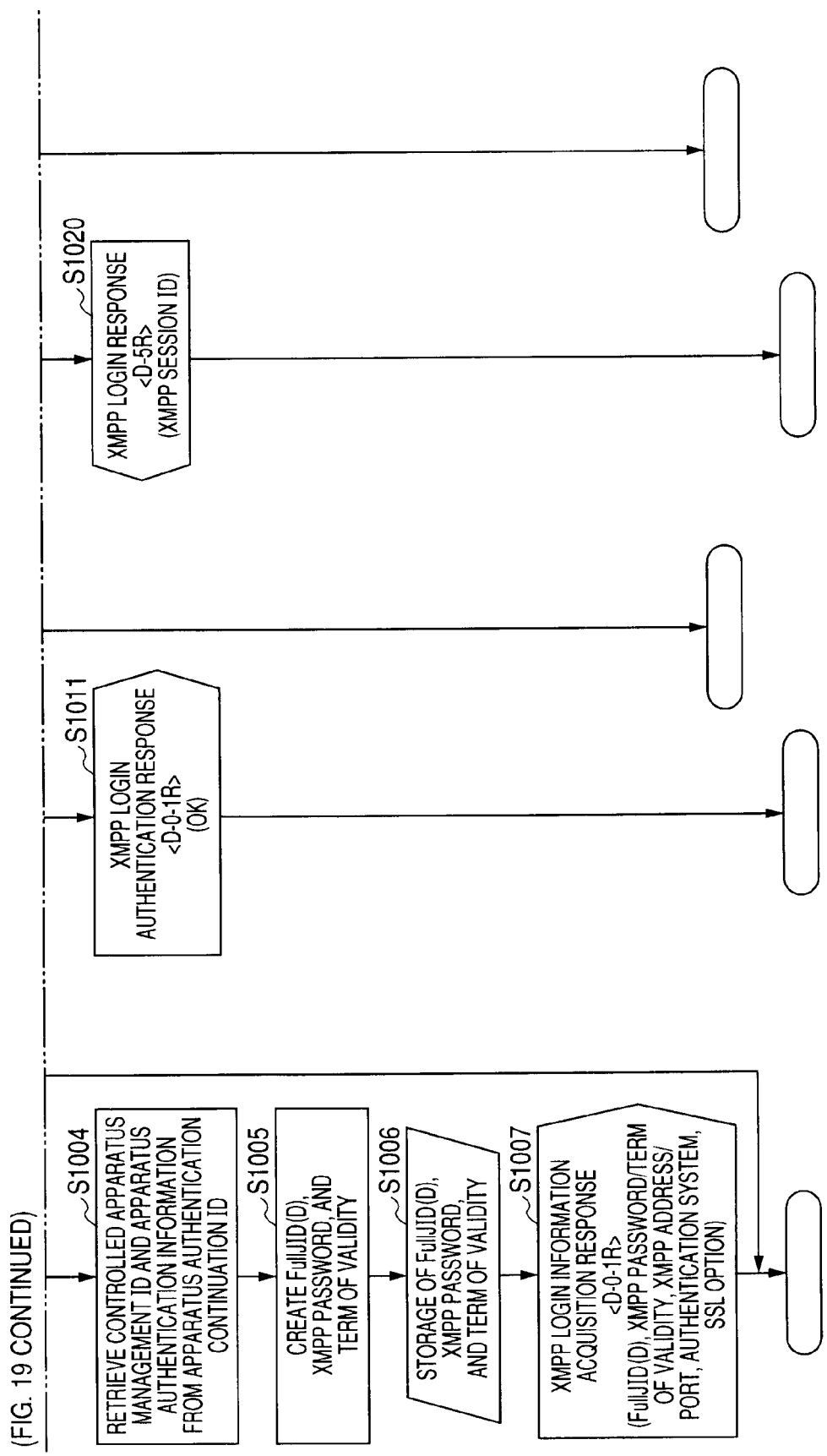

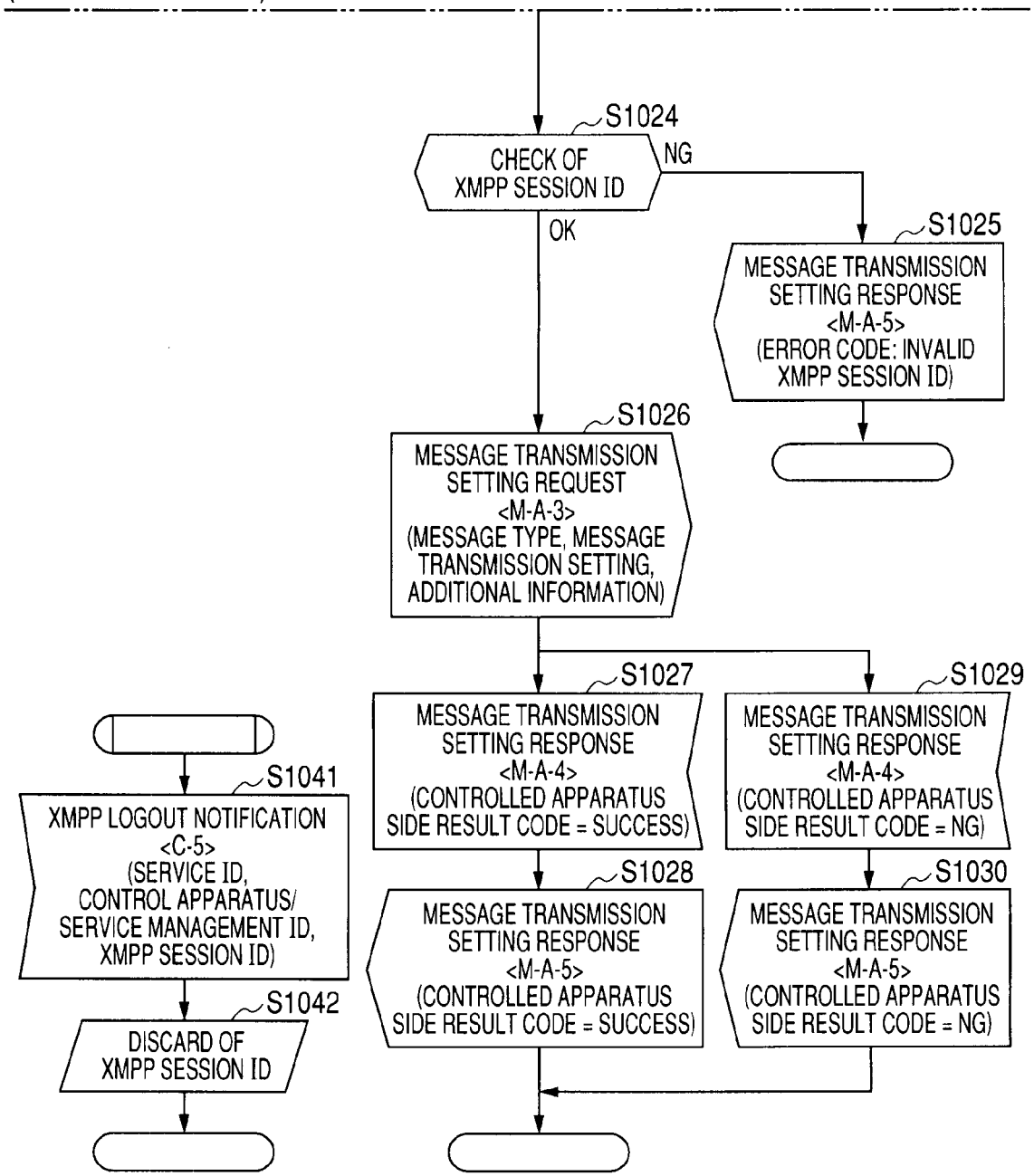

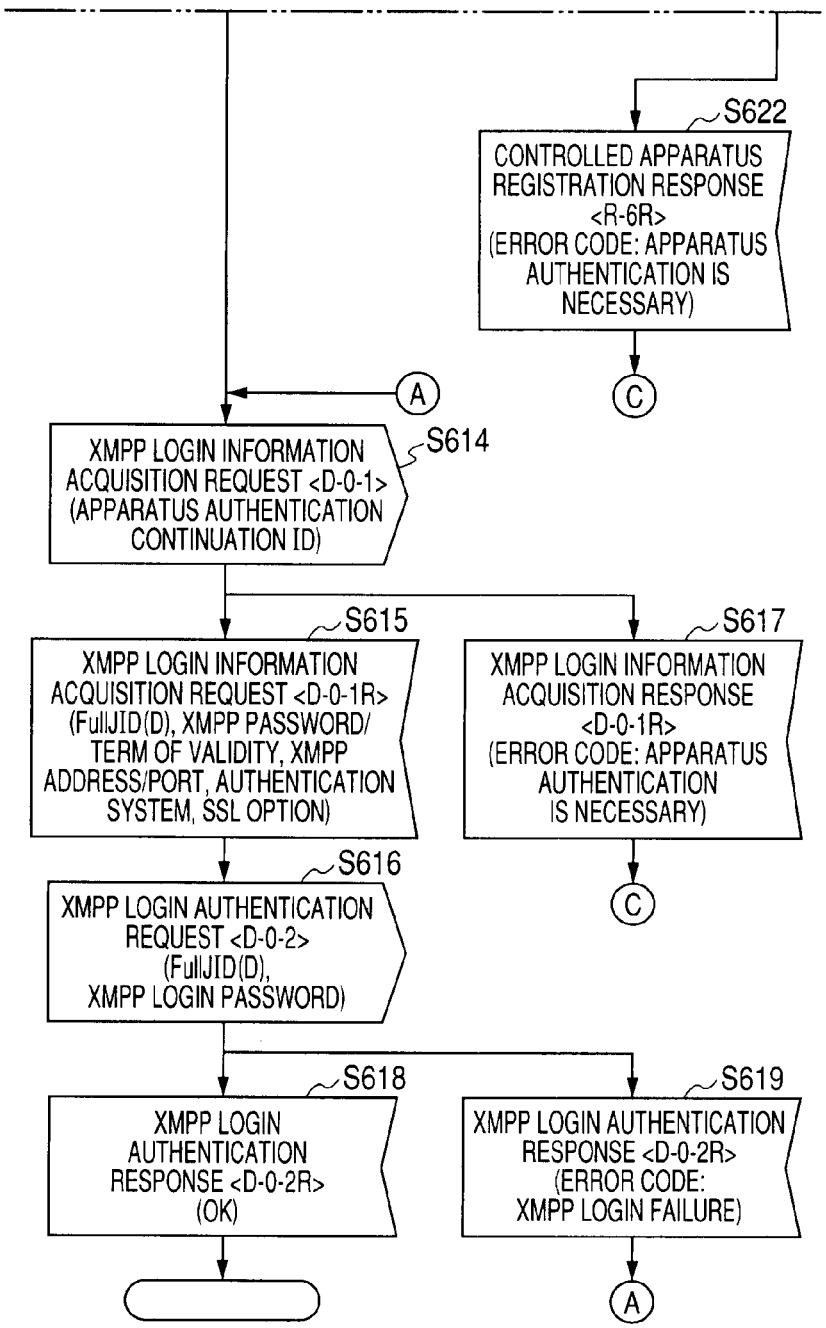

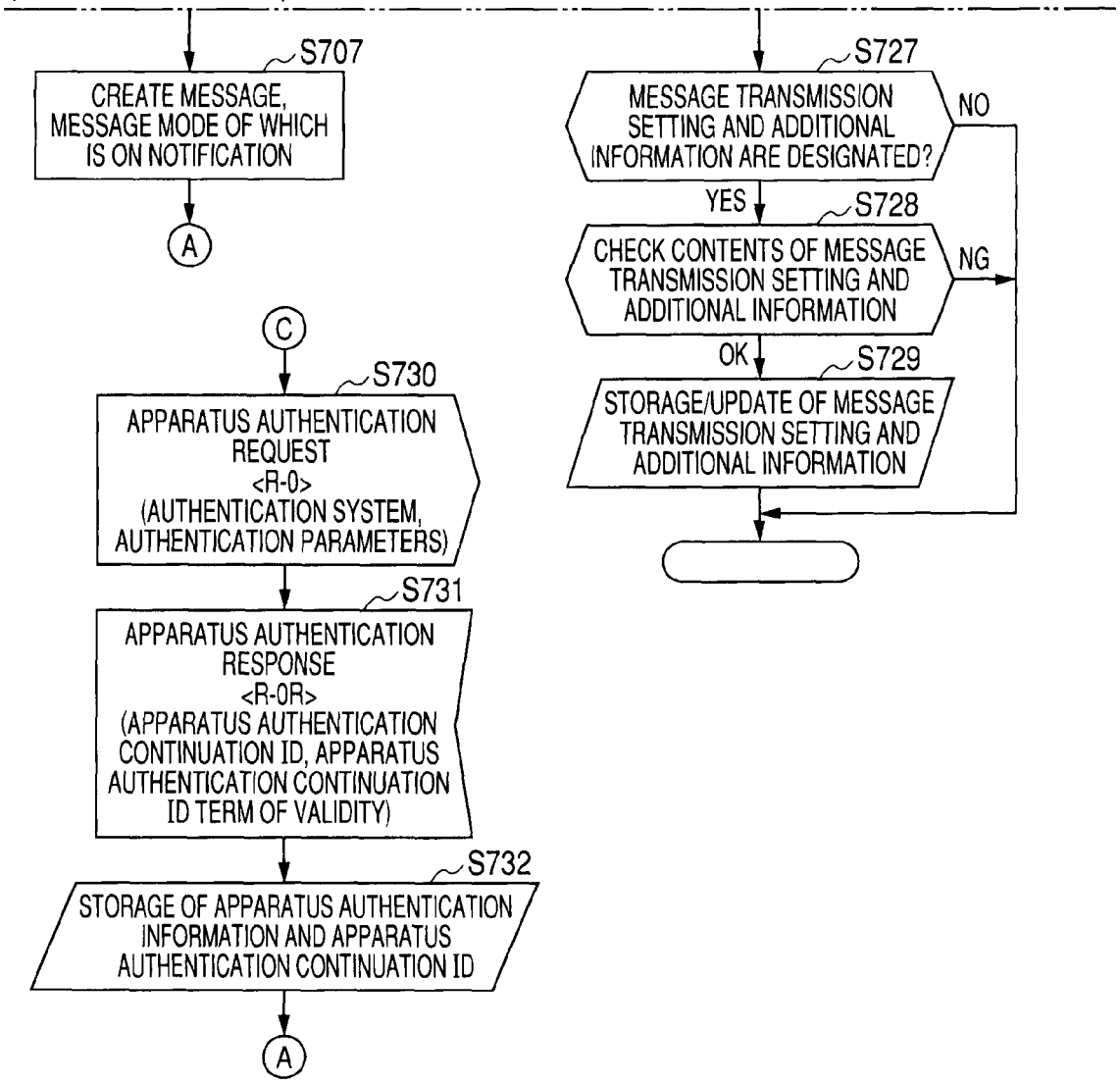

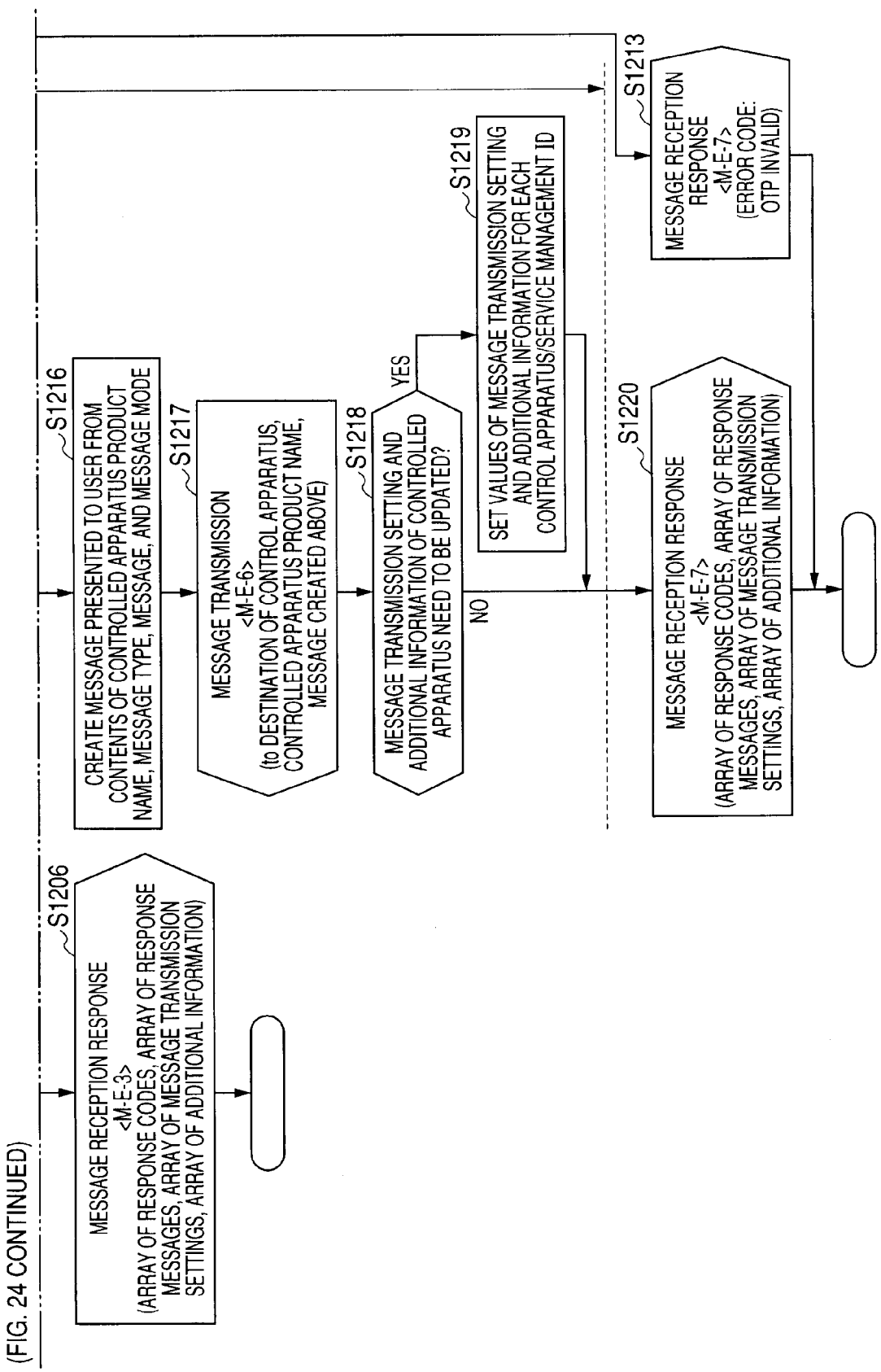

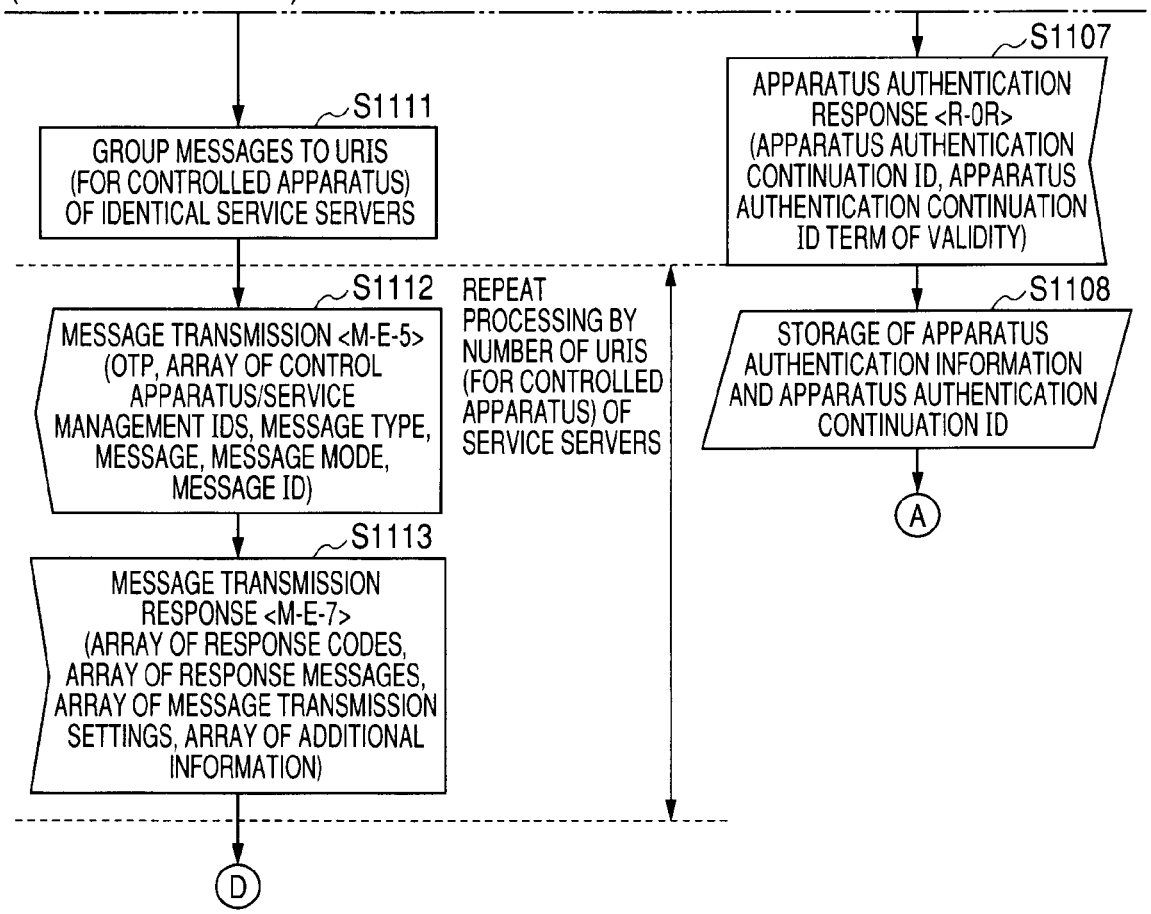

FIG. 26

Dev-ID0001@dap.sony.com/PRODUCT CODE – SERIAL NUMBER

Bare JID — Resource

Full JID (D)

FIG. 27

Dev-ID0001@dap.sony.com/CONTROL APPARATUS/SERVICE MANAGEMENT ID-01234

Bare JID — Resource

Full JID (D)

NETWORK SYSTEM, MESSAGE PROCESSING METHOD, SERVICE SERVER, DIRECT ACCESS MANAGEMENT SERVER, NETWORK HOME APPLIANCE, AND COMPUTER PROGRAM

CROSS-REFERENCES TO RELATED APPLICATIONS

The present invention contains subject matter related to Japanese Patent Application JP 2007-151632 filed in the Japanese Patent Office on Jun. 7, 2007, the entire contents of which being incorporated herein by reference.

BACKGROUND OF THE INVENTION

1. Field of the Invention

The present invention relates to a network system in which network home appliances can be controlled from terminal apparatuses through a network, a message processing method, a service server, a direct access management server, a network home appliance, and a computer program.

2. Description of the Related Art

In recent years, services for providing electronic program guides (EPGs) for, for example, broadcast programs of terrestrial analog television broadcasts, ground digital television broadcasts, CS digital broadcasts, BS digital broadcasts, and the like and so-called "network programs", which are contents provided from program delivery service sites on the Internet, have been wide spread.

As a service provided by using the EPGs, there is known a remote record scheduling service for scheduling to cause a recording and reproducing apparatus connected to a network to record contents of a broadcast program or the like selected from an EPG displayed on a display of a terminal apparatus. A server that provides this remote record scheduling service receives a request for remote record scheduling from the terminal apparatus through the network. The server transmits record scheduling information such as a channel name, a broadcast date, a broadcast start/end time, and a title of a recording object program to network home appliances such as a recording and reproducing apparatus associated with the terminal apparatus in advance. The recording and reproducing apparatus receives a broadcast program and records the broadcast program in a recording device on the basis of the record scheduling information received from the server (see, for example, JP-A-2001-309285).

A technique for notifying a portable terminal of failure alarm information of network home appliances through a network on a real time basis is described in JP-A-2005-173885 and the like.

SUMMARY OF THE INVENTION

A mechanism for notifying, when various events such as "recommended program", "record unavailable scheduling", "title recording completed", "deletion object title", "remaining capacity insufficiency alert", and "main body operation alert" occur in network home appliances such as a recording apparatus, a user of a terminal apparatus of messages concerning the events through a service server, a direct access management server, and the like is currently examined by the inventors of this application.

Such a network system is demanded to allow users of respective terminal apparatuses to receive communication of messages concerning events of types desired by the users. For example, events that occur in a recording apparatus include various events such as "recommended program", "record unavailable scheduling", "title recording completed", "deletion object title", "remaining capacity insufficiency alert", and "main body operation alert". Some user does not need to receive messages concerning all the events and may desire to receive only messages concerning specific ones among the events. However, when, for example, judgment on necessity of message transmission for each of such message types is carried out on a server side such as the direct access management server, it is likely that efficiency of the entire system falls because of an increase in burdens on the service server and the direct access management server due to message transmission processing.

As a demand on a server apparatus side that processes transmission and reception of messages such as the service server and the direct access management server, there is a need for measures for protecting the servers against the fall in processing speed due to an increase in loads at the time when transmission processing for messages is performed in a burst-like manner. When a large message is transmitted, in a mechanism in which the message reaches the terminal apparatus via both the service server and the direct access management server, loads on the servers as a whole increase and efficiency falls.

Therefore, it is desirable to provide a network system, a message processing method, a service server, a direct access management server, a network home appliance, and a computer program that can satisfactorily perform message notification concerning events from the network home appliance to a terminal apparatus without deteriorating efficiency of the entire system.

According to an embodiment of the present invention, there is provided a network system including a terminal apparatus, a network home appliance, which is a control object of the terminal apparatus, a service server that provides the terminal apparatus with a service for controlling the network home appliance through a network, and a direct access management server that performs exchange of information necessary for directly accessing the network home appliance through the network. The network home appliance includes a first storing unit that stores setting information, which is received from the direct access management server, for setting necessity of message transmission for each of control apparatus/service management IDs, which are allocated to combinations of the terminal apparatus and services, concerning an event that occurs in the network home appliance and a message transmitting unit that judges, when the event occurs, necessity of transmission of a message concerning the event on the basis of the setting information stored in the first storing unit and transmits, when the transmission is necessary, the message including the control apparatus/service management ID included in the setting information. The direct access management server includes a first message-transmission processing unit that specifies the service server on the basis of the control apparatus/service management ID included in the message received from the network home appliance and transmits the message to the service server. The service server includes a second message-transmission processing unit that specifies a destination of the terminal apparatus on the basis of the control apparatus/service management ID included in the message received from the direct access management server and transmits the message to the destination.

According to the embodiment, necessity of transmission of a message for each of event types and a control apparatus/service management ID, which is a destination when the transmission is necessary, are judged in the network home appliance. Therefore, it is possible to improve efficiency of the entire system compared with efficiency of a system in which the judgment is performed on a server side.

Preferably, the terminal apparatus includes a first message-transmission-setting processing unit that transmits a first message transmission setting request including the setting information and user identification information, which should be registered in the network home appliance, to the service server, the service server includes a second storing unit that stores the user identification information and the control apparatus/service management IDs in association with each other and a second message-transmission-setting processing unit that acquires, from the second storing unit, a control apparatus/service management ID corresponding to the user identification information included in the first message transmission setting request received from the terminal apparatus and transmits a second message transmission setting request including the control apparatus/service management ID and the setting information to the direct access management server, and the direct access management server includes a third storing unit that stores the control apparatus/service management IDs and a controlled apparatus management ID allocated to the network home appliance in association with each other and a third message-transmission-setting processing unit that acquires, from the third storing unit, a controlled apparatus management ID associated with the control apparatus/service management ID included in the second message transmission setting request received from the service server and transmits a third message transmission setting request including the setting information to the network home appliance to which the controlled apparatus management ID is allocated.

Consequently, message transmission concerning an event can be flexibly set in the network home appliance from the terminal apparatus side.

Preferably, the setting information further includes information for setting necessity of message transmission for each of event types. Consequently, necessity of message transmission for each of the event types in the network home appliance, which is a control object of the terminal apparatus, can also be set from the terminal apparatus side.

Preferably, the service server further includes a first update-information transmitting unit that generates update information for the setting information stored in the first storing unit of the network home appliance and transmits the update information to the network home appliance through the direct access management server, and the network home appliance further includes a setting-information-update processing unit that updates the setting information stored in the first storing unit on the basis of the update information. Consequently, when, for example, a service in the service server is changed, details of the change of the service can be quickly reflected on the setting information stored in the network home appliance.

Preferably, the setting information further includes a load distribution parameter for message transmission processing as additional information. Consequently, it is possible to prevent access loads in the service server and the direct access management server from increasing excessively and realize stabilization of the system. As the load distribution parameter, for example, delay time of message transmission is conceivable.

Preferably, the service server further includes a second update-information transmitting unit that generates update information for the additional information stored in the first storing unit of the network home appliance and transmits the update information to the network home appliance via the direct access management server, and the network home appliance further includes an additional-information-update processing unit that updates the additional information stored in the first storing unit on the basis of the update information. Consequently, it is possible to change delay time of message transmission according to judgment of the service server, maintain access loads in the service server and the direct access management server in a more optimum range, and realize improvement of efficiency of the system and improvement of stability of the system.

Preferably, when necessity of transmission of a message concerning an event is set by the message transmission setting request, the message transmitting unit of the network home appliance transmits completion of this setting as the message. Consequently, after the terminal apparatus transmits the message transmission setting request, it is possible to immediately confirm that the setting of message transmission is completed in the network home appliance.

Preferably, the message transmitting unit of the network home appliance judges, when an event occurs, necessity of transmission of a message concerning the event on the basis of the setting information stored in the first storing unit, transmits, when the transmission is necessary, an acquisition request for information necessary for the network home appliance to access the service server to the direct access management server as the message, and transmits the message concerning the event to the service server on the basis of information returned from the direct access management server, and the direct access management server further includes an access-information providing unit that acquires information necessary for accessing the service server, which corresponds to the control apparatus/service management ID included in the message of acquisition request from the network home appliance, from the service server and responds to the network home appliance. Consequently, it is possible to directly transmit a message concerning an event from the network home appliance to the service server without the intervention of the direct access management server and reduce a load on the direct access management server when a large message is transmitted.

Preferably, the information necessary for accessing the service server provided by the access-information providing unit of the direct access management server includes a one-time password. Consequently, it is possible to reinforce security concerning access to the service server.

According to the embodiment of the present invention, it is possible to satisfactorily perform message notification concerning events from the network home appliance to a terminal apparatus without deteriorating efficiency of the entire system.

BRIEF DESCRIPTION OF THE DRAWINGS

FIG. 2 is a sequence chart showing a flow of information in registering a combination of a control apparatus and a service and in registering a controlled apparatus in the network system shown in FIG. 1;

FIG. 3 is a sequence chart showing a flow of information concerning XMPP login of the control apparatus;

FIG. 4 is a sequence chart showing a flow of information at the time of message transmission setting;

FIG. 5 is a table in which interface functions at the time of the message transmission setting shown in FIG. 4 are summarized;

FIG. 6 is a sequence chart showing a flow of information at the time of ON notification of the message transmission setting;

FIG. 7 is a table in which interface functions at the time of the ON notification of the message transmission setting shown in FIG. 6 are summarized;

FIG. 9 is a table in which interface functions at the time of the message transmission of the event notification are summarized;

FIG. 11 is a table in which interface functions at the time of the processing of direct message transmission shown in FIG. 10 are summarized;

FIG. 26 is a diagram showing the structure of a Full JID; and

FIG. 27 is a diagram showing another structure of the Full JID.

DESCRIPTION OF THE PREFERRED EMBODIMENTS

Embodiments of the present invention will be hereinafter explained with reference to the accompanying drawings.

Figure 1:
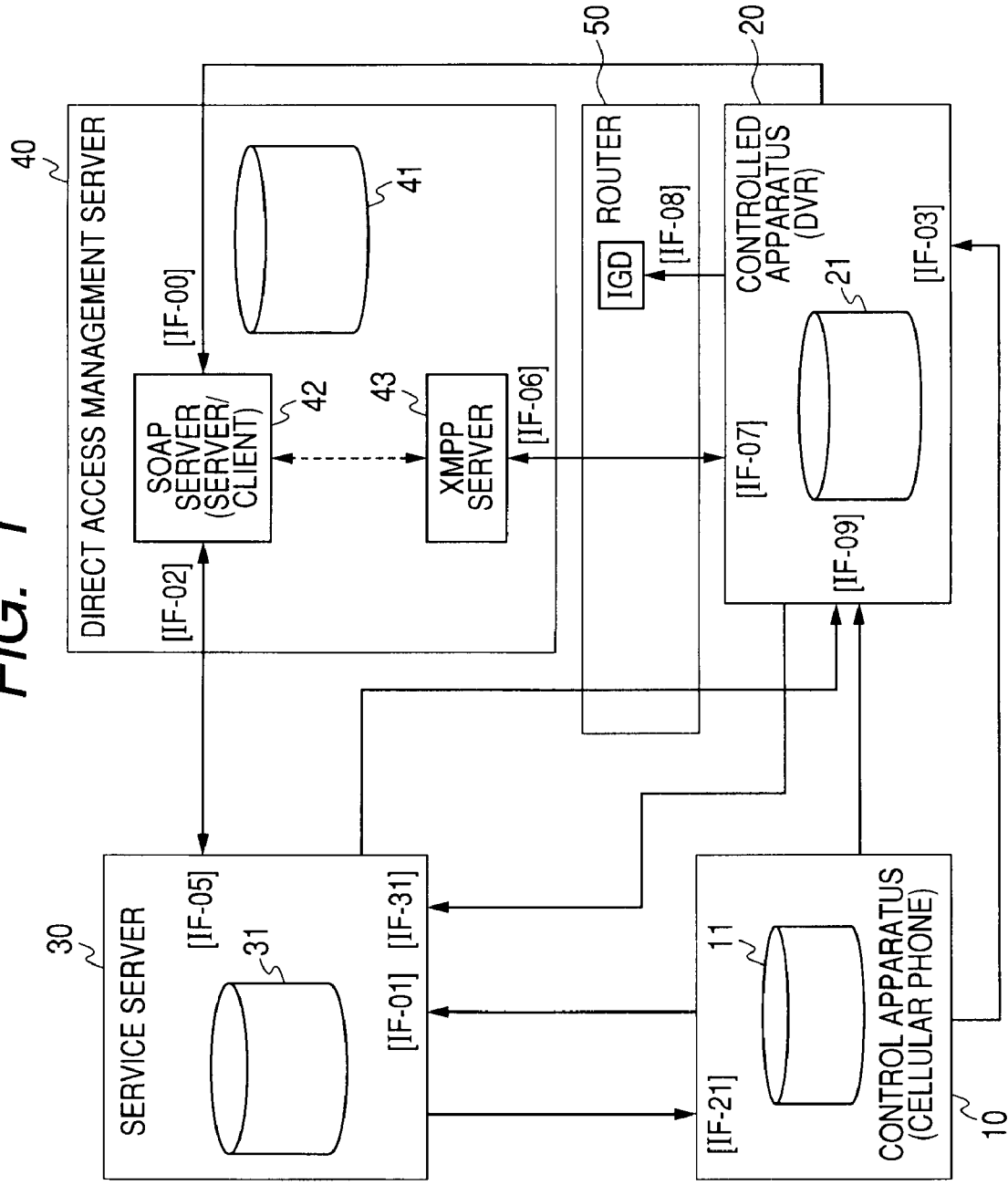
FIG. 1 is a diagram showing an overall configuration of a network system according to an embodiment of the present invention.

FIG. 1 is a diagram showing an overall configuration of a network system according to an embodiment of the present invention.

The network system includes a control apparatus 10 such as a cellular phone serving as a terminal apparatus, a controlled apparatus 20 such as a DVR (Digital Video Recorder) serving as a network home appliance, a service server 30, a direct access management server 40, and a router 50.

The control apparatus 10 operates as an apparatus that controls the controlled apparatus 20. The control apparatus 10 may be any control apparatus as long as the control apparatus can control the controlled apparatus 20. The control apparatus 10 may be, for example, a PC (Personal Computer) or a PDA (Personal Digital Assistant).

The control device 10 includes a main memory that stores programs and the like, a CPU (Central Processing Unit) that executes the programs stored in the main memory and performs various kinds of arithmetic processing, an interface unit for interfacing with a network, an interface unit for interfacing with the DVR 20, a user interface unit such as a key input unit and a display unit, and a nonvolatile storing unit 11. In the nonvolatile storing unit 11, user identification information registered in the control apparatus 10 is stored. In the main memory, programs and the like for performing processing concerning registration of the controlled apparatus 20, message transmission setting, and the like are stored.

The controlled apparatus 20 includes, besides a recording and reproducing function unit that records contents such as broadcast programs in a medium and reproduces the contents, a main memory that stores programs and the like, a CPU that executes the programs stored in the main memory and performs various kinds of arithmetic processing, an interface unit for interfacing with the network, an interface unit for interfacing with the control apparatus 10, a nonvolatile storing unit 21, a remote control receiving unit, and an interface unit for connecting a TV and the like. In the storing unit 21, apparatus authentication information fixedly allocated to the controlled apparatus 20 is stored in advance. In the memory, besides a program for controlling the recording and reproducing function unit of the controlled apparatus 20, programs and the like for performing processing concerning registration of a controlled apparatus in the direct access management server 40, message transmission setting, and message transmission are stored. In this embodiment, the controlled apparatus 20 is referred to as controlled apparatus. However, the controlled apparatus 20 may be any apparatus as long as the apparatus has a network connection function. The controlled apparatus 20 may be, for example, a television.

The service server 30 is a server that provides the control apparatus 10 with various services for accessing the controlled apparatus 20 through the network and receives a message from the controlled apparatus 20 and notifies the control apparatus 10 of the message. The service server 30 is realized by using, for example, a standard computer system including an input unit such as a keyboard and a mouse, a display unit, a main memory that stores programs and the like, a CPU that executes the programs stored in the main memory and performs various kinds of arithmetic processing, a communication unit for communication with the network, and a storing unit 31. In the main memory, besides a basic program necessary for causing the computer system to operate, for example, a program necessary for executing a service is stored. In the storing unit 31, for each of services provided by the service server 30, a service ID for identifying a service server and the service is stored.

The direct access management server 40 is a server that manages correspondence between a combination of the control apparatus 10 and a service of the service server 30 and the controlled apparatus 20. The direct access management server 40 is realized by using, for example, a standard computer system including an input unit such as a keyboard and a mouse, a display unit, a main memory that stores programs and the like, a CPU that executes the programs stored in the main memory and performs various kinds of arithmetic processing, an interface unit for interfacing with the network, and a storing unit 41. In the main memory, besides a basic program necessary for causing the computer system to operate, for example, a program for causing the computer system to function as a direct access management server is stored.

In the direct access management server 40, a SOAP (Simple Object Access Protocol) server 42 and an XMPP (extensible Messaging and Presence Protocol) server 43 are provided. The SOAP server 42 is a server for performing processing concerning registration of a combination of the control apparatus 10 and a service, registration of the controlled apparatus 20, exchange of information for performing direct access to the service server 30, and the like and processing for transferring a message received from the controlled apparatus 20 to the service server 30. The XMPP server 43 is a server for setting a bidirectional normal connection session between the server and the controlled apparatus 20. The SOAP server and the XMPP server are only example. The SOAP server can be replaced with another server employing an API access method and the XMPP server can be replaced with another server employing an IM method.

The interfaces of the respective apparatuses are explained. In FIG. 1, [FI-**] indicates an interface number.

The SOAP server 42 in the direct access management server 40 includes an interface [IF-02] accessed from the service server 30 and an interface [IF-00] accessed from the controlled apparatus 20. The SOAP server 42 also has a SOAP client function and performs access to an interface [IF-05] on the service server 30 side. An interface of the XMPP server 43 is accessed from an XMPP client when an XMPP session is established. In this example of the system configuration, an interface [IF-06] accessed from the controlled apparatus 20 corresponds to this interface. Since messages can be exchanged bi-directionally using the interface [IF-06] after the XMPP session establishment, the XMPP server 43 can also access an interface [IF-07] of the controlled apparatus 20.

The service server 30 includes an interface [IF-01] accessed from the control apparatus 10, the interface [IF-05] accessed from the direct access management server 40, and an interface [IF-31] accessed from the controlled apparatus 20.

In this example of the system configuration, the service server 30 does not directly interface with the XMPP server 43 in the direct access management server 40. It goes without saying that the service server 30 may directly interface with the XMPP server 34.

The control apparatus 10 includes an interface [IF-21] accessed from the service server 30.

The controlled apparatus 20 includes the interface [IF-07] after the XMPP session establishment accessed from the direct access management server 40, an interface [IF-03] for transmitting and receiving data with an infrared ray, a USB (Universal Serial Bus), or the like between the controlled apparatus 20 and the control apparatus 10, and an interface [IF-09] corresponding to a direct access URI accessed from the service server 30 or the control apparatus 10.

The router 50 includes an interface [IF-08] having a UPnP (Universal Plug and Play) IGD (Internet Gateway Device) function accessed from the controlled apparatus 20.

Operations of the network system according to this embodiment are explained. In the following explanation, <X-XX> indicates a request and <X-XXR> indicates a response to <X-XX>.

1. Registration of the Control Apparatus/a Service and the Controlled Apparatus

First, an operation for associating a control apparatus/service management ID issued for each combination of the control apparatus 10 and a service and a controlled apparatus management ID uniquely issued to each controlled apparatus 20 in the direct access management server 40 is explained.

Figure 12:
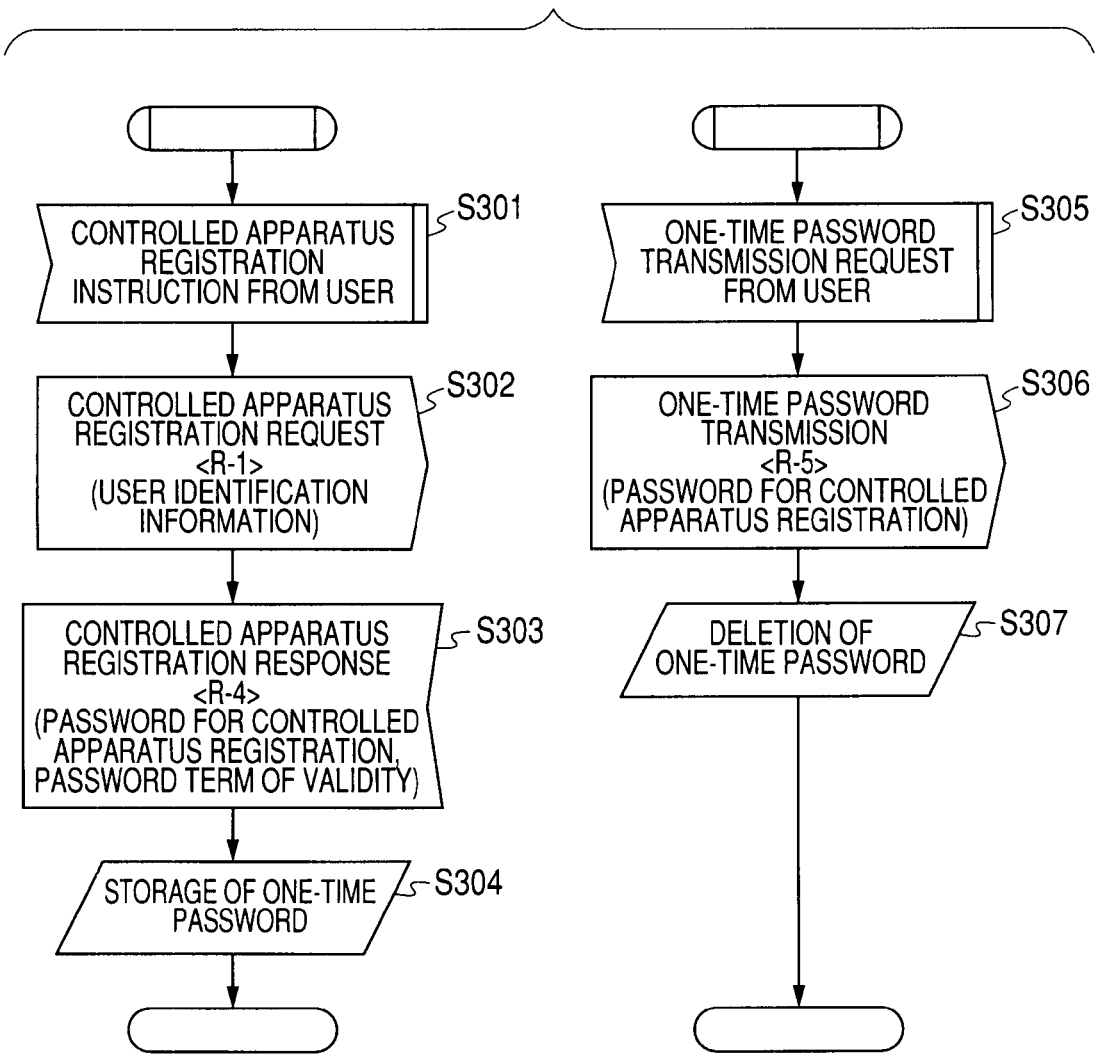
FIG. 12 is a flowchart showing operations of the control apparatus at the time of registration of a controlled apparatus.
Figure 14:
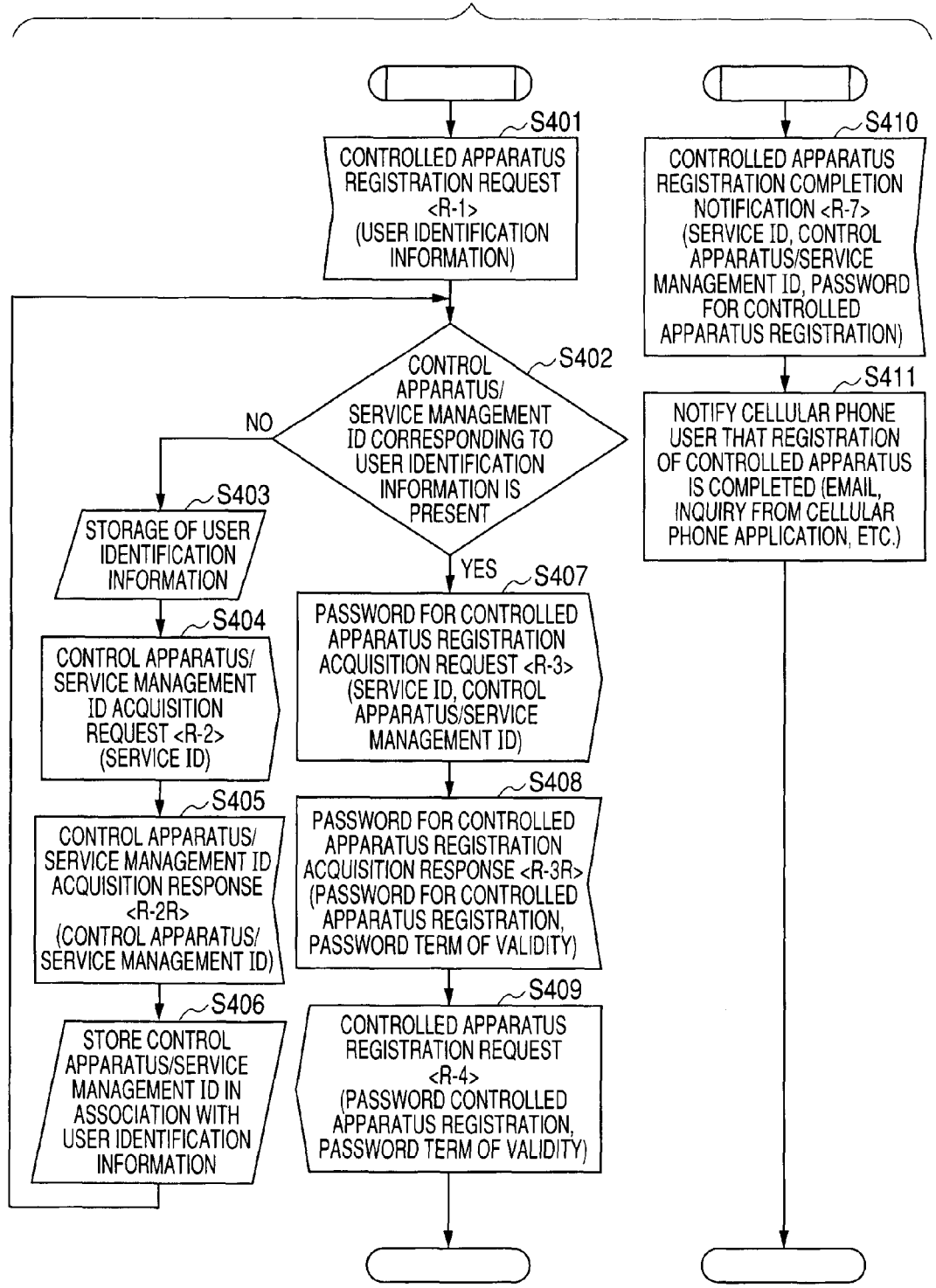
FIG. 14 is a flowchart showing operations of the service server at the time of registration of a controlled apparatus.
Figure 18:
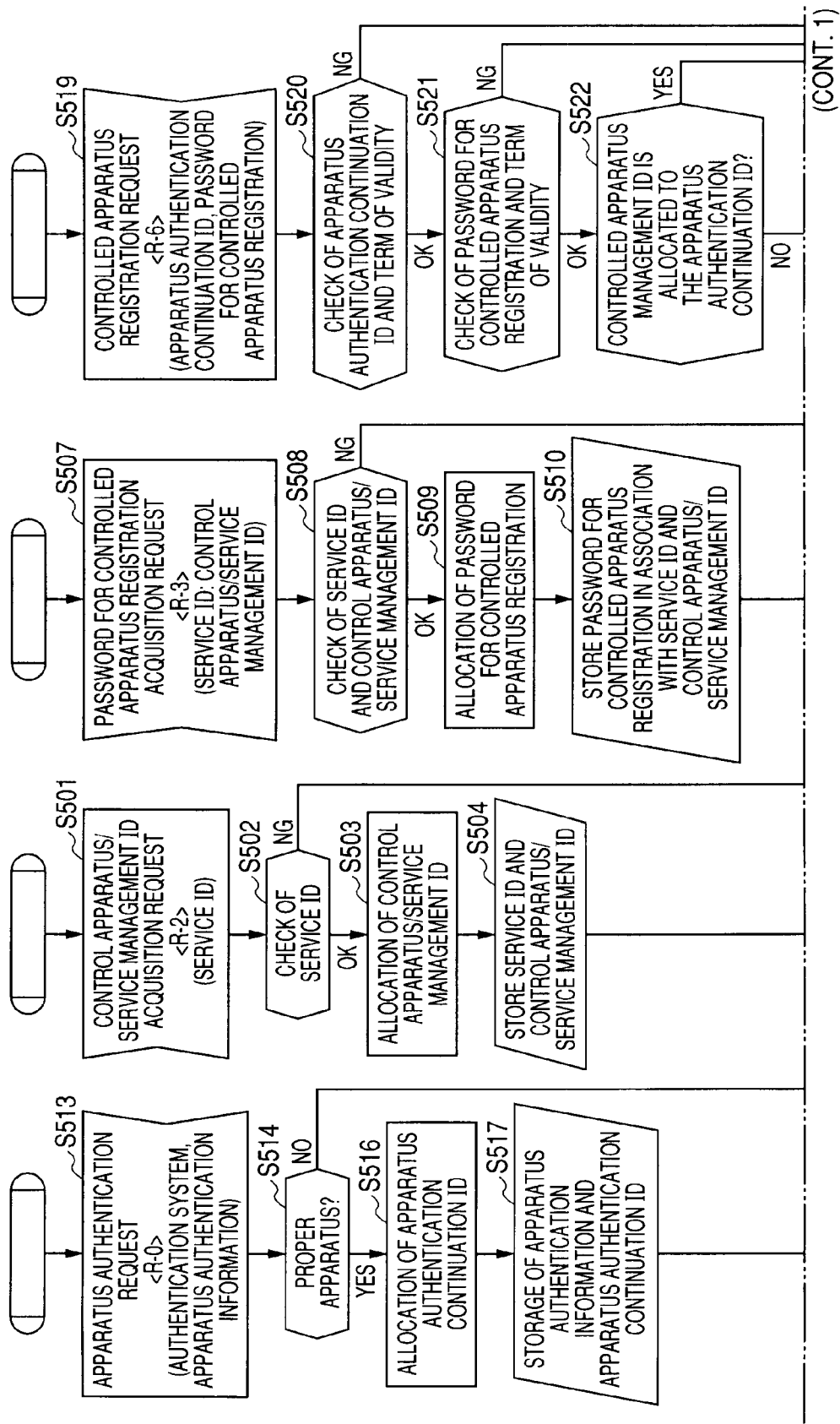
FIG. 18 is a flowchart showing operations of a direct access management server at the time of registration of a controlled apparatus.
Figure 22:
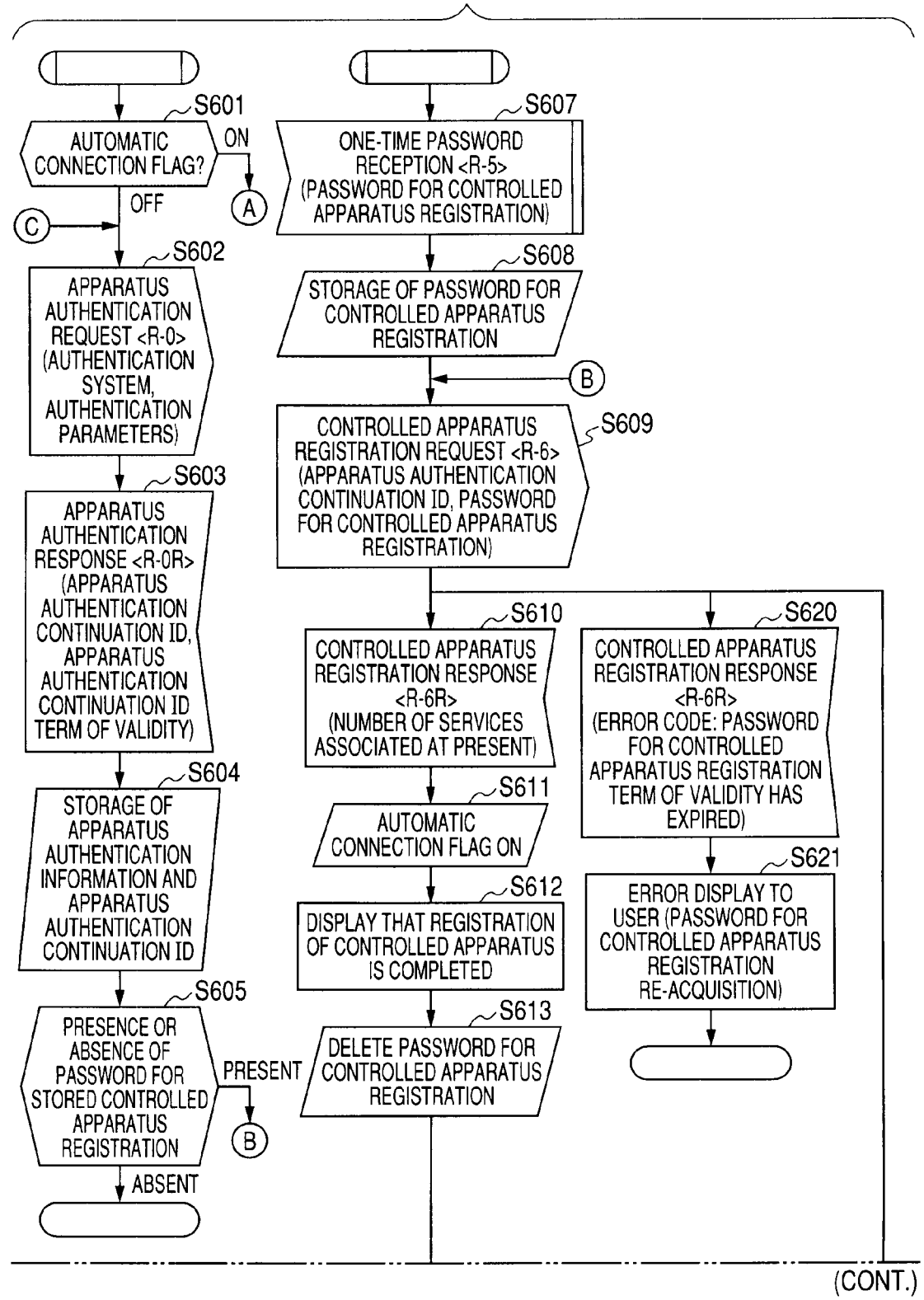
FIG. 22 is a flowchart showing operations of a controlled apparatus at the time of registration of the controlled apparatus.

FIG. 2 is a sequence chart showing a flow of information in registering a combination of the control apparatus 10 and a service and registering the controlled apparatus 20. FIG. 12 is a flowchart showing operations of the control apparatus 10 at the time of the registration of the controlled apparatus 20. FIG. 14 is a flowchart showing operations of the service server 30 at the time of the registration of the controlled apparatus 20. FIG. 18 is a flowchart showing operations of the direct access management server 40 at the time of registration of the controlled apparatus 20. FIG. 22 is a flowchart showing operations of the controlled apparatus 20 at the time of registration of the controlled apparatus 20.

1-1. Registration of a Combination of the Control Apparatus and a Service

First, the control apparatus 10 receives an instruction for registering a controlled apparatus from a user (FIG. 12: step S301) and issues a controlled apparatus registration request <R-1> including user identification information to the service server 30 (FIG. 12: step S302).

The service server 30 receives the controlled apparatus registration request <R-1> including the user identification information (FIG. 14: step S401). The service server 30 judges whether a control apparatus/service management ID corresponding the user identification information is stored in the storing unit 31 (FIG. 14: step S402).

When the control apparatus/service management ID corresponding to the user identification information is not stored, the service server 30 stores the user identification information in the storing unit 31 (FIG. 14: step S403). The service server 30 issues a control apparatus/service management ID acquisition request <R-2> including a service ID allocated to the service server 30 itself in advance to the SOAP server 42 in the direct access management server 40 (FIG. 14: step S404). The control apparatus/service management ID is an ID uniquely allocated to a combination of each of services provided by service providers and the control apparatus.

The SOAP server 42 receives the control apparatus/service management ID acquisition request <R-2> (FIG. 18: step S501). The SOAP server 42 checks whether the service ID included in the control apparatus/service management ID acquisition request <R-2> coincides with a service ID registered in the storing unit 41 of the direct access management server 40 in advance (FIG. 18: step S502). When the service IDs do not coincide with each other, the SOAP server 42 transmits an error code indicating that a service ID is not registered in the service server 40 to the service server 30 as a control apparatus/service management ID acquisition response <R-2R> (FIG. 18: step S506). When the service IDs coincide with each other, the SOAP server 42 issues a new control apparatus/service management ID (FIG. 18: step S503), registers a correspondence relation between the control apparatus/service management ID and the service ID in the storing unit 41 (FIG. 18, step S504), and transmits the control apparatus/service management ID to the service server 30 as the control apparatus/service management ID acquisition response <R-2R> (FIG. 18: step S505). Consequently, the direct access management server 40 can identify a control side viewed from the direct access management server 40 as a combination of the control apparatus 10 and a service of the service server 30 used by the control apparatus 10.

The direct access management server 40 stores and manages location information such as a URI of the service server 30 in the storing unit 41 in association with the control apparatus/service management ID and the service ID.

The service server 30 receives the control apparatus/service management ID as the control apparatus/service management ID acquisition response <R-2R> (FIG. 14: step S405). The service server 30 registers the control apparatus/service management ID in the storing unit 31 in association with the user identification information (FIG. 14: step S406). Since the control apparatus/service management ID is stored in association with the user identification information, when the service server 30 is accessed from the control apparatus 10 after that, the service server 30 requests the direct access management server 40 to perform processing using the control apparatus/service management ID corresponding to the user identification information of the control apparatus 10. In this way, the service server 30 can cause the direct access management server 40 to uniquely identify a control request source as a control side including a combination of the control apparatus 10 and a service of the service server 30.

After the control apparatus/service management ID is registered in the storing unit 31 in association with the user identification information or the control apparatus/service management ID corresponding to the user identification information included in the controlled apparatus registration request <R-1> received from the control apparatus 10 is registered in the storing unit 31, the service server 30 issues a controlled apparatus registration password acquisition request <R-3> including the control apparatus/service management ID and the service ID to the SOAP server 42 in the direct access management server 40 (FIG. 14: step S407).

The SOAP server 42 in the direct access management server 40 receives the controlled apparatus registration password acquisition request <R-3> (FIG. 18: step S507). The SOAP server 42 judges whether a combination of the control apparatus/service management ID and the service ID included in the request is registered in the storing unit 41 (FIG. 18: step S508). When the combination is not registered, the SOAP server 42 transmits an error code indicating that the combination of the control apparatus/service management ID and the service ID is not registered to the service server 30 as a controlled apparatus registration password acquisition response <R-3R> (FIG. 18: step S512). When the combination of the control apparatus/service management ID and the service ID included in the controlled apparatus registration password acquisition request <R-3> is already registered in the storing unit 41, the SOAP server 42 generates a controlled apparatus registration password anew (FIG. 18: step S509). The SOAP server 42 registers the controlled apparatus registration password and information concerning a term of validity determined for the controlled apparatus registration password in the storing unit 41 in association with the control apparatus/service management ID and the service ID included in the controlled apparatus registration password acquisition request <R-3> (FIG. 18: step S510). After this, the SOAP server 42 transmits the controlled apparatus registration password and the information concerning the term of validity of the controlled apparatus registration password to the service server 30 as the controlled apparatus registration password acquisition response <R-3R> (FIG. 18: step S511).

The service server 30 receives the controlled apparatus registration password acquisition response <R-3R> (FIG. 14: step S408). The service server 30 transmits the controlled apparatus registration password and the information concerning the term of validity thereof included in the controlled apparatus registration password acquisition response <R-3R> to the control apparatus 10 as a controlled apparatus registration response <R-4> (FIG. 14: step S409).

The control apparatus 10 receives the controlled apparatus registration response <R-4> (FIG. 12: step S303). The control apparatus 10 stores the controlled apparatus registration password and the information concerning the term of validity thereof in the storing unit 11 (FIG. 12: step S304).

Consequently, the processing for registering a control apparatus/service management ID corresponding to the combination of the control apparatus 10 and a service and the processing for issuing a controlled apparatus registration password used for associating the controlled apparatus 20 with the control apparatus 10 are completed.

1-2. Registration of the Controlled Apparatus

Operations at the time of registration of the controlled apparatus 20 are explained.

The controlled apparatus 20 performs apparatus authentication for the controlled apparatus 20 itself in the direct access management server 40 as described below before the controlled apparatus 20 is used by the user.

First, the controlled apparatus 20 checks a value of an automatic connection flag (FIG. 22: step S601). The value of the automatic connection flag is OFF before the controlled apparatus 20 is registered in the direct access management server 40. In this case, the controlled apparatus 20 transmits an apparatus authentication request <R-0> including information concerning an authentication system and apparatus authentication information set in the controlled apparatus 20 itself in advance to the SOAP server 42 in the direct access management server 40 (FIG. 22: step S602).

The SOAP server 42 in the direct access management server 40 receives the apparatus authentication request <R-0> from the controlled apparatus 20 (FIG. 18: step S513). The SOAP server 42 judges whether the controlled apparatus 20 is a proper apparatus on the basis of the information concerning an authentication system and the apparatus authentication information included in the apparatus authentication request <R-0> (FIG. 18: step S514). When it is judged that the controlled apparatus 20 is an improper apparatus, i.e., for example, when the authentication system is different from an authentication system determined in advance or when the apparatus authentication information is different from a format of the authentication system determined in advance, the SOAP server 42 transmits an error code to the controlled apparatus 20 as an apparatus authentication response <R-0R> (FIG. 18: step S515). When it is judged that the controlled apparatus 20 is the proper apparatus, i.e., when the authentication system coincides with the authentication system determined in advance and the apparatus authentication information is the format of the authentication system determined in advance, the SOAP server 42 generates an apparatus authentication continuation ID allocated to the controlled apparatus 20 (FIG. 18: step S516) and stores the apparatus authentication continuation ID and the apparatus authentication information included in the apparatus authentication request <R-0> in the storing unit 41 in association with each other (FIG. 18: step S517). Thereafter, the SOAP server 42 transmits the generated apparatus authentication ID and information including a term of validity thereof to the controlled apparatus 20 (FIG. 18: step S518). The apparatus authentication continuation ID is identification information allocated to an apparatus for which apparatus authentication is completed in the direct access management server 40. The direct access management server 40 can check an apparatus authentication situation of the controlled apparatus 20 according to the authentication information.

The controlled apparatus 20 receives the apparatus authentication response <R-0R> including the apparatus authentication continuation ID and the information concerning the term of validity thereof from the SOAP server 42 in the direct access management server 40 (FIG. 22: step S603). The controlled apparatus 20 stores the apparatus authentication continuation ID and the information concerning the term of validity thereof included in the apparatus authentication response <R-0R> in the storing unit 21 in association with the apparatus authentication information (FIG. 22: step S604).

Thereafter, the controlled apparatus 20 judges whether a controlled apparatus registration password is stored in the storing unit 21 (FIG. 22: step S605). When the controlled apparatus registration password is not stored, the controlled apparatus 20 finishes the operation. When the controlled apparatus registration password is stored, the controlled apparatus 20 shifts to step S609. Immediately after the apparatus authentication continuation ID is acquired, since the controlled apparatus registration password is not stored, the controlled apparatus finishes the operation.

Consequently, a combination of the apparatus authentication continuation ID, the information concerning the term of validity of the apparatus authentication continuation ID, and the apparatus authentication information is stored in the storing unit 21 of the controlled apparatus 20. A combination of the apparatus authentication continuation ID and the apparatus authentication information is stored in the storing unit 41 of the direct access management server 40. The registration of the controlled apparatus 20 in the direct access management server 40 is completed.

1-3. Association of the Control Apparatus/Service Management ID and the Controlled Apparatus Management ID An operation for registering the control apparatus/service management ID and the controlled apparatus management ID in the direct access management server 40 in association with each other is performed. A one-time password transmission request from the user is inputted to the control apparatus 10 (FIG. 12: step S305). When the control apparatus 10 receives the one-time password transmission request from the user, the control apparatus 10 passes the controlled apparatus registration password stored in the storing unit 11 to the controlled apparatus 20 as a one-time password <R-5> using the interface [IF-03] such as an infrared ray or a USB (FIG. 12: step S306). Besides, as a method of passing the controlled apparatus registration password, various methods such as a method of passing the controlled apparatus registration password via a non-contact IC card and radio transmission by Bluetooth (registered trademark), a wireless LAN, and the like are conceivable. However, any method may be adopted as long as the controlled apparatus registration password can be passed from the control apparatus 10 to the controlled apparatus 20. Thereafter, the control apparatus 10 deletes the controlled apparatus registration password from the storing unit 11 (FIG. 12: step S307).

The controlled apparatus 20 receives the controlled apparatus registration password <R-5> from the control apparatus 10 (FIG. 22: step S607). The controlled apparatus 20 stores the controlled apparatus registration password in the storing unit 21 (FIG. 22: step S608). Subsequently, the controlled apparatus 20 transmits a controlled apparatus registration request <R-6> including the apparatus authentication continuation ID stored in the storing unit 21 and the controlled apparatus registration password received from the control apparatus 10 to the SOAP server 42 in the direct access management server 40 (FIG. 22: step S609). Consequently, the controlled apparatus 20 requests the direct access management server 40 to register the controlled apparatus registration password in association with the control apparatus 10 that transmits the controlled apparatus registration password.

The SOAP server 42 in the direct access management server 40 receives the controlled apparatus registration request <R-6> from the controlled apparatus 20 (FIG. 18: step S519). The SOAP server 42 checks whether the apparatus authentication continuation ID included in the controlled apparatus registration request <R-6> coincides with the apparatus authentication continuation ID stored in the storing unit 41 and check a term of validity of the apparatus authentication continuation ID (FIG. 18: step S520). When a negative result is obtained in the check, i.e., when the apparatus authentication continuation IDs do not coincide with each other or when the term of validity of the apparatus authentication continuation ID has expired, the SOAP server 42 transmits a controlled apparatus registration response <R-6R> including an error code indicating that apparatus authentication is necessary to the controlled apparatus 20 (FIG. 18: step S530). The controlled apparatus 20 receives the controlled apparatus registration response <R-6R> including the error code (FIG. 22: step S622). The controlled apparatus 20 returns to step S602 and repeats processing for apparatus authentication.

When an affirmative result is obtained in the check in step S520, i.e., when the apparatus authentication continuation ID coincides with that stored in the storing unit 41 and the term of validity of the apparatus authentication continuation ID has not expired, the SOAP server 42 checks whether the controlled apparatus registration password included in the controlled apparatus registration request <R-6> received from the controlled apparatus 20 coincides with that stored in the storing unit 41 and checks a term of validity of the controlled apparatus registration password (FIG. 18: step S521). When a negative result is obtained in the check, i.e., when the controlled apparatus registration passwords do not coincide with each other or when the term of validity of the controlled apparatus registration password has expired, the SOAP server 42 transmits an error code indicating that the controlled apparatus registration password included in the controlled apparatus registration request <R-6> is invalid to the controlled apparatus 20 as the controlled apparatus registration response <R-6R> (FIG. 18: step S529). The controlled apparatus 20 receives the error codes as the controlled apparatus registration response <R-6R> (FIG. 22: step S620). The controlled apparatus 20 displays, on a screen of a television or the like connected to the controlled apparatus 20, an error message to urge the user to acquire a controlled apparatus registration password again (FIG. 22: step S621) and finishes the processing.

When an affirmative result is obtained in the check in step S521, i.e., when the controlled apparatus registration password coincides with that stored in the storing unit 41 and the term of validity of the controlled apparatus registration password has not expired, the SOAP server 42 judges whether a controlled apparatus management ID is allocated to the apparatus authentication continuation ID included in the controlled apparatus registration request <R-6> with reference to the information stored in the storing unit 41 (FIG. 18: step S522). When a controlled apparatus management ID corresponding to the apparatus authentication continuation ID is not allocated thereto yet, the SOAP server 42 allocates a controlled apparatus management ID to the controlled apparatus 20 (FIG. 18: step S523). The SOAP server 42 stores the allocated controlled apparatus management ID in the storing unit 41 in association with the apparatus authentication information and the apparatus authentication continuation ID of the controlled apparatus 20 (FIG. 18: step S524). When a controlled apparatus management ID is already allocated to the apparatus authentication continuation ID included in the controlled apparatus registration request <R-6>, the SOAP server 42 stores the controlled apparatus management ID in the storing unit 41 in association with the control apparatus/ service management ID stored in the storing unit 41 in association with the controlled apparatus registration password (FIG. 18: step S525). The controlled apparatus management ID is identification information uniquely allocated to the controlled apparatus 20 in the direct access management server 40. Consequently, the control apparatus/service management ID allocated to the combination of the control apparatus 10 and the service and the controlled apparatus management ID allocated to the controlled apparatus 20 are associated. In the association, plural controlled apparatus management IDs may be associated with one control apparatus/service management ID or one controlled apparatus management ID may be associated with plural control apparatus/service management IDs.

The SOAP server 42 transmits the number of services, for which association is completed at present, to the controlled apparatus 20 as the controlled apparatus registration response <R-6R> (FIG. 18: step S526). The SOAP server 42 transmits controlled apparatus registration completion notification <R-7> including the service ID, the control apparatus/service management ID, and the controlled apparatus registration password stored in the storing unit 41 to the service server 30 (FIG. 18: step S527). Thereafter, the SOAP server 42 deletes the controlled apparatus registration password in the storing unit 41 (FIG. 18: step S528) and finishes the processing. On the other hand, the service server 30 receives the controlled apparatus registration completion notification <R-7> from the SOAP server 42 (FIG. 14: step S410). The service server 30 notifies the user of the control apparatus 10, with an electronic mail or the like, that the registration of the controlled apparatus 20 is completed (FIG. 14: step S411).

The controlled apparatus 20 receives the number of services, for which association is completed at present, from the SOAP server 42 (FIG. 22: step S610). The controlled apparatus 20 sets an automatic connection flag ON (FIG. 22: step S611) and displays a message indicating that the registration of the controlled apparatus 20 is completed (FIG. 22: step S612). Subsequently, the controlled apparatus 20 deletes the controlled apparatus registration password stored in the storing unit 21 (FIG. 22: step S613). Thereafter, the controlled apparatus 20 transmits an XMPP login information acquisition request <D-0-1> including the apparatus authentication continuation ID to the SOAP server 42 in the direct access management server 40 in order to establish a normal connection session between the controlled apparatus 20 and the XMPP server 43 in the direct access management server 40 (FIG. 22: step S614).

2. XMPP Login of the Controlled Apparatus

In this network system, the XMPP server 43 for setting a bidirectional normal connection session between the direct access management server 40 and the controlled apparatus 20 is provided in the direct access management server 40. In order to access the controlled apparatus 20 from the control apparatus 10 through the network, the controlled apparatus 20 logs in the XMPP server 43 and establishes a normal connection session between the controlled apparatus 20 and the XMPP server 43 before the access. Consequently, the service server 30 and the control apparatus 10 can acquire necessary information from the controlled apparatus 20 when necessary. In order to simplify a design of the service server 30 in this case, an XMPP protocol is concealed in the direct access management server 40 to make it possible to exchange information with the XMPP server 43, for which the bidirectional normal connection session is set with the controlled apparatus 20, through only a SOAP interface.

Figure 19:
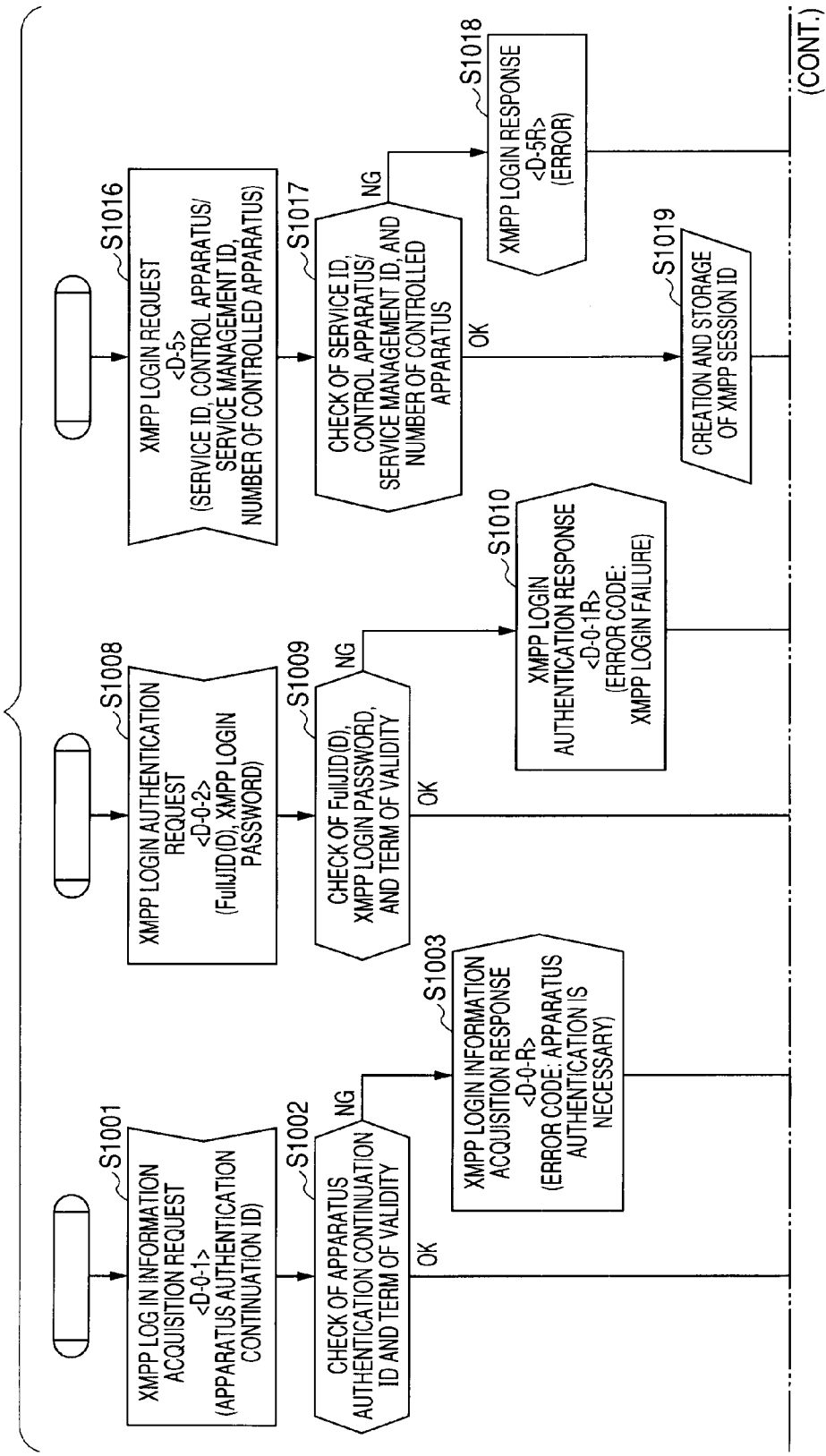
FIG. 19 is a flowchart showing operations of the direct access management server at the time of XMPP login of a controlled apparatus.

FIG. 3 is a sequence chart showing a flow of information concerning XMPP login of the controlled apparatus 20. FIG. 19 is a flowchart showing operations of the direct access management server 40 at the time of XMPP login of the controlled apparatus 20.

The direct access management server 40 receives an XMPP login information acquisition request <D-0-1> including an apparatus authentication connection ID from the controlled apparatus 20 (FIG. 19: step S1001). The direct access management server 40 checks the apparatus authentication continuation ID and a term of validity of the apparatus authentication continuation ID included in the XMPP login information acquisition request <D-0-1> (FIG. 19: step S1002). When the apparatus authentication continuation ID included in the XMPP login information acquisition request <D-0-1> does not coincide with that stored in the storing unit 41 of the direct access management server 40 as a result of the check or when the term of validity has expired, this is because the controlled apparatus 20 is not normally registered in the direct access management server 40 or the controlled apparatus 20 was registered in the past but a term of validity at the time of registration has expired. Therefore, the direct access management server 40 transmits an error code indicating that apparatus authentication is necessary to the controlled apparatus 20 as an XMPP login information acquisition response <D-0-1R> (FIG. 19: step S1003). When the apparatus authentication continuation ID is stored in the storing unit 41 and the term of validity of the apparatus authentication continuation ID has not expired, the direct access management server 40 retrieves a controlled apparatus management ID and apparatus authentication information associated with the apparatus authentication continuation ID from the storing unit 41 (FIG. 19: step S1004). The direct access management server 40 generates a Full JID(D), which is an XMPP login ID, an XMPP login password, and information concerning a term of validity of the XMPP login password necessary for the controlled apparatus 20 to log in the XMPP server 43 from the controlled apparatus management ID and the apparatus authentication information (FIG. 19: step S1005) and stores the Full JID(D), the XMPP login password, and the information in the storing unit 41 (FIG. 19: step S1006). The direct access management server 40 transmits information obtained by adding an XMPP address and a port number, information concerning an authentication system, and an SSL (Secure Socket Layer) option to the generated Full JID(D), an XMPP login password, and information concerning the XMPP login password to the controlled apparatus 20 as an XMPP login information acquisition response <D-0-1R> (FIG. 19: step S1007).

The controlled apparatus 20 receives the XMPP login information acquisition response <D-0-1R> including the Full JID(D) and the XMPP login password from the SOAP server 42 in the direct access management server 40 (FIG. 22: step S615). The controlled apparatus 20 transmits an XMPP login authentication request <D-0-2> including the Full JID (D) and the XMPP login password to the XMPP server 43 in the direct access management server 40 (FIG. 22: step S616).

The XMPP server 43 in the direct access management server 40 receives the XMPP login authentication request <D-0-2> from the controlled apparatus 20 (FIG. 19: step S1008). The XMPP server 43 checks the Full JID (D), the XMPP login password, and the term of validity of the XMPP login password included in the XMPP login authentication request <D-0-2> (FIG. 19: step S1009). When the Full JID (D) does not coincide with that stored in the storing unit 41, the XMPP login password does not coincide with that stored in the storing unit 41, or the term of validity of the XMPP login password has expired, the XMPP server 43 transmits an error code indicating an XMPP login failure to the controlled apparatus 20 as the XMPP login authentication response <D-0-1R> (FIG. 19: step S1010). When an affirmative result is obtained in the check of all of the Full JID(D), the XMPP login password, and the term of validity, the XMPP server 43 in the direct access management server 40 transmits a code indicating an XMPP login permission to the controlled apparatus 20 as the XMPP login authentication response <D-0-1R> (FIG. 19: step S1011).

The controlled apparatus 20 receives the error code indicating the XMPP login failure from the direct access management sever 40 as an XMPP login authentication response <D-0-2R> (FIG. 22: step S619). The controlled apparatus 20 returns to step S614 and requests acquisition of XMPP login information again. In other words, since it is likely that the term of validity of the XMPP login password has expired, the controlled apparatus 20 performs processing for requesting acquisition of XMPP login information again. When the controlled apparatus 20 receives a code indicating an XMPP login permission from the direct access management server 40 as the XMPP login authentication response <D-0-2R> (FIG. 22: step S618) the controlled apparatus 20 completes the XMPP login processing.

The controlled apparatus 20 receives an error code indicating that apparatus authentication is necessary from the SOAP server 42 in the direct access management server 40 as the XMPP login information acquisition response <D-0-1R> (FIG. 22: step S617). In this case, it is likely that the controlled apparatus 20 is not normally registered in the direct access management server 40 or the term of validity of the apparatus authentication continuation ID has expired. Therefore, the controlled apparatus 20 transmits the apparatus authentication request <R-0> including the information concerning the authentication system and the apparatus authentication system set in the controlled apparatus 20 in advance to the SOAP server 42 in the direct access management server 40 and performs apparatus authentication for the controlled apparatus 20 again (FIG. 22: step S602).

As described above, in the network system, the direct access management server 40 generates the XMPP login ID (Full JID) and the XMPP login password necessary for the controlled apparatus 20 to log in the XMPP server 43 and distributes the XMPP login ID and the XMPP login password to the controlled apparatus 20. For example, as shown in FIG. 26, the Full JID includes a Bare JID section and a Resource section. The controlled apparatus management ID allocated to the controlled apparatus 20 is used for the Bare JID section. A product code and a serial number obtained from the apparatus authentication information are used for the Resource section. As shown in FIG. 27, the control apparatus/service management ID for identifying a combination of the controlled apparatus and service may be used for the Resource section.

Since the automatic connection flag is set ON in step S611, at the next connection time, for example, when a power supply for the controlled apparatus 20 is turned off once and, then, turned on again or when a session with the XMPP server 43 is established after the session is disconnected, the controlled apparatus 20 starts the processing from the transmission of the XMPP login information acquisition request <D-0-1> in step S614 after checking the automatic connection flag in step S601. In other words, at the reconnection time, the controlled apparatus 20 skips the processing for apparatus authentication and the processing for acquisition of a controlled apparatus registration password and controlled apparatus registration and enters the processing for XMPP login. Consequently, at the time of reconnection, the controlled apparatus 20 can establish a connection session between the controlled apparatus 20 and the XMPP server 43 simply by performing the processing for XMPP login.

The processing for associating the controlled apparatus 20 as a control object of the control apparatus 10 is completed. Specific processing in transmitting a message from the controlled apparatus 20 to the control apparatus 10 associated with each other is explained.

3. Message Transmission Processing

Processing necessary for transmitting a message concerning an event that occurs in the controlled apparatus 20 is explained.

3.1 Message Transmission Setting

First, an operation of message transmission setting for instructing, from the control apparatus 10 to the controlled apparatus 20, a setting referred to when the controlled apparatus 20 transmits a message is explained.

Figure 13:
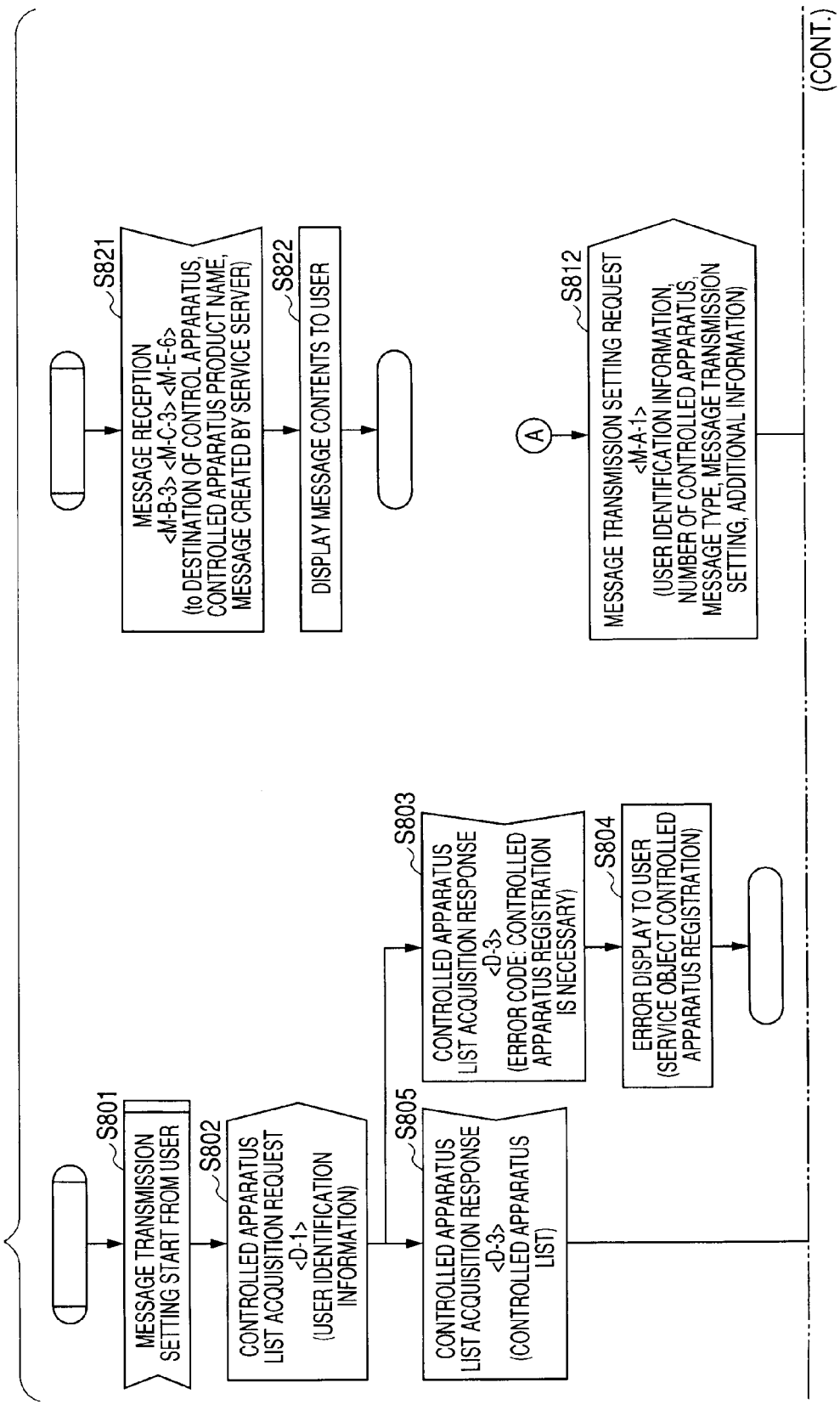
FIG. 13 is a flowchart showing operations of the service server at the time of the message transmission processing.
Figure 15:
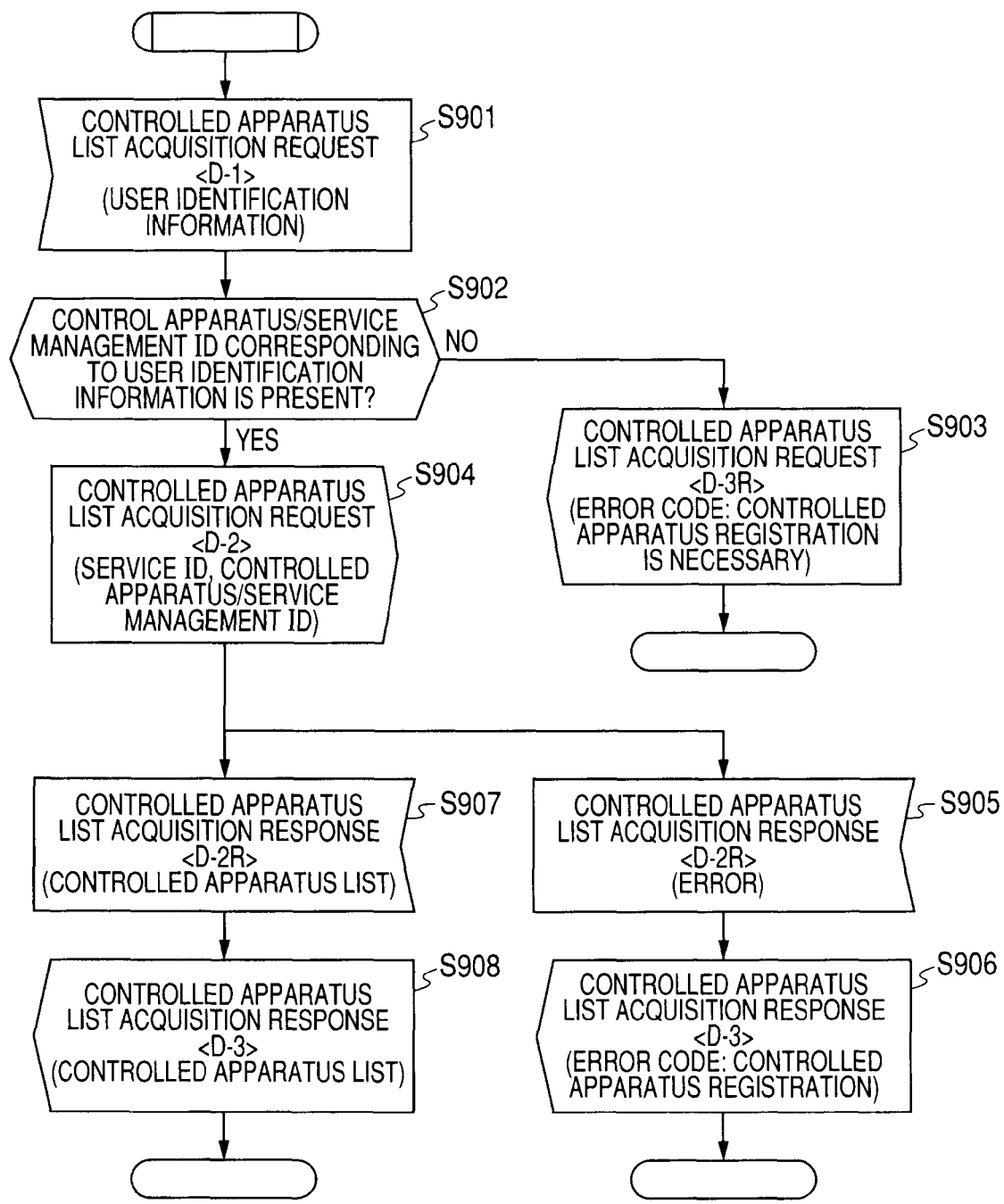
FIG. 15 is a flowchart showing operations of the service server at the time of the message transmission setting.
Figure 16:
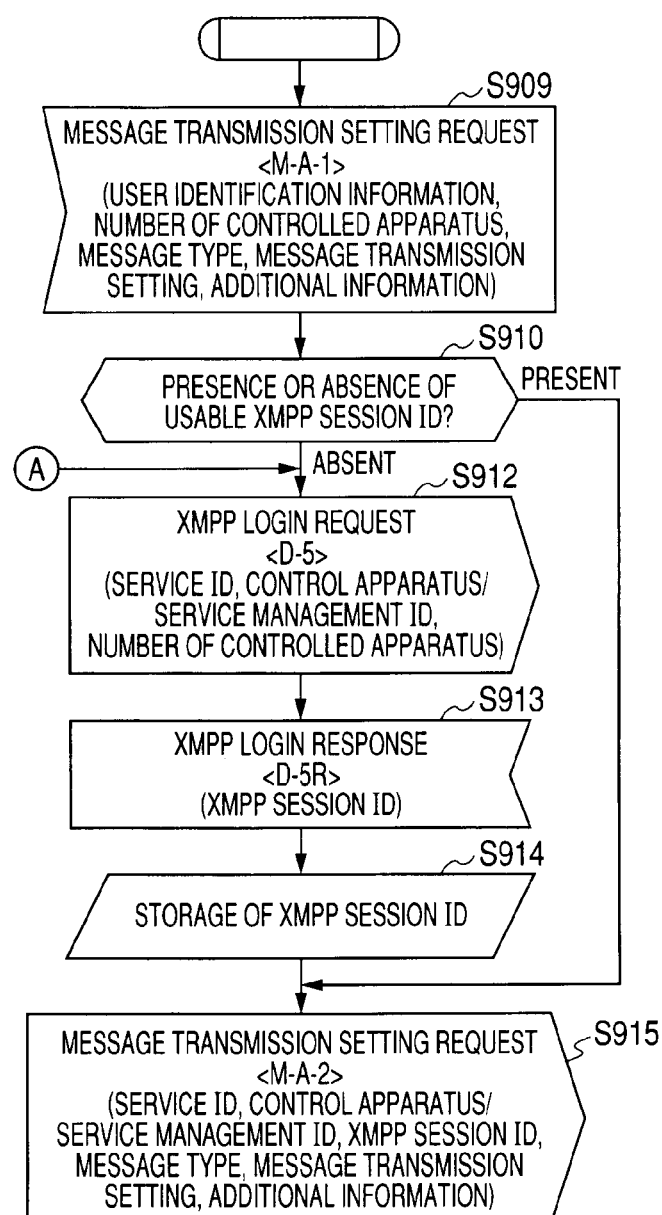
FIG. 16 is a flowchart showing operations of the service server at the time of the message transmission setting.
Figure 20:
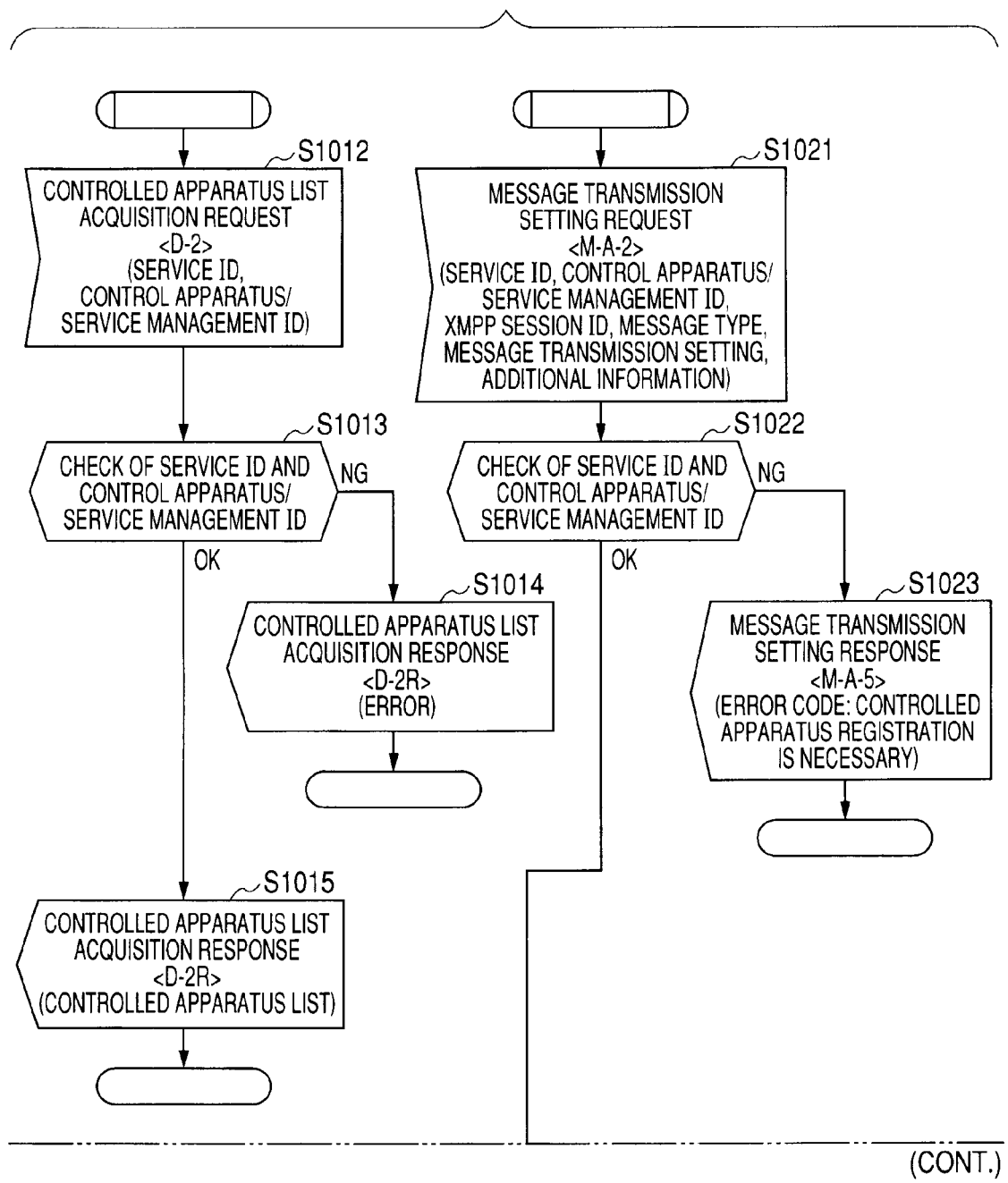
FIG. 20 is a flowchart showing operations of the direct access management server at the time of the message transmission setting.
Figure 23:
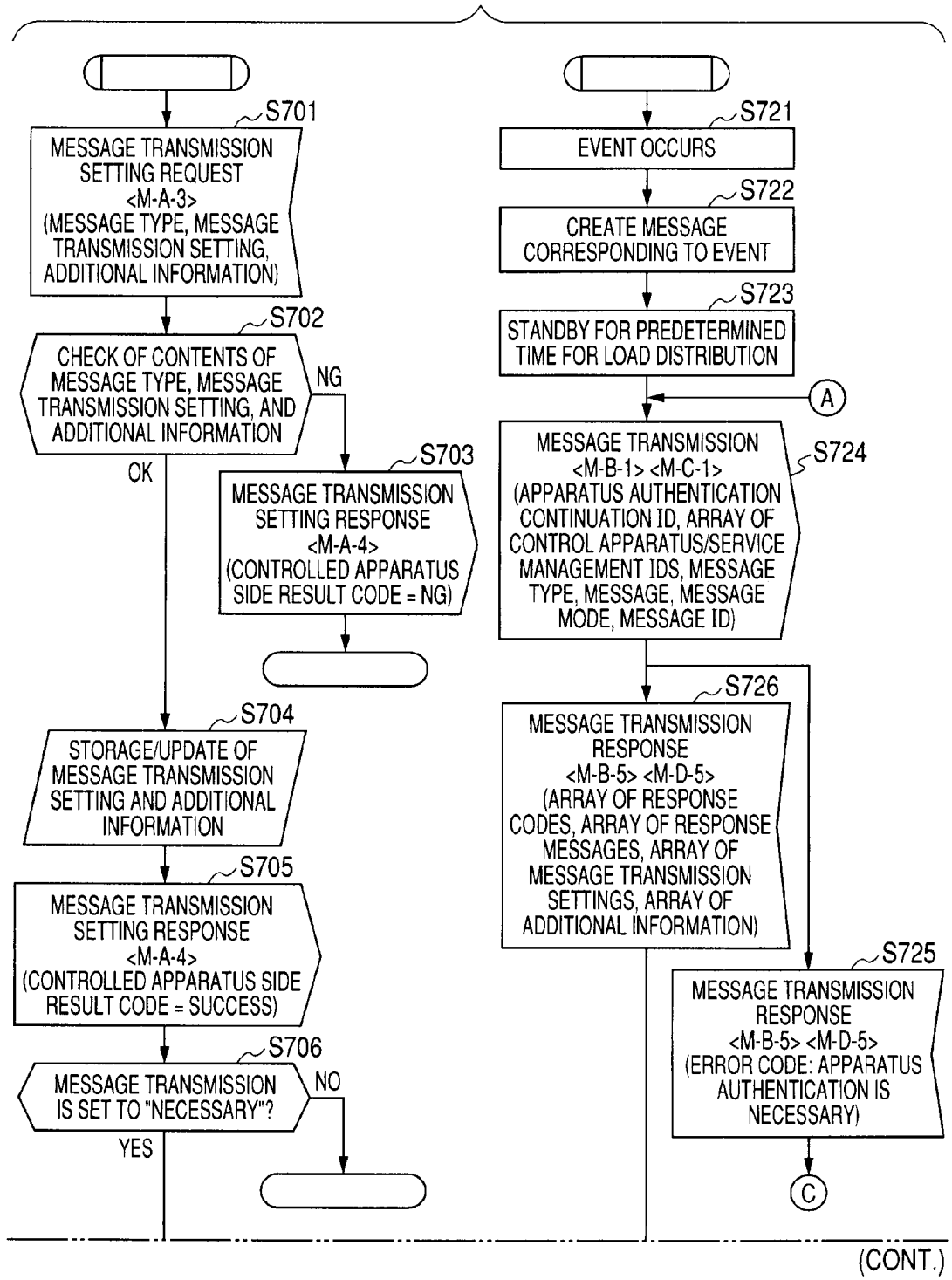
FIG. 23 is a flowchart showing operations of the service server at the time of the processing of direct message transmission.

FIG. 4 is a sequence chart showing a flow of information at the time of message transmission setting. FIG. 5 is a table in which interface functions at the time of the message transmission setting shown in FIG. 4 are summarized. FIG. 13 is a flowchart showing operations of the control apparatus 10 at the time of the message transmission setting. FIGS. 15 and 16 are flowcharts of operations of the service server 30 at the time of the message transmission setting. FIG. 20 is a flowchart showing operations of the direct access management server 40 at the time of the message transmission setting. FIG. 23 is a flowchart showing operations of the controlled apparatus 20 at the time of the message transmission setting and at the time of message transmission.

The user of the control apparatus 10 operates the operation input unit to give an instruction for start of message transmission setting to the control apparatus 10 in order to start the message transmission setting (FIG. 13: step S801). The control apparatus 10 transmits a controlled apparatus list acquisition request <D-1> including user identification information set in the control apparatus 10 itself in advance to the service server 30 (FIG. 13: step S802).

The service server 30 receives the controlled apparatus list acquisition request <D-1> from the control apparatus 10 (FIG. 15: step S901). The service server 30 judges whether a control apparatus/service management ID corresponding to the user identification information included in the controlled apparatus list acquisition request <D-1> is stored in the storing unit 31 (FIG. 15: step S902). When the control apparatus/service management ID corresponding to the user identification information is not stored in the storing unit 31, the service server 30 transmits an error code indicating that registration of a controlled apparatus is necessary to the control apparatus 10 as a controlled apparatus list acquisition response <D-3R> (FIG. 15: step S903). When the control apparatus/service management ID corresponding to the user identification information is stored in the storing unit 31, in order to acquire a list of controlled apparatuses associated with the control apparatus/service management ID managed by the direct access management server 40, the service server 30 transmits a controlled apparatus list acquisition request <D-2> including a service ID, which is information for identifying a service, and the control apparatus/service management ID to the SOAP server 42 in the direct access management server 40 (FIG. 15: step S904).

The SOAP server 42 in the direct access management server 40 receives the controlled apparatus list acquisition request <D-2> from the service server 30 (FIG. 20: step S1012). The SOAP server 42 judges whether a combination of the service ID and the control apparatus/service management ID included in the controlled apparatus list acquisition request <D-2> is stored in the storing unit 41 (FIG. 20: step S1013). If the combination of the service ID and the control apparatus/service management ID is not included, the SOAP server 42 transmits an error code indicating that a controlled apparatus is not registered to the service server 30 as a controlled apparatus list acquisition response <D-2R> (FIG. 20: step S1014). The service server 30 receives the error code indicating that a controlled apparatus is not registered from the SOAP server 42 in the direct access management server 40 as the controlled apparatus list acquisition response <D-2R> (FIG. 15: step S905). The service server 30 transmits an error code indicating that registration of a controlled apparatus is necessary to the control apparatus 10 as a controlled apparatus list acquisition response <D-3> (FIG. 15: step S906). The control apparatus 10 receives the error code from the service server 30 as the controlled apparatus list acquisition response <D-3> (FIG. 13: step S803). The control apparatus 10 displays an error message indicating that registration of a controlled apparatus as a service object is necessary to the user through the display unit (FIG. 13: step S804).

When it is judged in step S1013 shown in FIG. 20 that the combination of the service ID and the control apparatus/service management ID included in the controlled apparatus list acquisition request <D-2> is stored in the storing unit 41, the SOAP server 42 in the direct access management server 40 creates a list including numbers given to controlled apparatus management IDs of controlled apparatuses controllable from the control apparatus 10 and apparatus names included in apparatus authentication information of the controlled apparatuses as a controlled apparatus list in accordance with details of association of the control apparatus/service management ID and the controlled apparatus management ID stored in the storing unit 41. The SOAP server 42 stores the controlled apparatus list in the storing unit 41 in association with the control apparatus/service management ID and transmits the controlled apparatus list acquisition response <D-2R> including the controlled apparatus list to the service server 30 (FIG. 20: step S1015).

The service server 30 receives the controlled apparatus list acquisition response <D-2R> including the controlled apparatus list from the SOAP server 42 in the direct access management server 40 (FIG. 15: step S907). The service server 30 transmits the controlled apparatus list acquisition response <D-3> including the controlled apparatus list to the control apparatus 10 (FIG. 15: step S908).

The control apparatus 10 receives the controlled apparatus list acquisition response <D-3> including the controlled apparatus list (FIG. 13: step S805). The control apparatus 10 judges whether numbers of plural controlled apparatuses are present in the controlled apparatus list (FIG. 13: step S806). When the numbers of plural controlled apparatuses are present, the control apparatus 10 displays contents of the controlled apparatus list on the display unit (FIG. 13: step S807), causes the user to select a number of one controlled apparatus out of the list (FIG. 13: step S808), and stores the selected number of the controlled apparatus in the storing unit 11 (FIG. 13: steps S809 and S811). When plural controlled apparatuses are not present, the control apparatus 10 stores the number of one controlled apparatus in the storing unit 11 (FIG. 13: steps S810 and S811).

The control apparatus 10 transmits a message transmission setting request <M-A-1> including the user identification, the umber of the controlled apparatus, a message type, message transmission setting, and additional information stored in the storing unit 11 to the service server 30 (FIG. 13: step S812).

The message type is a code representing messages of different types. For example, a URN (Uniform Resource Name), other simple IDs, and the like are used. The message transmission setting is information for setting necessity of message transmission for each control apparatus/service management ID and for each message type. The additional information is arbitrary additional information. In this embodiment, load distribution parameters in the service server 30 and the direct access management server 40 are adopted as the additional information. As the load distribution parameters, a standby time of message transmission for each message type and the like are used.

The service server 30 receives the message transmission setting request <M-A-1> from the control apparatus 10 (FIG. 16: step S909). The service server 30 checks whether a usable XMPP session ID, i.e., an ID for identifying a connection session established between the service server 30 and the XMPP server 43 while being associated with the user identification information of the control apparatus 10 included in the message transmission setting request <M-A-1> is stored in the storing unit 31 (FIG. 16: step S910). When the usable XMPP session ID is not stored, the service server 30 transmits an XMPP login request <D-5> including a service ID, a control apparatus/service management ID, and a number of a controlled apparatus to the XMPP serer 43 in the direct access management server 40 in order to establish an XMPP session with the XMPP server 43 (FIG. 16: step S912).

The XMPP server 43 in the direct access management server 40 receives the XMPP login request <D-5> from the service server 30 (FIG. 19: step S1016). The XMPP server 43 judges whether a combination of the service ID, the control apparatus/service management ID, and the number of the control apparatus included in the XMPP login request <D-5> is stored in the storing unit 41 (FIG. 19: step S1017). When the combination is not stored, the SOAP server 42 in the direct access management server 40 transmits an error code indicating that a service object controlled apparatus corresponding to the request is not present to the service server 30 as an XMPP login response <D-5R> (FIG. 19: step S1018). Thereafter, the operations of the direct access management server 40 are finished. When a service object controlled apparatus corresponding to the request is stored in the storing unit 41, the XMPP server 43 in the direct access management server 40 generates an XMPP session ID, stores the XMPP session ID in the storing unit 41 in association with the service ID, the control apparatus/service management ID, and the number of the controlled apparatus (FIG. 19: step S1019), and transmits the XMPP login response <D-5R> including the XMPP session ID to the service server 30 (FIG. 19: step S1020).

The service server 30 receives the XMPP login response <D-5R> including the XMPP session ID from the XMPP server 43 (FIG. 16: step S913). The service server 30 stores the XMPP session ID included in the XMPP login response <D-5R> in the storing unit 31 in association with the service ID, the control apparatus/service management ID, and a controlled apparatus list number (FIG. 16: step S914).

On the other hand, when the usable XMPP session ID is already stored in the storing unit 31 as a result of the judgment in step S910 by the service server 30 or after the XMPP session ID is stored in step S914, the service server 30 transmits a message transmission setting request <M-A-2> including the service ID, the control apparatus/service management ID, the XMPP session ID, a message type, message transmission setting information, and additional information to the SOAP server 42 in the direct access management server 40 (FIG. 16: step S915). The control apparatus/service management ID is the control apparatus/service management ID stored in the storing unit 31 in association with the user identification information included in the message transmission setting request <M-A-1> received from the control apparatus 10.

The SOAP server 42 in the direct access management server 40 receives the message transmission request <M-A-2> from the service server 30 (FIG. 20: step S1021). The SOAP server 42 judges whether a combination of the service ID and the control apparatus/service management ID included in the message transmission setting request <M-A-2> is stored in the storing unit 41 (FIG. 20: step S1022). When the combination is not included, the SOAP server 42 transmits an error code indicating that registration of a controlled apparatus is necessary to the server 30 as a message transmission setting response <M-A-5> (FIG. 20: step S1023).

The service server 30 receives the error code indicating that registration of a controlled apparatus is necessary from the SOAP server 42 in the direct access management server 40 as the message transmission setting response <M-A-5> (FIG. 16: step S917). The service server 30 transmits the error code indicating that registration of a controlled apparatus is necessary to the control apparatus 10 as a message transmission setting response <M-A-6> (FIG. 16: step S918). The control apparatus 10 receives the error code indicating that registration of a controlled apparatus is necessary from the service server 30 as the message transmission setting response (M-A-6) (FIG. 13: step S818). The control apparatus 10 displays an indication that registration of a controlled apparatus is necessary to the user through the display unit (FIG. 13: step S819).

When it is judged in step S1022 in FIG. 20 that the combination of the service ID and the control apparatus/service management ID included in the message transmission setting request <M-A-2> is stored in the storing unit 41, the SOAP server 42 in the direct access management server 40 judges whether the XMPP session ID included in the message transmission setting request <M-A-2> is stored in the storing unit 41 in association with the combination of the service ID and the control apparatus/service management ID included in the message transmission setting request <M-A-2> (FIG. 20: step S1024). When the XMPP session ID is not stored, the SOAP server 42 in the direct access management server 40 transmits an error code indicating that the XMPP session ID is an invalid XMPP session ID to the service server 30 as the message transmission setting response <M-A-5> (FIG. 20: step S1025).

The service server 30 receives the error code indicating that the XMPP session ID is an invalid XMPP session ID from the SOAP server 42 in the direct access management server 40 as the message transmission setting response <M-A-5> (FIG. 16: step S916). The service server 30 returns to step S912, transmits the XMPP login request <D-5> to the XMPP server 43 in the direct access management server 40, and establishes an XMPP session again.

When it is judged in step S1024 in FIG. 20 that the XMPP session ID included in the message transmission setting request <M-A-2> is stored in the storing unit 41 in association with the combination of the service ID and the control apparatus/service management ID included in the message transmission setting request <M-A-2>, the SOAP server 42 in the direct access management server 40 transmits a message transmission setting request <M-A-3> including the message type, the message transmission setting, and the additional information included in the message transmission setting request <M-A-2> to the controlled apparatus 20 through the normal connection session established between the XMPP server 43 and the controlled apparatus 20 (FIG. 20: step S1026).

The controlled apparatus 20 receives the message transmission setting request <M-A-3> from the SOAP server 42 in the direct access management server 40 (FIG. 23: step S701). The controlled apparatus 20 checks whether the message type, the message transmission setting, and contents of the additional information included in the message transmission setting request <M-A-3> are appropriate for the controlled apparatus 20 (FIG. 23: step S702). Specifically, the controlled apparatus 20 judges that the message type is appropriate when a message type corresponding to an event with which the controlled apparatus 20 copes is designated. The controlled apparatus 20 judges that the message transmission setting is appropriate when ON or OFF is designated as the message transmission setting. The controlled apparatus 20 judges that the contents of the additional information is appropriate when the additional information matches a format and contents defined for each message type.

When it is judged in the check that the message type, the message transmission setting, and the contents of the additional information are inappropriate for the controlled apparatus 20, the controlled apparatus 20 transmits a message transmission setting response <M-A-4> including a controlled apparatus side result code indicating the inappropriateness of the message transmission setting to the direct access management server 40 (FIG. 23: step S703) and finishes the processing.

The SOAP server 42 in the direct access management server 40 receives the controlled apparatus side result code indicating inappropriateness of the message transmission setting from the controlled apparatus 20 as the message transmission setting response <M-A-4> (FIG. 20: step S1029). The SOAP server 42 transmits the controlled apparatus side result code indicating inappropriateness of the message transmission setting to the service server 30 as the message transmission setting response <M-A-5> (FIG. 20: step S1030). The service server 30 receives the controlled apparatus side result code indicating inappropriateness of the message transmission setting from the SOAP server 42 in the direct access management server 40 as the message transmission setting response (M-A-5) (FIG. 16: step S919). The service server 30 transmits the controlled apparatus side result code indicating inappropriateness of the message transmission setting to the control apparatus 10 as the message transmission setting response <M-A-6> (FIG. 16: step S920). The controlled apparatus 10 receives the controlled apparatus side result code indicating inappropriateness of the message setting from the service server 30 as the message transmission setting response <M-A-6> (FIG. 13: step S813). The control apparatus 10 displays to the user through the display unit an indication that the message transmission setting fails because the message type, the message transmission setting, and the contents of the additional information added to the message transmission setting request <M-A-1> and transmitted are inappropriate in the controlled apparatus 20 as a message transmission setting object (FIG. 13: step S814).

When it is judged as a result of the check in step S702 in FIG. 23 that the message type, the message transmission setting, and the contents of the additional information included in the message transmission setting request <M-A-

3> received from the SOAP server 42 in the direct access management server 40 are appropriate for the controlled apparatus 20, the controlled apparatus 20 stores the message type, the message transmission setting, and the additional information in the storing unit 21 (FIG. 23: step S704). Subsequently, the controlled apparatus 20 transmits a controlled apparatus side result code indicating that the message transmission setting is successful to the SOAP server 42 in the direct access management server 40 as the message transmission setting response <M-A-4> (FIG. 23: step S705).

The SOAP server 42 in the direct access management server 40 receives the controlled apparatus side result code indicating the success in the message transmission setting from the controlled apparatus 20 as the message transmission setting response <M-A-4> (FIG. 20: step S1027). The SOAP server 42 transmits the controlled apparatus side result code indicating the success in the message transmission setting to the service server 30 as the message transmission setting response <M-A-5> (FIG. 20: step S1028). The service server 30 receives the message transmission setting response <M-A-5> including the controlled apparatus side result code indicating the success in the message transmission setting from the SOAP server 42 in the direct access management server 40 (FIG. 16: step S921). The service server 30 transmits the controlled apparatus side result code indicating the success in the message transmission setting to the control apparatus 10 as the message transmission setting response <M-A-6> (FIG. 16: step S922). The control apparatus 10 receives the controlled apparatus side result code indicating the success in the message transmission setting from the service server 30 as the message transmission setting response <M-A-6> (FIG. 13: step S815). The Control apparatus 10 displays the success in the message transmission setting to the user through the display unit (FIG. 13: step S816).

After transmitting the message transmission setting response <M-A-6> to the control apparatus 10 in steps S920 and S922, the service server 30 transmits XMPP logout notification <C-5> including the service ID, the control apparatus/service management ID, and the XMPP session ID to the XMPP server 43 in the direct access management server 40 (FIG. 16: step S923). Thereafter, the service server 30 deletes an entry of the XMPP session ID (FIG. 16: step S924). The XMPP server 43 in the direct access management server 40 receives the XMPP logout notification <C-5> from the service server 30 (FIG. 20: step S1041). The XMPP server 43 deletes the XMPP session ID included in the XMPP logout notification <C-5> from the storing unit 41 (FIG. 20: step S1042).

After transmitting the controlled apparatus side result code indicating that the message transmission setting is successful to the SOAP server 42 in the direct access management server 40 as the message transmission setting response <M-A-4> in step S705 in FIG. 23, the controlled apparatus 20 judges whether the message transmission is set ON (valid) on the basis of the acquired message transmission setting (FIG. 23: step S706). When the message transmission is not set ON, the controlled apparatus 20 finishes the processing.

3-2. ON Notification of the Message Transmission Setting

Figure 17:
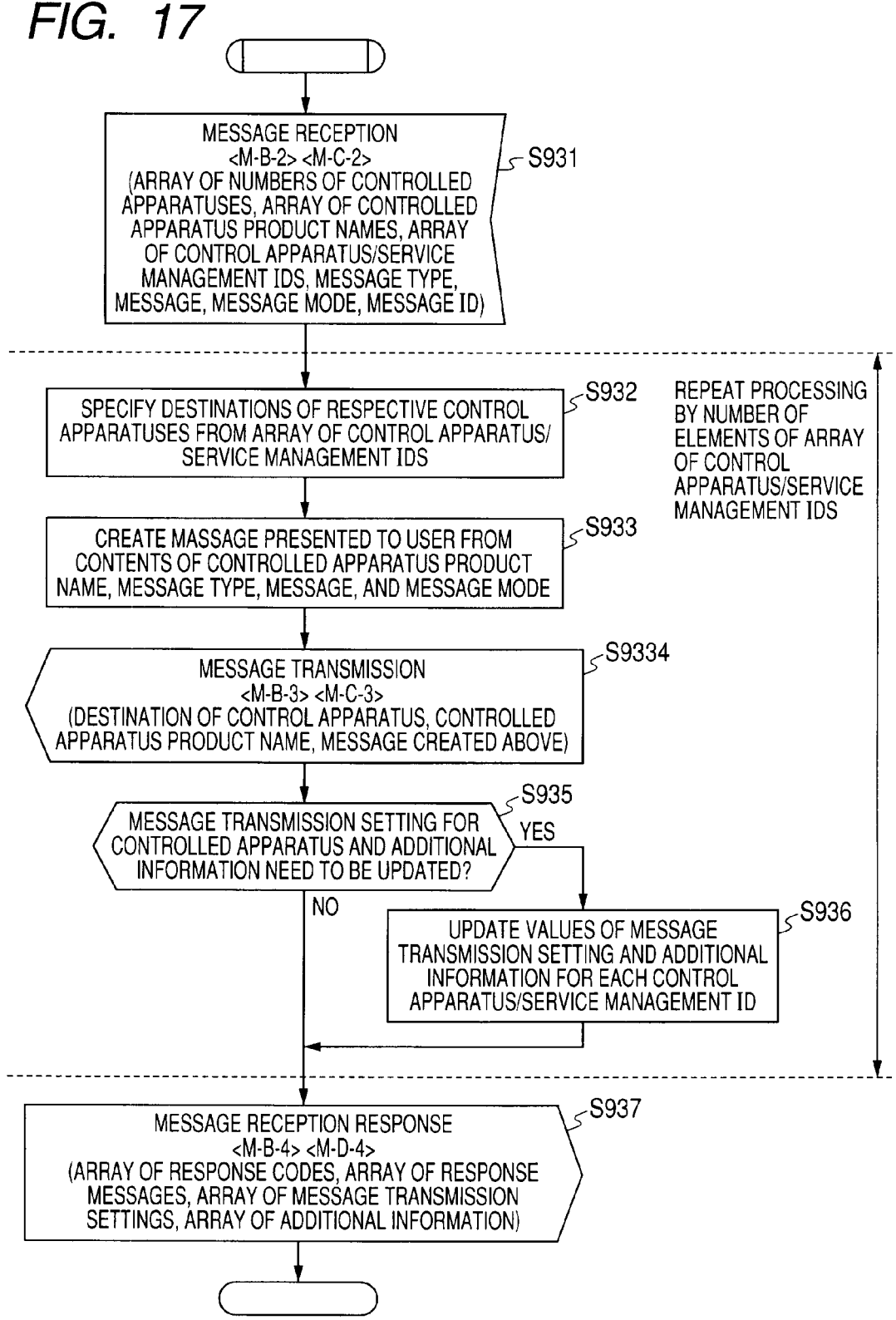
FIG. 17 is a flowchart showing operations of the service server at the time of message reception.
Figure 21:
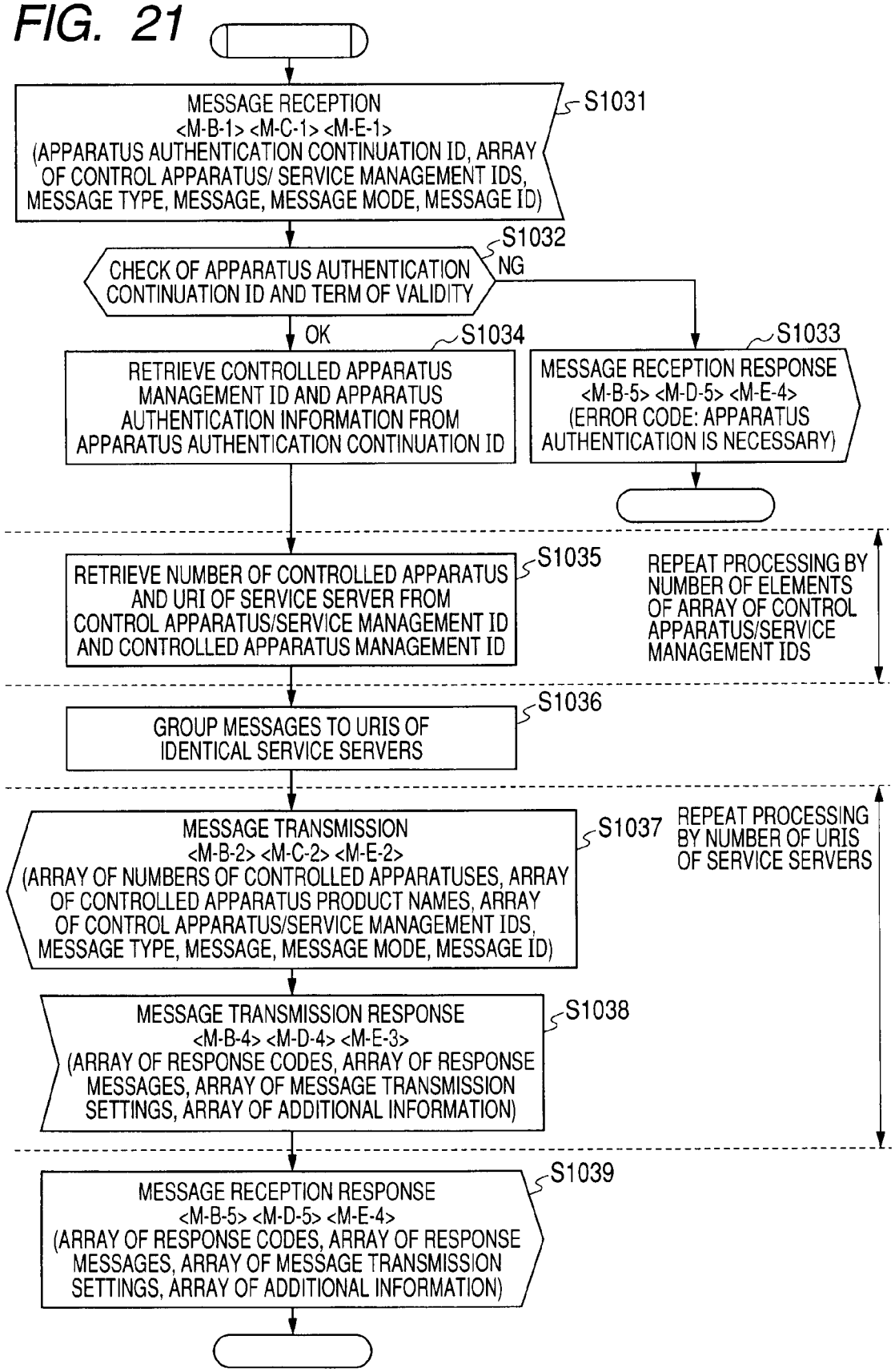
FIG. 21 is a flowchart showing operations of the direct access management server at the time of the ON notification of the message transmission setting and at the time of the message transmission.

FIG. 6 is a sequence chart concerning ON notification of the message transmission setting. FIG. 7 is a table in which interface functions at the time of the ON notification of the message transmission setting shown in FIG. 6 are summarized. FIG. 17 is a flowchart showing operations of the service server 30 at the time of message reception of the service server 30. FIG. 21 is a flowchart showing operations of the direct access management server at the time of the ON notification of the message transmission setting and at the time of the message transmission. Operations of the controlled apparatus 20 at the time of the ON notification of the message transmission setting and at the time of the message transmission are shown in FIG. 23.

When it is judged in step S706 that the message transmission is set ON, the controlled apparatus 20 creates an ON notification message including an apparatus authentication continuation ID indicating a transmission source, a control apparatus/service management ID indicating a destination, a message type, a message (empty), a message mode, and a message ID in order to notify the user of the control apparatus 10 of ON notification of the message transmission setting (FIG. 23: step S707). The control apparatus/service management ID indicating a destination is a control apparatus/service management ID set to indicate that the message transmission is necessary in the message transmission setting. The message mode is information for identifying a message of event notification and a message of the ON notification of the message transmission setting. The message mode is the ON notification of the message transmission setting this time. The message type is a parameter for identifying a type of an event. Since the event is the ON notification of the message transmission setting this time, the message type is set to indicate that the message transmission is necessary in the message transmission setting.

The controlled apparatus 20 transmits this ON notification message <M-B-1> to the SOAP server 42 in the direct access management server 40 (FIG. 23: step S724).

The SOAP server 42 in the direct access management server 40 receives the ON notification message <M-B-1> of the message transmission setting from the controlled apparatus 20 (FIG. 21: step S1031). The SOAP server 42 checks the apparatus authentication continuation ID and a term of validity of the apparatus authentication continuation ID included in the ON notification message <M-B-1> (FIG. 21: step S1032). When the apparatus authentication continuation ID included in the message <M-B-1> does not coincide with that stored in the storing unit 41 of the direct access management server 40 in the check or the term of validity has expired, the controlled apparatus 20 is not normally registered in the direct access management server 40 or the controlled apparatus 20 was registered in the past but a term of validity of an apparatus authentication continuation ID at the time of registration has expired. Therefore, the SOAP server 42 transmits an error code indicating that apparatus authentication is necessary to the controlled apparatus 20 as a message reception response <M-B-5> (FIG. 21: step S1033).

The controlled apparatus 20 receives the error code indicating that the apparatus authentication is necessary as the message reception response <M-B-5> (FIG. 23: step S725). The controlled apparatus 20 transmits an apparatus authentication request <R-0> including information concerning an authentication system and apparatus authentication information set in the controlled apparatus 20 itself in advance to the SOAP server 42 in the direct access management server 40 (FIG. 23: step S730).

Operations performed by the SOAP server 42 in the direct access management server 40 when the SOAP server 42 receives the apparatus authentication request <R-0> from the controlled apparatus 20 are as explained in steps S513 to S518 in FIG. 18. In other words, the SOAP server 42 in the direct access management server 40 judges whether the controlled apparatus 20 is a proper apparatus on the basis of the information concerning the authentication system and the apparatus authentication information included in the apparatus authentication request <R-0> (FIG. 18: step S514). When it is judged that the controlled apparatus 20 is a proper apparatus, i.e., when the authentication system coincides with an authentication system determined in advance and the apparatus authentication information is a format of the authentication system determined in advance, the SOAP server 42 creates an apparatus authentication continuation ID allocated to the controlled apparatus 20 (FIG. 18: step S516). The SOAP server 42 stores the apparatus authentication continuation ID and the apparatus authentication information included in the apparatus authentication request <R-0> in the storing unit 41 in association with each other (FIG. 18: step S517). The SOAP server 42 transmits an apparatus authentication response <R-0R> including the created apparatus authentication continuation ID and information concerning a term of validity thereof to the controlled apparatus 20 (FIG. 18: step S518).

The controlled apparatus 20 receives the apparatus authentication response <R-0R> including the apparatus authentication continuation ID and the information concerning the term of validity thereof from the SOAP server 42 in the direct access management server 40 (FIG. 23: step S731). The controlled apparatus 20 stores the apparatus authentication continuation ID and the information concerning the term of validity thereof included in the apparatus authentication response <R-0R> in the storing unit 21 in association with the apparatus authentication information (FIG. 23: step S732). Thereafter, the controlled apparatus 20 returns to step S724 and transmits the ON notification message <M-B-1> to the SOAP server 42 in the direct access management server 40 again.

When a result of the check in step S1032 in FIG. 21 is affirmative, i.e., when the apparatus authentication continuation ID included in the ON notification message <M-B-1> received from the controlled apparatus 20 coincides with that stored in the storing unit 41 and the term of validity of the apparatus authentication continuation ID has not expired, the SOAP server 42 retrieves a controlled apparatus management ID and apparatus authentication information corresponding to the apparatus authentication continuation ID from the storing unit 41 (FIG. 21: step S1034). Subsequently, the SOAP server 42 in the direct access management server 40 retrieves a number of the controlled apparatus 20 allocated to the retrieved controlled apparatus management ID again and stored in the storing unit 41 and retrieves a URI of the service server 30 stored in the storing unit 41 in association with the control apparatus/service management ID included in the ON notification message <M-B-1> received from the controlled apparatus 20 (FIG. 21: step S1035). When control apparatus/service management IDs included as destinations in the message <M-B-1> received from the controlled apparatus 20 include plural elements, the processing in step S1035 is repeated the number of times equal to the number of the elements. However, since the message is the ON notification this time, an array of control apparatus/service management IDs includes a single element (the control apparatus/service management ID for which the setting is performed) and the repetition does not occur.

Subsequently, the direct access management server 40 groups messages addressed to URIs of identical service servers 30 (FIG. 21: step S1036). For example, the direct access management server 40 collects messages, which are transmitted to plural control apparatus/service management IDs, from one controlled apparatus 20 for each of destination service servers and transfers the messages to the respective service servers once. Consequently, a maximum value of the number of times of message transmission in fixed time from the direct access management server 40 to the service server 30 can be controlled to the number of connected service servers 30. This contributes to a reduction in loads on the direct access management server 40 and the service server 30.

The direct access management server 40 transmits a grouped ON notification message <M-B-2> to the URI of the service server 30 (FIG. 21: step S1037). The ON notification message <M-B-2> includes an array of numbers of controlled apparatuses indicating transmission sources and an array of controlled apparatus product names, an array of control apparatus/service management IDs indicating destinations, a message type, a message (empty), a message mode indicating ON notification, and a message ID.

The service server 30 receives the ON notification message <M-B-2> from the direct access management server 40 (FIG. 17: step S931). The service server 30 specifies a destination of the user of the control apparatus 10, which is a transmission destination of the message, on the basis of the control apparatus/service management ID included in the ON notification message <M-B-2> (FIG. 17: step S932). Concerning this processing, control apparatus/service management IDs and user identification information are stored in the storing unit 31 of the service server 30 in association with each other. The ser identification information and electronic mail addresses are also stored in association with each other. Therefore, the service server 30 specifies an electronic mail address of the user of the control apparatus 10 corresponding to the control apparatus/service management ID included in the ON notification message <M-B-2> received from the direct access management server 40 as a destination of the user of the control apparatus 10, which is a transmission destination of the message. The electronic mail address of the user of the control apparatus 10 is registered in advance in the service server 30 in association with the user identification information through an application in the control apparatus 10 or through a cellular phone website. This registration of the electronic mail address may be performed simultaneously with or independently from control apparatus registration.

Subsequently, the service server 30 creates a message <M-B-3> presented to the user from the controlled apparatus product name, the message type, and the message mode included in the ON notification message <M-B-2> acquired from the direct access management server 40 (FIG. 17: step S933). The service server 30 transmits the message <M-B-3> to the destination specified in step S932 (FIG. 17: step S934).

The service server 30 judges whether it is necessary to update the message transmission setting and the additional information (FIG. 17: step S935). Specifically, in order to prevent excessive access loads from being applied to the direct access management server 40 and the service server 30 in message transmission from the controlled apparatus 20 to the service server 30, the service server 30 compares, as indexes of access loads on the service server 30 and the direct access management server 40, for example, frequency of message transmission and an upper limit value and a lower limit value set as references of update in advance with respect to the frequency and judges whether it is necessary to update the additional information. When a value of the frequency of message transmission exceeds the upper limit value, the service server 30 updates standby time of message transmission, which is a load distribution parameter, to be longer. Conversely, when a value of the frequency of message transmission is lower than the lower limit value, the service server 30 updates the standby time to be shorter. When contents of a service are changed, the service server 30 judges whether it is necessary to update the message transmission setting and creates message transmission setting including the updated contents.

When the control apparatus/service management IDs included in the ON notification message <M-B-2> received from the direct access management server 40 include plural elements, the processing from step S932 to step S936 is repeated the number of times equal to the number of the elements. However, since the processing is processing of ON notification this time, the control apparatus/service management IDs of destinations include only one element. Therefore, the processing is not performed repeatedly.

Thereafter, the service server 30 transmits a message reception response <M-B-4> including an array of response codes, an array of response messages, an array of the updated message transmission setting, and an array of the updated additional information to the direct access management server 40 (FIG. 17: step S937). The response code is a code for designating a value indicating whether a message can be normally received. For example, when a message to a control apparatus, registration of which is cancelled, is received, a service server designates an error code indicating to that effect as a response code. The response message is content that should be returned in response to the message received by the service server. In the case of an ON notification message, the response message may be empty.

The direct access management server 40 receives the message reception response <M-B-4> from the service server 30 (FIG. 21: step S1038). The direct access management server 40 repeats the processing from the message transmission in step S1037 to the message reception response in step S1038 by the number of URIs of service servers 30 retrieved in step S1035 to thereby receive the message transmission responses <M-B-4> from respective service servers 30 that provide the control apparatus 10, which controls the controlled apparatus 20, with services.

Thereafter, the direct access management server 40 transmits the message reception response <M-B-5> including the array of response codes, the array of response messages, the array of the updated message transmission setting, and the array of the updated additional information included in the message transmission responses <M-B-4> received from the respective service servers 30 to the controlled apparatus 20 (FIG. 21: step S1039) and finishes the processing.

The controlled apparatus 20 receives the message reception response <M-B-5> from the direct access management server 40 (FIG. 23: step S726). The controlled apparatus 20 judges whether the array of the updated message transmission setting and the array of the updated additional information are included in the message reception response <M-B-5> (FIG. 23: step S727). When the array of the updated message transmission setting and the array of the updated additional information are not included, the controlled apparatus 20 finishes the processing without performing any operation. When the array of the updated message transmission setting and the array of the updated additional information are included, the controlled apparatus 20 checks whether contents of the array of the updated message transmission setting and additional information are suitable for the controlled apparatus 20 (FIG. 23: step S728). When the contents of the message transmission setting and the additional information are inappropriate for the controlled apparatus 20 in this check, the controlled apparatus 20 finishes the processing. When the contents of the message transmission setting and the additional information are appropriate, the controlled apparatus 20 overwrites the message transmission setting and the additional information in the storing unit 21 (FIG. 23: step S729). Consequently, the message transmission setting of the controlled apparatus 20 is updated according a load on the service server 30. The processing for transmitting the ON notification message from the controlled apparatus 20 is finished.

3-3. Message Transmission Processing for Event Notification

Message transmission processing performed when an event occurs in the controlled apparatus 20 is explained.

Figure 8:
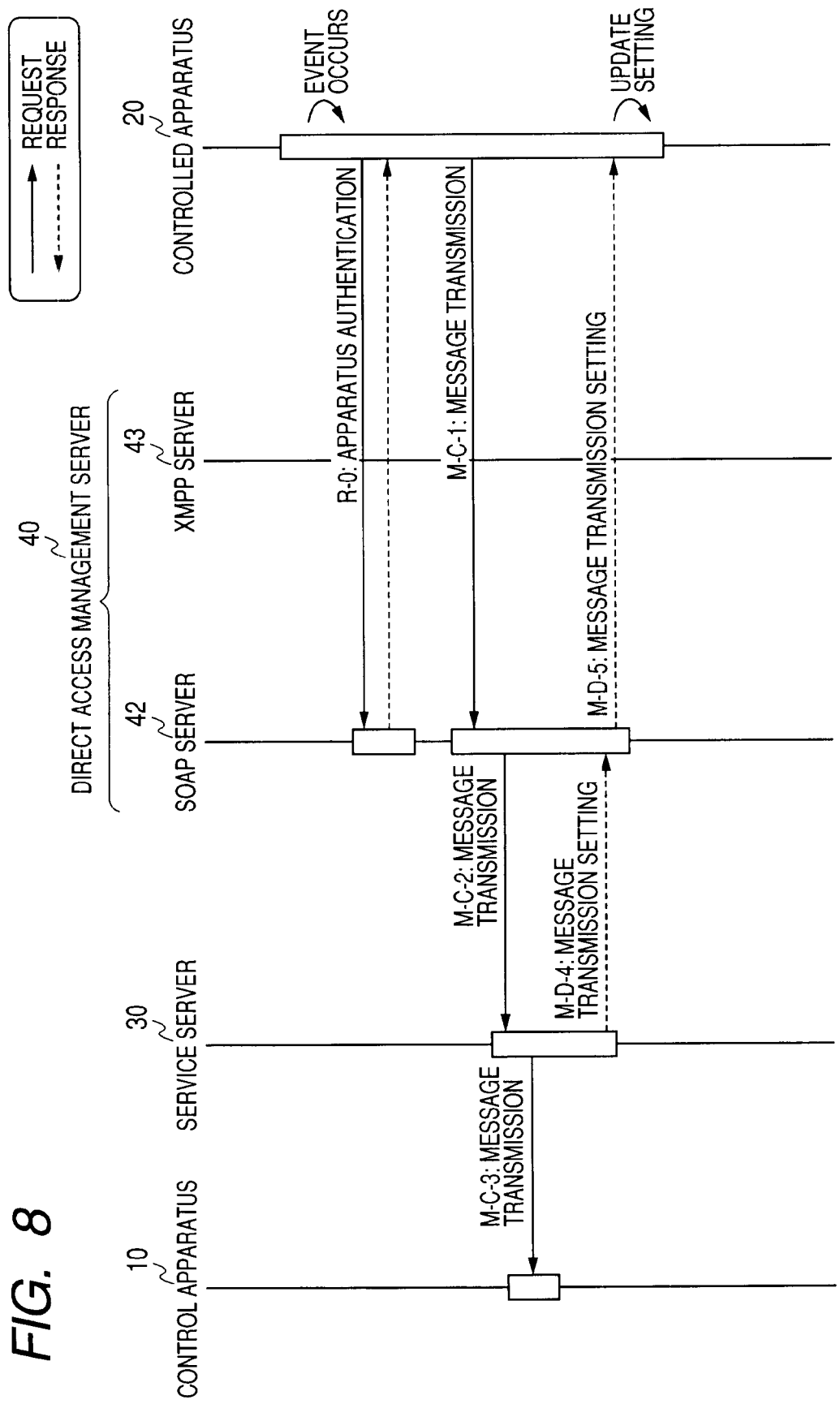
FIG. 8 is a sequence chart showing a flow of information at the time of message transmission of event notification.

FIG. 8 is a sequence chart showing a flow of information at the time of message transmission of event notification. FIG. 9 is a table in which interface functions at the time of the message transmission of the event notification are summarized.

When the controlled apparatus 20 is a DVR, events such as "recommended program", "record unavailable scheduling", "title recording completed", "deletion object title", "remaining capacity insufficiency alert", and "main body operation alert" occur.

The "recommended program" means a program particularly matching a taste of the user among programs that are candidates of automatic record scheduling but may be unable to be recorded because of overlap with other record scheduling, for example, a program including keys such as preferred genre name, title, and performer name set in advance by the user in content guide data. When the "recommended program" is detected in the controlled apparatus 20, information necessary for record scheduling of the "recommended program" is transmitted from the controlled apparatus 20 to the control apparatus 10 as a message and displayed on the display unit of the control apparatus 10. When the user of the control apparatus performs input for requesting record scheduling of the "recommended program", the request for record scheduling is transmitted from the control apparatus 10 to the controlled apparatus 20 and processing of record scheduling is performed in the controlled apparatus 20.

The "record unavailable scheduling" means scheduling that is registered in a record scheduling list but may be unable to be realized because of insufficiency of a disk remaining capacity or overlap with other scheduling. When the "record unavailable scheduling" is detected by the controlled apparatus 20, for example, scheduling information, a reason, and the like concerning the "record unavailable scheduling" are transmitted as a message and displayed on the display unit of the control apparatus 10. At this point, when the user of the control apparatus 10 desires to schedule recording of a title set as "record unavailable scheduling", the user performs input for requesting a record scheduling list. Then, the request is transmitted from the control apparatus 10 to the controlled apparatus 20 and the controlled apparatus 20 responds to the control apparatus 10 with the record scheduling list. Consequently, the record scheduling list is displayed on the display unit of the control apparatus 10. The user inputs record scheduling that the user desires to cancel in order to secure a disk remaining capacity and a request for canceling record scheduling overlapping the "record unavailable scheduling". Consequently, the request for canceling record scheduling is transmitted from the control apparatus 10 to the controlled apparatus 20 and the controlled apparatus 20 performs processing for requesting cancellation of the record scheduling.

The "title recording completed" means completion of timer recording or recording by automatic record scheduling performed by using a genre name, a title, a performer name, and the like preferred by the user as keys. When the "title recording completed" is detected by the controlled apparatus 20, a title of a program for which the recording is completed is transmitted to the control apparatus 10 as a message. When the user of the control apparatus 10 receives this notification, the user inputs, when necessary, a request for protecting storage of the program for which the recording is completed. Consequently, the request for program protection is transmitted from the control apparatus 10 to the controlled apparatus 20 and processing for program protection is performed in the controlled apparatus 20.

The "deletion object title" means a title judged as approaching the time for automatic deletion thereof in a recording apparatus having a function of automatically deleting, according to scheduling, a program recorded by the automatic record scheduling performed by using a genre name, a title, a performer name, and the like preferred by the user as keys. When the "deletion object title" is detected in the controlled apparatus 20, a title of the deletion object program is transmitted to the control apparatus 10 as a message. When the user of the control apparatus 10 receives this notification, the user inputs, when necessary, a request for protecting storage of the deletion object program. Consequently, the request for program protection is transmitted from the control apparatus 10 to the controlled apparatus 20 and processing for program protection is performed in the controlled apparatus 20.

The "remaining capacity insufficiency alert" means an alert that indicates that a disk remaining capacity of the controlled apparatus 20 is equal to or smaller than a fixed size. When the "remaining capacity insufficiency alert" is detected by the controlled apparatus 20, a disk remaining capacity is transmitted to the control apparatus 10 as a message. An indication to that effect is displayed on the display unit of the control apparatus 10. When the user of the control apparatus 10 receives this notification of "remaining capacity insufficiency", the user selects a program to be deleted among programs recorded in the controlled apparatus 20 and inputs a request for deletion of the program. Consequently, the request for deletion of the program is transmitted from the control apparatus 10 to the controlled apparatus 20 and processing for program deletion is performed in the controlled apparatus 20.

The "main body operation alert" means an alert indicating that a situation in which scheduled recording is about to be cancelled or is cancelled has occurred, for example, when operation such as direct recording or dubbing is performed during the scheduled recording. When the "main body operation alert" is detected by the controlled apparatus 20, information concerning contents of main body operation and scheduling of an object is transmitted to the control apparatus 10 as a message. An indication to that effect is displayed on the display unit of the control apparatus 10. In the controlled apparatus 20, types of events set as objects of message transmission are not limited to those described above. Any event may be adopted as long as it is considered useful to notify the controlled apparatus 20 of the event.

The controlled apparatus 20 judges that such an event has occurred (FIG. 23: step S721). In order to notify the user of the control apparatus 10 of the occurrence of the event, the controlled apparatus 20 creates an event notification message <M-C-1> including an apparatus authentication continuation ID indicating a transmission source, an array of control apparatus/service management IDs set in message transmission setting indicating a destination, a message (a recommended program, record unavailable scheduling, etc.), a message mode, and a message ID (FIG. 23: step S722). The control apparatus/service management ID indicating the destination is a control apparatus/service management ID for which necessity of message transmission is set in the message transmission setting. A value indicating a message mode of event notification is set in the message mode. A value corresponding to a type of a present event is set in the message type.

Subsequently, the controlled apparatus 20 reads out a load distribution parameter (in this embodiment, standby time) set as additional information for a message type corresponding to the event from the storing unit 21. The controlled apparatus 20 waits for the standby time to elapse (FIG. 23: step S723) and transmits the event notification message <M-C-1> to the direct access management server 40 (FIG. 23: step S724).

The operations described above are the same as those at the time of transmission of the ON notification message of the message transmission setting. In other words, the direct access management server 40 receives the event notification message <M-C-1> from the controlled apparatus 20 (FIG. 21: step S1031). When the direct access management server 40 receives the event notification message <M-C-1>, the direct access management server 40 checks the apparatus authentication continuation ID and a term of validity of the apparatus authentication continuation ID included in the event notification message <M-C-1> (FIG. 21: step S1032). When the apparatus authentication continuation ID included in the event notification message <M-C-1> does not coincide with that stored in the storing unit 41 of the direct access management server 40 or when the term of validity has expired, the controlled apparatus 20 is not normally registered in the direct access management server 40 or the controlled apparatus 20 was registered in the past but a term of validity of the apparatus authentication continuation ID at the time of registration has expired. Therefore, the direct access management server 40 transmits an error code indicating that apparatus authentication is necessary to the controlled apparatus 20 as the message reception response <M-D-5> (FIG. 21: step S1033).

The controlled apparatus 20 receives the error code indicating that apparatus authentication is necessary as the message reception response <M-D-5> (FIG. 23: step S725). The controlled apparatus transmits the apparatus authentication request <R-0> including information concerning an authentication system and apparatus authentication information set in the controlled apparatus 20 in advance to the SOAP server 42 in the direct access management server 40 (FIG. 23: step S730). When the authentication system coincides with the authentication system determined in advance and the apparatus authentication information is a format of the authentication system determined in advance, the controlled apparatus 20 receives the apparatus authentication response <R-0R> including the apparatus authentication continuation ID and the information concerning the term of validity thereof from the SOAP server 42 in the direct access management server 4 (FIG. 23: step S731). The controlled apparatus 20 stores the apparatus authentication continuation ID and the information concerning the term of validity thereof included in the apparatus authentication response <R-0R> in the storing unit 21 in association with the apparatus authentication information (FIG. 23: step S732). Thereafter, the controlled apparatus 20 returns to step S724 and transmits the message <M-C-1> to the direct access management server 40 again.

When an affirmative result is obtained as a result of the check in step S1032 in FIG. 21, i.e., the apparatus authentication continuation ID included in the message <M-C-1> received from the controlled apparatus 20 coincides with that stored in the storing unit 41 and the term of validity of the apparatus authentication continuation ID has not expired, the direct access management server 40 retrieves a controlled apparatus management ID and apparatus authentication information corresponding to the apparatus authentication continuation ID from the storing unit 41 (FIG. 21: step S1034). Subsequently, the direct access management server 40 retrieves a number of the controlled apparatus 20 allocated to the retrieved controlled apparatus management ID again and stored in the storing unit 41 and retrieves a URI of the service server 30 stored in the storing unit 41 in association with the control apparatus/service management ID included in the message <M-B-1> received from the controlled apparatus 20 (FIG. 21: step S1035). When control apparatus/service management IDs included in the message <M-C-1> received from the controlled apparatus 20 include plural elements, the processing of URI search of the service server 30 in the step S1035 is repeated the number of times equal to the number of the elements.

Subsequently, the direct access management server 40 groups messages addressed to URIs of identical service servers 30 (FIG. 21: step S1036). The direct access management server 40 transmits the event notification message <M-C-2> to the URIs of the respective service servers 30 (FIG. 21: step S1037). In the event notification message <M-C-2>, an array of numbers of controlled apparatuses indicating transmission sources and an array of controlled apparatus product names, an array of control apparatus/service management IDs indicating destinations, a message type, a message, a message mode, and a message ID are included The service server 30 receives the event notification message <M-C-2> from the direct access management server 40 (FIG. 17: step S931). The service server 30 specifies a destination of the control apparatus 10, which is a transmission destination of the message, on the basis of the control apparatus/service management ID included in the event notification message <M-C-2> (FIG. 17: step S932). As described above, the electronic mail address of the user of the control apparatus 10 is specified.

Subsequently, the service server 30 creates an event notification message <M-C-3> presented to the user from contents of the event notification message <M-C-2> acquired from the direct access management server 40 (FIG. 17: step S933) The service server 30 transmits the event notification message <M-C-3> to the destination specified in step S932 with, for example, an electric mail (FIG. 17: step S934). The control apparatus 10 receives the event notification message <M-C-3> from the service server 30 with the electronic mail or the like (FIG. 13: step S821). The control apparatus 10 displays contents of the event notification message <M-C-3> on the display unit and presents the message to the user (FIG. 13: step S822).

Thereafter, the service server 30 judges whether it is necessary to update the message transmission setting and the additional information in the same manner as the judgment at the time of transmission of the ON notification message of the message transmission setting (FIG. 17: step S935). When necessary, the service server 30 updates the message transmission setting and the additional information for each of the control apparatus/service management IDs (FIG. 17: step S936).

When the control apparatus/service management IDs included in the event notification message <M-C-2> received from the direct access management server 40 include plural elements, the service server 30 repeats the processing in step S932 to step S936 the number of times equal to the number of the elements.

Thereafter, the service server 30 transmits a message reception response <M-D-4> including an array of response codes, an array of response messages, an array of the updated message transmission setting, and an array of the updated additional information to the direct access management server 40 (FIG. 17: step S937).

The direct access management server 40 receives the message reception response <M-D-4> from the service server 30 (FIG. 21: step S1038). The direct access management server 40 repeats the processing from the message transmission in step S1037 to the message reception response in step S1038 by the number of URIs of the service server 30 retrieved in step S1035 to thereby receive message transmission responses <M-D-4> from respective service servers 30 that provide the control apparatus 10, which controls the controlled apparatus 20, with services.

Thereafter, the direct access management server 40 transmits the message reception response <M-D-5> including the array of response codes, the array of response messages, the array of the updated message transmission setting, and the array of the updated additional information extracted from the message transmission responses <M-D-4> received from the respective service servers 30 to the controlled apparatus 20 (FIG. 21: step S1039) and finishes the processing.

The controlled apparatus 20 receives the message reception response <M-D-5> from the direct access management server 40 (FIG. 23: step S726). The controlled apparatus 20 judges whether the updated message transmission setting and the updated additional information are included in the message reception response <M-D-5> (FIG. 23: step S727). When the updated message transmission setting and the updated additional information are not included, the controlled apparatus 20 finishes the processing without performing any operation. When the updated message transmission setting and the updated additional information are included, the controlled apparatus 20 checks whether contents of the updated message transmission setting and additional information are suitable for the controlled apparatus 20 (FIG. 23: step S728). When the contents of the message transmission setting and the additional information are inappropriate for the controlled apparatus 20 in this check, the controlled apparatus 20 finishes the processing. When the contents of the message transmission setting and the additional information are appropriate, the controlled apparatus 20 overwrites the message transmission setting and the additional information in the storing unit 21 (FIG. 23: step S729). The message transmission processing for event notification is finished.

3-4. Processing for Directly Transmitting the Event Notification Message to the Service Server 30

The method of performing the message transmission of the event notification from the controlled apparatus 20 to the service server 30 via the direct access management server 40 is explained. In the case of this method, there is no problem when a relatively small message is handled. However, when large data is handled, a burden on the direct access management server 40 increases and efficiency is deteriorated. Therefore, when a relatively large message is transmitted, a message may be directly transmitted from the controlled apparatus 20 to the service server 30. This method is explained below.

Figure 10:
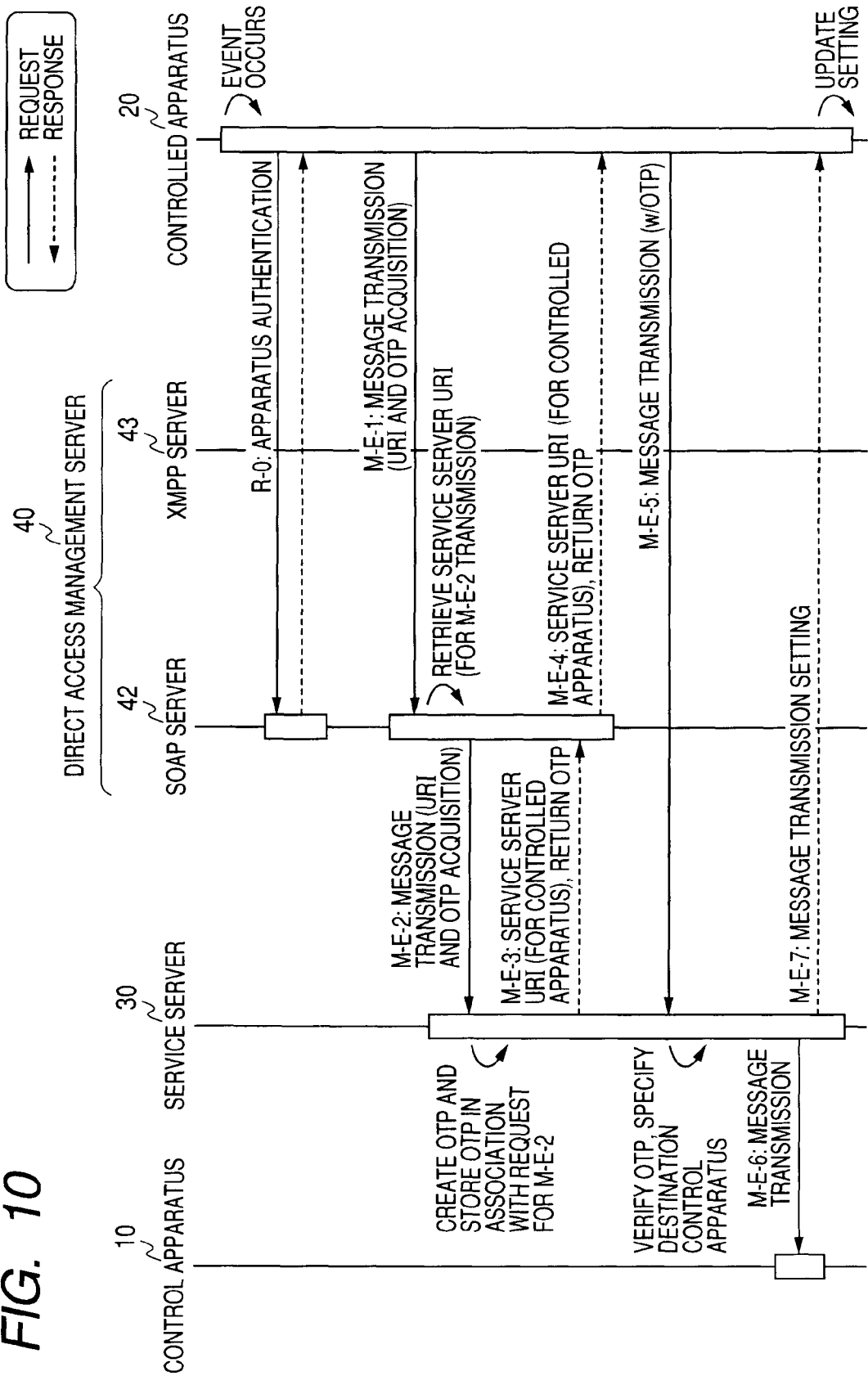
FIG. 10 is a sequence chart showing a flow of information at the time of processing of direct message transmission to a service server performed when an event occurs.
Figure 24:
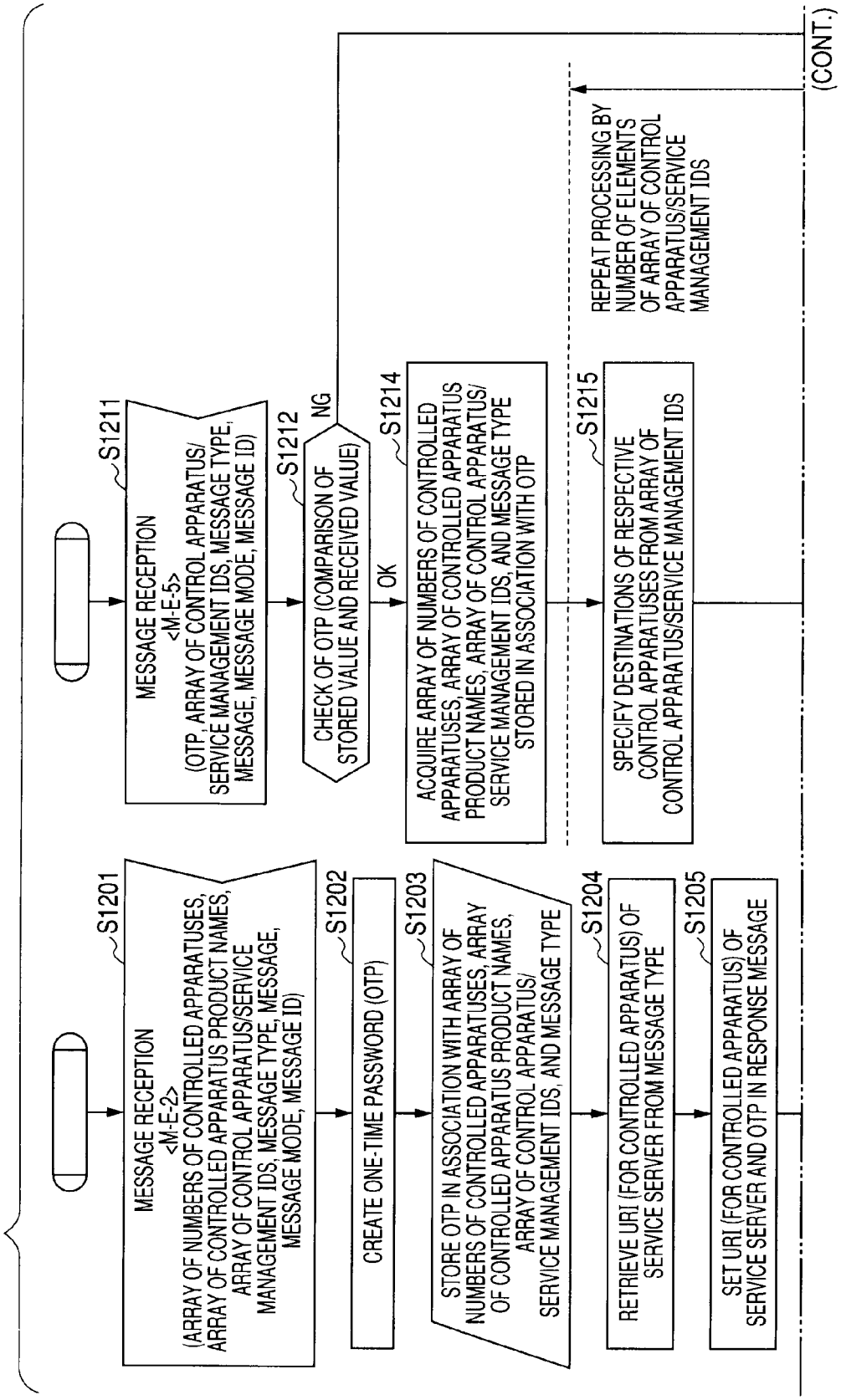
FIG. 24 is a flowchart showing operations of the service server at the time of the processing of direct message transmission.
Figure 25:
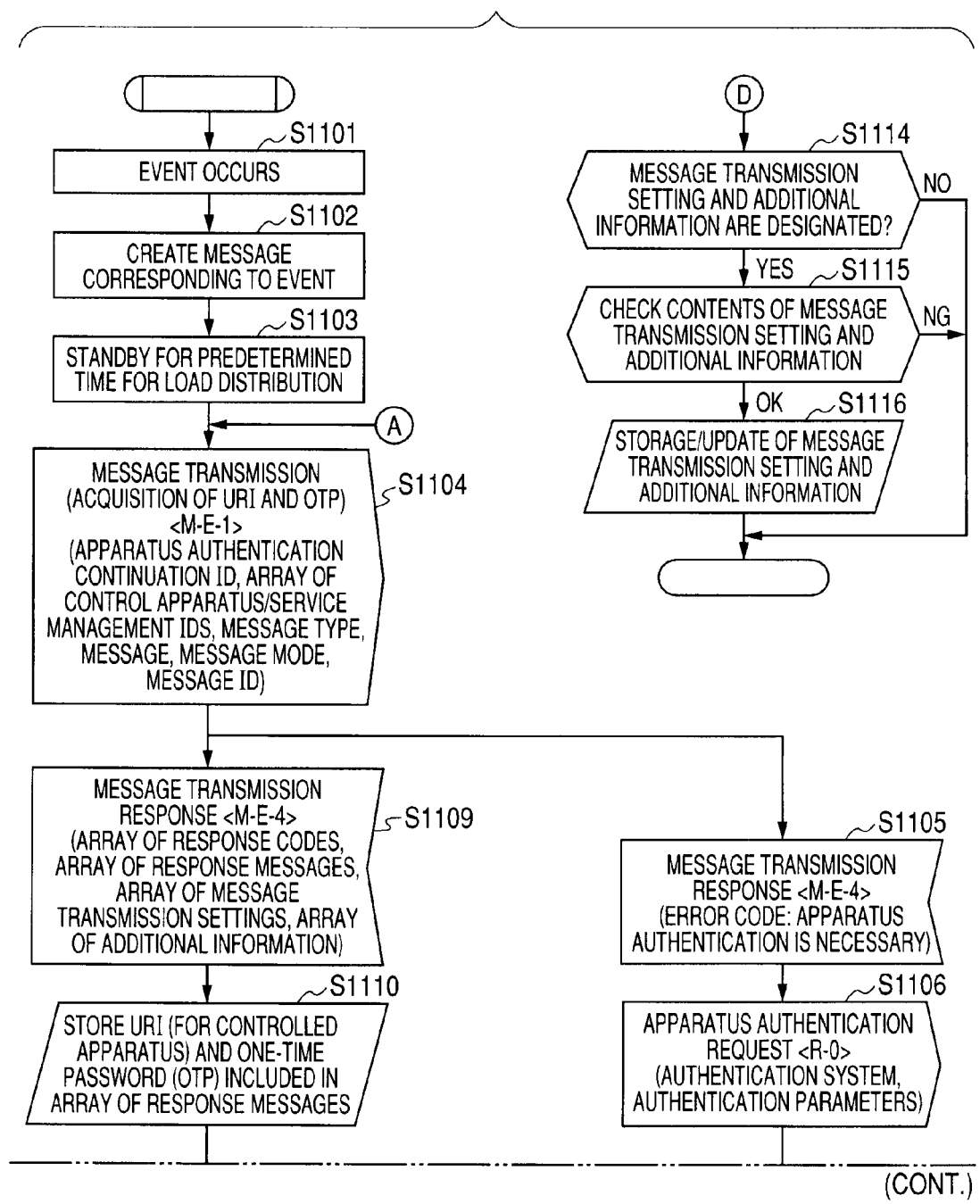
FIG. 25 is a flowchart showing operations of the controlled apparatus at the time of the processing of direct message transmission.

FIG. 10 is a sequence chart showing a flow of information at the time of processing of direct message transmission to the service server 30 performed when an event occurs. FIG. 11 is a table in which interface functions at the time of the processing of direct message transmission shown in FIG. 10 are summarized. Operations of the direct access management server 40 at the time of the processing of direct message transmission are as shown in FIG. 21. FIG. 24 is a flowchart showing operations of the service server 30 at the time of the processing of direct message transmission. FIG. 25 is a flowchart showing operations of the controlled apparatus 20 at the time of the processing of direct message transmission.

In this method, an operation of the controlled apparatus 20 for storing message transmission setting and transmitting an ON notification message of the message transmission setting is the same as that in the method described above.

The controlled apparatus 20 judges that an event has occurred (FIG. 25: step S1110). The controlled apparatus 20 creates a message <M-E-1> of acquisition of a service server URI and a one-time password (OTP) including an apparatus authentication continuation ID indicating a transmission source, an array of control apparatus/service management IDs indicating destinations, a message type, a message (empty), a message mode, and a message ID (FIG. 25: step S1102). In the message mode, a value indicating a message mode for acquiring a service server URI for the controlled apparatus 20 and a one-time password (OTP) for security control is set.

The controlled apparatus 20 reads out a load distribution parameter (in this embodiment, standby time) set as additional information with respect to the message type corresponding to the event from the storing unit 21. The controlled apparatus 20 waits for the standby time to elapse (FIG. 25: step S1103) and transmits the message <M-E-1> of acquisition of a service server URI and a one-time password (OTP) to the direct access management server 40 (FIG. 25: step S1104).

The direct access management server 40 receives the message <M-E-1> from the controlled apparatus (FIG. 21: step S1031). The direct access management server 40 checks the apparatus authentication continuation ID and a term of validity of the apparatus authentication continuation ID included in the message <M-E-1> (FIG. 21: step S1032>. When the apparatus authentication continuation ID included in the message <M-E-1> does not coincide with that stored in the storing unit 41 of the direct access management server 40 or when the term of validity has expired, the controlled apparatus is not normally registered in the direct access management server 40 or the controlled apparatus 20 was registered in the past but a term of validity of the apparatus authentication continuation ID at the time of registration has expired. Therefore, the direct access management server 40 transmits an error code indicating that apparatus authentication is necessary to the controlled apparatus 20 as the message reception response <M-E-4> (FIG. 21: step S1033).

The controlled apparatus 20 receives the error code indicating that the apparatus authentication is necessary as the message reception response <M-E-4> (FIG. 25: step S1105). The controlled apparatus 20 transmits an apparatus authentication request <R-0> including information concerning an authentication system and apparatus authentication information set in the controlled apparatus 20 itself in advance to the SOAP server 42 in the direct access management server 40 (FIG. 25: step S1106). When the authentication system coincides with the authentication system determined in advance and the apparatus authentication information is a format of the authentication system determined in advance, the controlled apparatus 20 receives the apparatus authentication response <R-0R> including the apparatus authentication continuation ID and the information concerning the term of validity thereof from the SOAP server 42 in the direct access management server 4 (FIG. 25: step S1107). The controlled apparatus 20 stores the apparatus authentication continuation ID and the information concerning the term of validity thereof included in the apparatus authentication response <R-0R> in the storing unit 21 in association with the apparatus authentication information (FIG. 25: step S1108). Thereafter, the controlled apparatus 20 returns to step S1104 and transmits the message <M-E-1> to the direct access management server 40 again.

When an affirmative result is obtained as a result of the check in step S1032 in FIG. 21, i.e., the apparatus authentication continuation ID included in the message <M-E-1> received from the controlled apparatus 20 coincides with that stored in the storing unit 41 and the term of validity of the apparatus authentication continuation ID has not expired, the direct access management server 40 retrieves a controlled apparatus management ID and apparatus authentication information corresponding to the apparatus authentication continuation ID from the storing unit 41 (FIG. 21: step S1034). Subsequently, the direct access management server 40 retrieves a number of the controlled apparatus 20 allocated to the retrieved controlled apparatus management ID again and stored in the storing unit 41 and retrieves a URI of the service server 30 stored in the storing unit 41 in association with the control apparatus/service management ID included in the message <M-E-1> received from the controlled apparatus 20 (FIG. 21: step S1035). When control apparatus/service management IDs included in the message <M-E-1> received from the controlled apparatus 20 include plural elements, the processing in the step S1035 is repeated the number of times equal to the number of the elements.

Subsequently, the direct access management server 40 groups messages addressed to URIs of identical service servers 30 (FIG. 21: step S1036). The direct access management server 40 transmits an event notification message <M-E-2> to the URIs of the respective service servers 30 (FIG. 21: step S1037). The event notification message <M-E-2> includes an apparatus authentication continuation ID indicating a transmission source, an array of control apparatus/service management IDs indicating destinations, a message type, a message (empty), a message mode indicating the mode for acquiring a service server URI for the controlled apparatus and a one-time password (OTP) for security control, and a message ID.

The service server 30 receives the event notification message <M-E-2> from the direct access management server 40 (FIG. 24: step S1201). The service server 30 creates a one-time password (OTP) necessary for the controlled apparatus 20 to directly access the service server 30 (FIG. 24: step S1202). The service server 30 stores the one-time password (OTP) in the storing unit 31 in association with an array of numbers of the controlled apparatuses indicating transmission sources and an array of controlled apparatus product names, the array of the control apparatus/service management IDs indicating destinations, and the message type included in the message <M-E-2> received from the direct access management server 40 (FIG. 24: step S1203).

Subsequently, the service server 30 specifies a URI for a controlled apparatus of the service server 30, which is a transmission destination of a notification message of an event that has occurred in the controlled apparatus 20, on the basis of the message type included in the message <M-E-2> (FIG. 24: step S1204). In order to perform this processing, the service server 30 holds a correspondence table of message types and URIs for the controlled apparatus of the service server 30 in advance in the storing unit 31.

The service server 30 creates a response message including the one-time password (OTP) created in step S1202 and the URI for the controlled apparatus of the service server 30 specified in step S1204 (FIG. 24: step S1205). The service server 30 transmits a message reception response <M-E-3> including an array of response codes, an array of response messages, an array of message transmission settings (not designated), and an array of additional information (not designated) to the direct access management server 40 and finishes the processing (FIG. 24: step S1206).

The direct access management server 40 receives the message reception response <M-E-3> from the service server 30 (FIG. 21: step S1038). The direct access management server 40 repeats the processing from the message transmission in step S1037 to the message reception response in step S1038 by the number of URIs of service servers 30 retrieved in step S1035 to thereby receive the message transmission responses <M-E-3> from respective service servers 30 that provide the control apparatus 10, which controls the controlled apparatus 20, with services.

Thereafter, the direct access management server 40 transmits the message reception response <M-E-4> including the array of response codes, the array of response messages, the array of message transmission settings (not designated), and the array of additional information (not designated) included in the message transmission responses <M-B-4> extracted from message transmission responses <M-E-3> received from the respective service servers 30 to the controlled apparatus 20 (FIG. 21: step S1039) and finishes the processing.

The controlled apparatus 20 receives the message reception response <M-E-4> from the direct access management server 40 (FIG. 25: step S1109). The controlled apparatus 20 extracts a combination of the one-time password (OTP) and the URI for the controlled apparatus of the service server 30 from the array of response messages included in the message reception response <M-E-4> and stores the combination in the storing unit 21 (FIG. 25: step S1110). Thereafter, the controlled apparatus 20 groups messages to URIs for controlled apparatuses of identical service servers 30 (FIG. 25: step S1111). The controlled apparatus 20 transmits a message <M-E-5> including the one-time password (OTP), the array of control apparatus/service management IDs, the message type, the message, and the message ID to the URIs for controlled apparatuses of the respective service servers 30 (FIG. 25: step S1112).

The service server 30 receives the message <M-E-5> from the controlled apparatus 20 (FIG. 24: step S1211). The service server 30 checks whether the one-time password (OTP) included in the message <M-E-5> coincides with that stored in the storing unit 31 (FIG. 24: step S1212). When the one-time passwords do not coincide with each other, the service server 30 transmits an error code indicating that the one-time password (OTP) is an invalid one-time password (OTP) to the controlled apparatus 20 as a message reception response <M-E-7> (FIG. 24: step S1213).

When the one-time passwords coincide with each other, the service server 30 acquires an array of numbers of controlled apparatuses, an array of controlled apparatus product names, an array of control apparatus/service management IDs, and a message type stored in the storing unit 31 in association with the one-time password (FIG. 24: step S1214). The service server 30 specifies a destination of the control apparatus 10, which is a transmission destination of an event notification message, on the basis of the acquired array of control apparatus/service management IDs (FIG. 24: step S1215). More specifically, this processing is performed as described below. In the storing unit 31 of the service server 30, control apparatus/service management IDs and user identification information are stored in association with each other. The user information and an electronic mail address of the user of the control apparatus 10 are also stored in association with each other. The service server 30 reads out the electronic mail address of the user of the control apparatus 10 corresponding to the control apparatus/service management ID included in the message <M-E-5> received from the controlled apparatus 20 from the storing unit 31 and specifies the electronic mail address as a destination of the control apparatus 10, which is the transmission destination of the event notification message.

Subsequently, the service server 30 creates an event notification message <M-E-6> presented to the user from contents of the message <M-E-5> from the controlled apparatus 20 (FIG. 24: step S1216) and transmits the event notification message <M-E-6> to the destination specified in step S1215 with, for example, an electronic mail (FIG. 24: step S1217). The control apparatus 10 receive the event notification message <M-E-6> from the service server 30 with the electronic mail or the like (FIG. 13: step S821). The control apparatus 10 displays contents of the event notification message <M-E-6> on the display unit and presents the contents to the user (FIG. 13: step S822).

Thereafter, in order to prevent excessive access loads from being applied to the direct access management server 40 and the service server 30 by message transmission from the controlled apparatus 20 to the service server 30, the service server 30 compares frequency of message transmission and an upper limit value and a lower limit value set as references of update in advance with respect to the frequency and judges whether it is necessary to update the message transmission setting and the additional information for each of the control apparatus/service management IDs (FIG. 24: step S1218). When a value of the frequency of message transmission exceeds the upper limit value in this judgment, the service server 30 updates standby time of message transmission, which is a load distribution parameter, to be longer. Conversely, when a value of the frequency of message transmission is lower than the lower limit value, the service server 30 updates the standby time to be shorter (FIG. 24; step S1219).

When the control apparatus/service management IDs included in the event notification message <M-E-5> received from the controlled apparatus 20 include plural elements, the service server 30 repeats the processing from step S1215 to step S1219 the number of times equal to the number of the elements.

Thereafter, the service server 30 transmits a message reception response <M-E-7> including an array of response codes, an array of response messages, an array of the updated message transmission setting, and an array of the updated additional information to the controlled apparatus 20 (FIG. 24: step S1220).

The controlled apparatus 20 receives the message reception response <M-E-7> from the service server 30 (FIG. 25: step S1113). The controlled apparatus 20 repeats the processing from the transmission of the message <M-E-5> in step S1112 to the reception of the message reception response <M-E-7> in step S1113 by the number of the URIs of the service servers 30 retrieved in step S1111 to thereby receive message transmission responses <M-E-7> from the respective service servers 30 that provide the control apparatus 10, which controls the controlled apparatus 20, with services.

The controlled apparatus 20 judges whether the updated message transmission setting and the update additional information are included in the message transmission responses <M-E-7> received from the respective service servers 30 (FIG. 25: step S1114). When the updated message transmission setting and the updated additional information are not included, the controlled apparatus 20 finishes the processing without performing any operation. When the updated massage transmission setting and the updated additional information are included, the controlled apparatus 20 checks whether contents of the message transmission setting and the additional information are appropriate for the controlled apparatus 20 (FIG. 25: step S1115). When the contents of the message transmission setting and the additional information are inappropriate for the controlled apparatus 20 in this check, the controlled apparatus 20 finishes the processing. When the contents are appropriate, the controlled apparatus 20 overwrites the message transmission setting and the additional information in the storing unit 21 (FIG. 25: step S1116). The processing of direct message transmission to the service server 30 at the time of occurrence of an event is finished.

As explained above, with the network system according to this embodiment, the control apparatus 10 can flexibly perform message transmission setting concerning an event on the controlled apparatus 20, which is a network home appliance. It is possible to set necessity of message transmission for each event (message type) and for each control apparatus/service management ID and perform message transmission setting flexibly and in detail.

Moreover, with the network system according to this embodiment, when a change of a service or the like is performed in the service server 30, the service server 30 generates message transmission setting including contents of the change of the service and transmits the message transmission setting to the controlled apparatus 20 in transmitting a message in response to message transmission from the controlled apparatus 20. Consequently, it is possible to update message transmission setting stored in the controlled apparatus 20 to latest contents.

With the network system according to this embodiment, the service server 30 monitors an access load for message transmission and transmits, to prevent the access load from increasing to be excessive, additional information, which is a load parameter, to the controlled apparatus 20 in transmitting a message in response to message transmission from the controlled apparatus 20. Consequently, it is possible to improve stability of the system.

The configuration and the operations of the network system according to the embodiment of the present invention have been explained. However, it is also possible to transfer a part of the functions of the service server 30 to the control apparatus 10. For example, a sequence of use of message transmission setting starting from an XMPP login request can be directly performed between the control device 10 and the direct access management server 40 by transferring the function of accessing the SOAP interface of the service server 30 to the control apparatus 10.

In the embodiment explained above, the service server 30 is arranged between the control apparatus 10 and the direct access management server 40. Therefore, the direct access management server 40 stores a control apparatus/service management ID and a controlled apparatus management ID, which are created for a combination of the control apparatus 10 and the service server 30, in association with each other. However, the present invention is not limited to this. The present invention can also be used in an environment in which communication is directly performed between a control apparatus and the direct access management server 40 without the intervention of the service server 30. In this case, the direct access management server 40 creates a control apparatus management ID for identifying the control apparatus instead of the control apparatus/service management ID in the embodiment and stores the control apparatus management ID in association with the controlled apparatus management ID. The control apparatus management ID may be created by the direct access management server. When a control apparatus can disclose an ID with which the control apparatus can be identified, the ID given by the control apparatus may be used as the control apparatus management ID associated with the controlled apparatus management ID. The same applies to the controlled apparatus management ID. When a control apparatus can disclose an ID with which the controlled apparatus can be identified, the ID given by the controlled apparatus may be used as the controlled apparatus management ID associated with the control apparatus management ID. Each of apparatuses connected to the direct access management server 40 as a control apparatus and a controlled apparatus may have both a section for performing control of the other apparatus and a section controlled by the other apparatus.

It goes without saying that the present invention is not limited to only the embodiment and various modifications of the invention are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A network system comprising:
a plurality of terminal apparatuses;
a network home appliance controlled by the terminal apparatuses;
a service server that provides the terminal apparatuses with a service for controlling the network home appliance through a network; and
a direct access management server that performs exchange of information to directly access the network home appliance through the network, wherein
the network home appliance includes:
a first storing unit that stores
a plurality of management IDs, each one of the management IDs representing a combination of a terminal apparatus and a service; and
for each management ID, a plurality of message transmission settings, each of the message transmission settings indicating whether a message must be transmitted to the terminal apparatus corresponding to the respective management ID when a corresponding one of different events occurs in the network home appliance; and
a message transmitting unit that judges, when an event of the different events occurs, whether a message concerning the event must be transmitted to the terminal apparatus based on the message transmission setting stored in the first storing unit and transmits, when transmission is necessary, the message including the management ID corresponding to the message transmission setting,
the direct access management server includes a first message-transmission processing unit that specifies the service server based on the management ID included in the message received from the network home appliance and transmits the message to the service server, and
the service server includes a second message-transmission processing unit that specifies a destination of a terminal apparatus based on the management ID included in the message received from the direct access management server and transmits the message to the destination.

2. A network system according to claim 1, wherein
each terminal apparatus includes a first message-transmission-setting processing unit that transmits a first message transmission setting request including at least one message transmission setting and user identification information, which should be registered in the network home appliance, to the service server,
the service server includes:
a second storing unit that stores the user identification information and the management IDs in association with each other; and
a second message-transmission-setting processing unit that acquires, from the second storing unit, a management ID corresponding to the user identification information included in the first message transmission setting request received from a terminal apparatus and transmits a second message transmission setting request including the management ID and the at least one message transmission setting to the direct access management server, and the direct access management server includes:
a third storing unit that stores the management IDs and a controlled apparatus management ID allocated to the network home appliance in association with each other; and
a third message-transmission-setting processing unit that acquires, from the third storing unit, a controlled apparatus management ID associated with the management ID included in the second message transmission setting request received from the service server and transmits a third message transmission setting request including the at least one message transmission setting to the network home appliance to which the controlled apparatus management ID is allocated.

3. A network system according to claim 1, wherein the at least one message transmission setting further includes information indicating whether a message must be transmitted to the terminal apparatus for each of event types.

4. A network system according to claim 1, wherein
the service server further includes a first update-information transmitting unit that generates update information for the at least one message transmission setting stored in the first storing unit of the network home appliance and transmits the update information to the network home appliance through the direct access management server, and
the network home appliance further includes a setting-information-update processing unit that updates the at least one message transmission setting stored in the first storing unit on the basis of the update information.

5. A network system according to claim 1, wherein the at least one message transmission setting further includes a load distribution parameter for message transmission processing as additional information.

6. A network system according to claim 5, wherein the load distribution parameter is delay time of message transmission.

7. A network system according to claim 5, wherein
the service server further includes a second update-information transmitting unit that generates update information for the additional information stored in the first storing unit of the network home appliance and transmits the update information to the network home appliance via the direct access management server, and
the network home appliance further includes an additional-information-update processing unit that updates the additional information stored in the first storing unit based on the update information.

8. A network system according to claim 1, wherein, when the at least one message transmission setting concerning an event of the plural different events is set in the network home appliance, the message transmitting unit of the network home appliance transmits a confirmation of this setting as the message.

9. A network system according to claim 1, wherein
the message transmitting unit of the network home appliance judges, when the event of the plural different events occurs, whether a message concerning the event must be transmitted to the terminal apparatus based on the message transmission setting stored in the first storing unit, transmits, when a transmission is necessary, an acquisition request for information necessary for the network home appliance to access the service server to the direct access management server as the message, and transmits the message concerning the event to the service server based on information returned from the direct access management server, and the direct access management server further includes an access-information providing unit that acquires information necessary for accessing the service server, which corresponds to the management ID included in the message of acquisition request from the network home appliance, from the service server and responds to the network home appliance.

10. A network system according to claim 9, wherein the information necessary for accessing the service server provided by the access-information providing unit of the direct access management server includes a one-time password.

11. A message processing method for a network system including a plurality of terminal apparatuses, a network home appliance controlled by the terminal apparatuses, a service server that provides the terminal apparatuses with a service for controlling the network home appliance through a network, and a direct access management server that performs exchange of information to directly access the network home appliance through the network, the message processing method comprising:
storing, in a first storing unit of the network home appliance
a plurality of management IDs, each one of the management IDs representing a combination of a terminal apparatus and a service; and
for each management ID, a plurality of message transmission settings, each of the message transmission settings indicating whether a message must be transmitted to the terminal apparatus corresponding to the respective management ID when a corresponding one of different events occurs in the network home appliance;
judging, by a message transmitting unit of the home network appliance when an event of the different events occurs, whether a message concerning the event must be transmitted to the terminal apparatus based on the message transmission setting stored in the first storing unit;
transmitting, when transmission is necessary, the message including the management ID corresponding to the message transmission setting;
determining, by a first message transmission processing unit of the direct access management server, the service server based on the management ID included in the message received from the network home appliance and transmits the message to the service server; and
determining, by a second message transmission processing unit of the service server, a destination of a terminal apparatus based on the management ID included in the message received from the direct access management server and transmits the message to the destination.

12. A message processing method for a network system according to claim 11, further comprising:
transmitting a first message transmission setting request by a first message transmission setting processing unit of a terminal apparatus including the message transmission setting and user identification information, which is registered in the network home appliance, to the service server;
storing, in a second storing unit of the service server, the user identification information and the management IDs in association with each other;

acquiring, by a second message transmission setting processing unit of the service server from the second storing unit, a management ID corresponding to the user identification information included in the first message transmission setting request received from the terminal apparatus and transmits a second message transmission setting request including the management ID and the message transmission setting to the direct access management server;

storing, in a third storing unit of the direct access management server, the management IDs and a controlled apparatus management ID allocated to the network home appliance in association with each other; and acquiring, by a third message transmission setting processing unit of the direct access management server from the third storing unit, a controlled apparatus management ID associated with the management ID included in the second message transmission setting request received from the service server and transmits a third message transmission setting request including the setting information to the network home appliance to which the controlled apparatus management ID is allocated.

13. A message processing method for a network system according to claim 11, wherein the message transmission setting further includes information indicating whether a message must be transmitted to the terminal apparatus for each of event types.

14. A message processing method for a network system according to claim 11, further comprising:

generating update information for the message transmission setting stored in the first storing unit of the network home appliance by a first update information transmitting unit of the service server and transmitting the update information to the network home appliance through the direct access management server; and updating the message transmission setting stored in the first storing unit by a setting information update processing unit of the network home appliance based on the update information.

15. A message processing method for a network system according to claim 11, wherein the message transmission setting further includes a load distribution parameter for message transmission processing as additional information.

16. A message processing method for a network system according to claim 15, wherein the load distribution parameter is delay time of message transmission.

17. A message processing method for a network system according to claim 15, further comprising:

generating update information for the additional information stored in the first storing unit of the network home appliance by a second update information transmitting unit of the service server and transmitting the update information to the network home appliance via the direct access management server;

updating the additional information stored in the first storing unit by an additional information update processing unit of the network home appliance based on the update information.

18. A message processing method for a network system according to claim 11, further comprising:

transmitting, by the message transmitting unit of the network home appliance, when the at least one message transmission setting concerning an event of the different events is set in the network home appliance, a confirmation of this setting as the message.

19. A message processing method for a network system according to claim 11, further comprising:

judging, by the message transmitting unit of the network home appliance, when an event of the different events occurs, whether a message concerning the event must be transmitted to a terminal apparatus based on the message transmission setting stored in the first storing unit;

transmitting, when a transmission is necessary, an acquisition request for information necessary for the network home appliance to access the service server to the direct access management server as the message;

acquiring information necessary for accessing the service server, which corresponds to the management ID included in the message of acquisition request from the network home appliance, by an access information providing unit of the direct access management server from the service server and responding by the direct access management server to the network home appliance; and transmitting the message concerning the event by the message transmitting unit of the network home appliance to the service server based on information returned from the direct access management server.

20. A message processing method for a network system according to claim 19, wherein the information necessary for accessing the service server provided by the access-information providing unit of the direct access management server includes a one-time password.

21. A service server that is connected to a network together with a plurality of terminal apparatuses, a network home appliance controlled by the terminal apparatuses, and a direct access management server that performs exchange of information to directly access the network home appliance through the network, the service server providing the terminal apparatuses with a service for controlling the network home appliance through the network, the service server comprising:

a second storing unit that stores user identification information for identifying a user of a terminal apparatus, and a plurality of management IDs, each one of the management IDs representing a combination of a terminal apparatus and a service, the user identification information being stored in association with at least one of the plurality of management IDs; and a second message-transmission-setting processing unit that receives from the terminal apparatus a first message transmission setting request concerning an event of plural different events which occur in the network home appliance, the first message transmission setting request including at least one message transmission setting for each of the management IDs, each of the message transmission settings indicating whether a message must be transmitted to the terminal apparatus corresponding to the respective management ID when a corresponding one of the plural different events occurs in the network home appliance, the first message transmission setting request further including user identification information, acquires from the second storing unit a management ID corresponding to the user identification information included in the first message transmission setting request received from the terminal apparatus in order to transmit the message transmission setting to the network home appliance through the direct access management server and cause the network home appliance to store the message transmission setting, and transmits a second message transmission setting request including the management ID and the message transmission setting to the direct access management server.

22. A direct access management server connected to a network together with a plurality of terminal apparatuses, a network home appliance controlled by the terminal apparatuses, and a service server according to claim 21 and performs exchange of information to directly access the network home appliance through the network, the direct access management server comprising:
a third storing unit that stores
a plurality of management IDs, each one of the management IDs representing a combination of a terminal apparatus and a service, and
a controlled apparatus management ID allocated to the network home appliance in association with one of the plurality of management IDs; and
a third message-transmission-setting processing unit that
acquires, from the third storing unit, when the second message transmission setting request is received from the service server, a controlled apparatus management ID associated with the management ID included in the second message transmission setting request in order to transmit the setting information to the network home appliance and cause the network home appliance to store the message transmission setting and
transmits a third message transmission setting request including the message transmission setting to the network home appliance to which the controlled apparatus management ID is allocated.

23. A network home appliance connected to a network together with a plurality of terminal apparatuses, a service server according to claim 21, and a direct access management server according to claim 22, the network home appliance comprising:
a first storing unit that stores the message transmission setting included in the third message transmission setting request received from the direct access management server; and
a message transmitting unit that
judges, when an event of the different events occurs, whether a message concerning the event must be transmitted to a terminal apparatus based on the at least one message transmission setting stored in the first storing unit, and
transmits to the terminal apparatus, when a transmission is necessary, the message including the management ID included in the message transmission setting.

24. A computer readable storage medium storing computer readable instructions thereon which, when executed by a computer, cause the computer to perform a method of controlling a service server connected to a network together with a plurality of terminal apparatuses, a network home appliance controlled by the terminal apparatuses, and a direct access management server that performs exchange of information to directly access the network home appliance through the network, the service server providing the terminal apparatuses with a service for controlling the network home appliance through the network, the method comprising:
storing in a second storing unit
user identification information for identifying a user of a terminal apparatus, and
a plurality of management IDs, each one of the management IDs representing a combination of a terminal apparatus and a service, the user identification information being stored in association with one of the plurality of management IDs;
receiving a first message transmission setting request concerning an event of plural different events which occur in the network home appliance, the first message transmission setting request including at least one message transmission setting for each of the management IDs, each of the message transmission settings indicating whether a message must be transmitted to the terminal apparatus corresponding to the respective management ID when a corresponding one of plural different events occurs in the network home appliance, the first message transmission setting request further including user identification information;
acquiring by a second message transmission setting processing unit from the second storing unit, a management ID corresponding to the user identification information included in the first message transmission setting request received from the terminal apparatus in order to transmit the message transmission setting to the network home appliance through the direct access management server and cause the network home appliance to store the message transmission setting; and
transmitting a second message transmission setting request including the management ID and the message transmission setting to the direct access management server.

25. A computer readable storage medium storing computer readable instructions thereon which, when executed by a computer, cause the computer to perform a method of controlling a direct access management server connected to a network together with a plurality of terminal apparatuses, a network home appliance controlled by the terminal apparatuses, and a service server according to claim 21 and performs exchange of information to directly access the network home appliance through the network, the method comprising:
storing in a third storing unit
a plurality of management IDs, each one of the management IDs representing a combination of a terminal apparatus and a service, and
a controlled apparatus management ID allocated to the network home appliance, the controlled apparatus management ID being stored in association with one of the management IDs;
acquiring, by a third message transmission setting processing unit from the third storing unit, when the second message transmission setting request is received from the service server, a controlled apparatus management ID associated with the management ID included in the second message transmission setting request in order to transmit the message transmission setting to the network home appliance and cause the network home appliance to store the message transmission setting; and
transmitting a third message transmission setting request including the message transmission setting to the network home appliance to which the controlled apparatus management ID is allocated.

* * * * *